(12) United States Patent
Wang et al.

(10) Patent No.: US 9,973,108 B2
(45) Date of Patent: May 15, 2018

(54) HYBRID MODULATION STRATEGY FOR MULTILEVEL INVERTERS

(71) Applicants: Hongliang Wang, Kingston (CA); Yan-Fei Liu, Kingston (CA)

(72) Inventors: Hongliang Wang, Kingston (CA); Yan-Fei Liu, Kingston (CA)

(73) Assignees: Hongliang Wang, Kingston, Ontario (CA); Yan-Fei Liu, Kingston, Ontario (CA)

( * ) Notice: Subject to any disclaimer, the term of this patent is extended or adjusted under 35 U.S.C. 154(b) by 0 days. days.

(21) Appl. No.: 15/662,044

(22) Filed: Jul. 27, 2017

(65) Prior Publication Data

US 2018/0062537 A1    Mar. 1, 2018

Related U.S. Application Data

(60) Provisional application No. 62/379,216, filed on Aug. 24, 2016, provisional application No. 62/381,895, (Continued)

(51) Int. Cl.
*H02M 1/08* (2006.01)
*H02M 7/217* (2006.01)
(Continued)

(52) U.S. Cl.
CPC .............. *H02M 7/487* (2013.01); *H02M 1/08* (2013.01); *H02M 7/217* (2013.01); *H02M 7/219* (2013.01); *H02M 7/483* (2013.01); *H02M 7/5387* (2013.01)

(58) Field of Classification Search
CPC ............ H02M 7/04; H02M 7/08; H02M 7/12; H02M 7/217; H02M 7/42; H02M 7/44;
(Continued)

(56) References Cited

U.S. PATENT DOCUMENTS

| 2005/0127853 A1* | 6/2005 | Su | H02M 7/487 |
| | | | 318/108 |
| 2014/0036555 A1* | 2/2014 | Kolhatkar | H02M 7/487 |
| | | | 363/56.01 |

(Continued)

*Primary Examiner* — Timothy J Dole
*Assistant Examiner* — Ivan Laboy Andino

(57) ABSTRACT

Hybrid modulation strategies are provided for single phase and three phase inverter topologies. According to hybrid modulation strategy embodiments, one line frequency period is divided into two operation modes based on the polarities of output voltage and output current. When polarities of the output voltage and output current are the same, a nominal voltage level modulation is used to generate the output voltage. When polarities of the output voltage and output current are opposite, a lower voltage level modulation is used to generate the output voltage. In one embodiment, a nominal voltage level modulation is five voltage level modulation, and a lower voltage level modulation is three or two voltage level modulation. Embodiments allow inverters to be constructed with fewer switches, and improve performance of multilevel inverters. The hybrid modulation strategies may be implemented in multilevel inverters such as active neutral point clamped (ANPC) and neutral point clamped (NPC) inverters.

7 Claims, 31 Drawing Sheets

Related U.S. Application Data filed on Aug. 31, 2016, provisional application No. 62/395,787, filed on Sep. 16, 2016.

(51) Int. Cl.
  *H02M 7/219* (2006.01)
  *H02M 7/483* (2007.01)
  *H02M 7/487* (2007.01)
  *H02M 7/5387* (2007.01)

(58) Field of Classification Search
  CPC ........ H02M 7/48; H02M 7/487; H02M 7/537; H02M 7/5387; H02M 7/5388; H02M 7/797; H02M 1/08
  See application file for complete search history.

(56) References Cited

U.S. PATENT DOCUMENTS

| | | | |
|---|---|---|---|
| 2014/0233290 A1* | 8/2014 | Spanos | H02M 7/5387 363/131 |
| 2016/0218557 A1* | 7/2016 | Cinti | H02M 1/32 |

\* cited by examiner

HYBRID MODULATION STRATEGY FOR MULTILEVEL INVERTERS

RELATED APPLICATIONS

This application claims the benefit of the filing date of U.S. Application No. 62/379,216, filed on Aug. 24, 2016, U.S. Application No. 62/381,895, filed on Aug. 31, 2016, and U.S. Application No. 62/395,787, filed on Sep. 16, 2016, the contents of which are incorporated herein by reference in their entirety.

FIELD

This invention relates to DC-AC inverters. More particularly, the invention relates to multilevel inverters, to methods for operating such inverters, and to controllers for implementing the operating methods.

BACKGROUND

Multilevel inverters (such as a five level inverter) are receiving increased attention in both academia and industry as an optimal solution for power conversion for medium and high power applications. For medium power (such as 50-100 kW output) and high power (such as 500-1,000 kW output, or higher) applications, the motivation for the use of multilevel inverters is to reduce switch voltage stress as well as output filter size. Multilevel inverters also have the advantages of improved output quality, lower Total Harmonic Distortion (THD), lower common-mode voltage, and lower Electromagnetic Interference (EMI) as compared to their three-level and two-level counterparts. Furthermore, multilevel inverters can achieve higher efficiency as they can use lower voltage rating devices, leading to their wide range of application fields, including renewable energy such as photovoltaic (PV) inverters, wind-powered generators, and so on.

There are three types of multilevel inverter topologies: Neutral Point Clamped (NPC) type, Flying-Capacitor (FC) type, and Cascaded H-Bridge (CHB) type. Hybrid multilevel inverter topologies combine features of NPC and FC. Among hybrid topologies, the Five-Level Active Neutral Point Clamped (5L-ANPC) inverter provides an acceptable compromise between cost and performance. The 5L-ANPC inverter combines a 3L-ANPC leg with a 3L-FC power cell. The number of levels is increased with the levels introduced by the FC. This topology enables a modularity factor that is lacking in the NPC type inverter by adding the FC to reach the higher level without adding series-connected diodes. In addition, ANPC inverters split the DC-link into two capacitors, so the complexity of DC-link capacitor voltage balancing is reduced as compared to the conventional NPC and FC type inverters which require four DC capacitors in series. Due to the reduced costs, volume, and control complexity, the 5L-ANPC inverter is receiving more attention recently and is already commercially used for medium power level industrial applications. FIG. 1 shows a typical 5L-ANPC inverter topology [1]. It is noted that eight switches (i.e., 8S) in each phase are needed for this circuit. Therefore, for a three phase inverter, 24 switches are needed.

The redundant switching states in ANPC inverters allow the voltage across the FC to be regulated. To generate the switching pulses and simultaneously regulate the FC voltage, a variety of modulation strategies have been presented such as carrier-based Pulse Width Modulation (PWM), modified triangular carrier-based PWM, real time THD minimization, and selective harmonic elimination PWM [2]. The modulation of a conventional five-level ANPC inverter under PF=1 and PF<1 is shown in FIGS. 2A and 2B, respectively. It is noted that the leg voltage ($V_{AO}$) is selected based only on the required output voltage. It is not dependent on the output current under either PF=1 or PF<1 condition. For example, it is observed from FIG. 2B that from t0 to t1, the instantaneous output current is negative, and the leg voltage is changed between 0V and Vdc/4. From t1 to t2, the instantaneous output current is positive, and the leg voltage is also changed between 0V and Vdc/4. This is due to the fact that the instantaneous output voltage $V_{ref}$ is less than Vdc/4 from t0 to t2. A similar observation is made from t4 to t6.

A six-switch 5L-ANPC (6S-5L-ANPC) inverter topology has been proposed, as shown in FIG. 3. As compared with the conventional 8S 5L-ANPC inverter, as shown in FIG. 1, the 6S-5L-ANPC inverter uses six switches for each phase and 18 switches for three phase application. Therefore, the total number of switches is reduced and the total inverter cost can be reduced.

The inverters are required to provide active power and reactive power to the grid. If the inverter's output current and output voltage are at same phase, the polarities of the output current and output voltage are always the same (either both are positive or both are negative), only the active power is provided to the grid. In this case, the power factor (PF) is one, PF=1. The top waveforms of FIG. 6 show the condition when the inverter output current and output voltage are at same phase. In FIG. 6, in zone Z1, the inverter's output current and output voltage are both positive and in zone Z2, the inverter's output current and output voltage are both negative.

If the power factor is less than 1, PF<1, the inverter's output current and output voltage are at different phases, and for some portion of the 60 Hz period, (or 50 Hz in Europe and far east countries), the polarities of the output current and output voltage are not the same (either positive current and negative voltage, or negative current and positive voltage). For the rest of the 60 Hz period, the polarities of the output current and output voltage are the same (either positive current and positive voltage or negative current and negative voltage). The top waveforms of FIG. 7 show the condition when the output current lags the output voltage by φ degrees. In FIG. 7, in zone Z1, the inverter's output current and output voltage are both positive and in zone Z2, the inverter's output current and output voltage are both negative. In zone Z3, the output current is negative and the output voltage is positive. In zone Z4, the output current is positive and the output voltage is negative. In zone Z3 and Z4, the output current and output voltage are in opposite polarity.

SUMMARY

According to one aspect of the invention there is provided a method of operating a multilevel inverter, wherein the multilevel inverter produces an AC output voltage and output current at a line period, the method comprising: controlling switches of the multilevel inverter according to a nominal voltage level modulation during a portion of the line period when polarities of the output voltage and output current are the same, such that the nominal voltage level modulation generates a leg voltage $V_{AO}$; and controlling switches of the multilevel inverter according to a lower voltage level modulation during a portion of the line period when the polarities of the output voltage and output current are opposite, such that the lower level voltage modulation generates the $V_{AO}$; wherein the inverter instantaneous output AC voltage is determined based on the $V_{AO}$.

In various embodiments, the multilevel inverter may be selected from an active neutral point clamped (ANPC) inverter and a neutral point clamped (NPC) inverter.

In one embodiment, the multilevel inverter is a five level inverter and the nominal voltage level modulation is five voltage level modulation.

In various embodiments, the lower voltage level modulation may be selected from three voltage level modulation and two voltage level modulation.

In various embodiments, the multilevel inverter is an ANPC inverter.

In one embodiment, the lower voltage level modulation is selected such that: a flying capacitor of the ANPC inverter does not participate in an energy transfer process; or the flying capacitor is charged and discharged alternately between one voltage level and another voltage level.

In various embodiments, the multilevel ANPC inverter may be selected from a nine voltage level ANPC inverter, a seven voltage level ANPC inverter, and a five voltage level ANPC inverter; wherein the nominal voltage level modulation is nine voltage level modulation, seven voltage level modulation, and five voltage level modulation, respectively; and wherein the lower voltage level modulation is seven, five, three, or two voltage level modulation for the nine voltage level ANPC inverter; five, three, or two voltage level modulation for the seven voltage level ANPC inverter, and three or two voltage level modulation for the five voltage level ANPC inverter.

In one embodiment, the multilevel ANPC inverter is a five voltage level ANPC inverter; wherein the nominal voltage level modulation is five voltage level modulation; and wherein the lower voltage level modulation is three or two voltage level modulation; wherein the flying capacitor does not participate in the energy transfer process during the two voltage level modulation; or wherein the flying capacitor is charged and discharged alternately between one voltage level and another voltage level during the three voltage level modulation.

In one embodiment, the multilevel inverter is a five level inverter, and the method includes: controlling switches of the inverter according to five voltage level modulation during a portion of the line period when polarities of the output voltage and output current are the same and the output current is higher than a positive threshold iou or lower than a negative threshold iod to generate the leg voltage $V_{AO}$; controlling switches of the inverter according to three voltage level modulation during a portion of the line period when the polarities of the output voltage and output current are opposite and the output current is higher than the positive threshold iou or lower than the negative threshold iod, to generate the leg voltage $V_{AO}$; controlling switches of the inverter according to two voltage level modulation during a transition interval between same direction operation and opposite direction operation, to generate the leg voltage $V_{AO}$; wherein the two voltage level modulation provides a bi-directional current flow path.

In one embodiment, the two voltage level modulation is applied for 3-10 switching cycles of a line period.

In one embodiment, the multilevel inverter is a five level inverter, and the method includes: controlling switches of the inverter according to five voltage level modulation during a portion of the line period when polarities of the output voltage and output current are the same, to generate the leg voltage $V_{AO}$; controlling switches of the inverter according to three voltage level modulation during a portion of the line period when polarities of the output voltage and output current are opposite and the output current is greater than a positive threshold value iou or lower than a negative threshold value iod, to generate leg voltage $V_{AO}$; and controlling switches of the inverter according to two voltage level modulation during a portion of the line period when polarities of the output voltage and output current are opposite and when either the output current is between the negative threshold value iod and zero, or when the output current is between the positive threshold value iou and zero, to generate leg voltage $V_{AO}$; wherein the two voltage level modulation provides a bi-directional current flow path.

One embodiment includes controlling switches of the inverter so that when the output current crosses zero, a present switching state switch is turned off and after a selected delay time a next switching state is turned on; wherein a +2 voltage level and a −2 voltage level are applied at a leg voltage $V_{AO}$ output point for the selected delay time; wherein the delay time is 5-10 µs.

Another aspect of the invention provides a method of operating a three phase multilevel inverter, wherein the three phase multilevel inverter produces a three phase AC output voltage and output current at a line period, the method comprising: controlling switches of each phase of the three phase multilevel inverter substantially according to a method described herein for a single phase inverter.

In various embodiments, the three phases of the three phase multilevel inverter are selected from an active neutral point clamped (ANPC) inverter and a neutral point clamped (NPC) inverter.

In one embodiment, the three phases of the three phase multilevel inverter are five level inverters and the nominal voltage level modulation is five voltage level modulation. In one embodiment, the lower voltage level modulation is selected from three voltage level modulation and two voltage level modulation.

Another aspect of the invention provides a controller for implementing a multilevel inverter control method as described herein.

BRIEF DESCRIPTION OF THE DRAWINGS

To better understand the invention, and to show more clearly how it may be carried into effect, embodiments are described, by way of example, with reference to the accompanying drawings, wherein.

DETAILED DESCRIPTION OF EMBODIMENTS

In this description the following operating conditions are defined:

Same Direction Operation:

When the polarities of the inverter output current and output voltage are same: either positive current and positive voltage, or negative voltage and negative current.

Opposite Direction Operation:

When the polarities of the inverter output current and output voltage are opposite: either positive current and negative voltage, or negative current and positive voltage.

It is noted that a two-level inverter produces two voltage levels at its output, such as Vdc/2 and −Vdc/2. The voltage difference between one voltage level and the next voltage level is Vdc or −Vdc. In other words, the voltage difference between two adjacent voltage levels is Vdc or −Vdc.

Multilevel inverters have been proposed to reduce the size of the inverter. A three level inverter is able to produce three discrete voltage levels at its output: Vdc/2, 0, and −Vdc/2. The voltage difference between two adjacent voltage levels is Vdc/2 or −Vdc/2. A five level inverter is able to produce five discrete voltage levels at its output: Vdc/2, Vdc/4, 0, −Vdc/4, and −Vdc/2. The voltage difference between two adjacent voltage levels is Vdc/4 or −Vdc/4. Vdc is the DC input voltage to the inverter.

In this specification, the following definitions are used for two voltage level modulation, three voltage level modulation and five voltage level modulation.

Two Voltage Level Modulation:

For a specific time interval, the voltage difference (of the inverter leg voltage) between two adjacent voltage levels is Vdc or −Vdc, where Vdc is the input DC voltage. For example, the leg voltage can change between Vdc/2 and −Vdc/2.

Three Voltage Level Modulation:

For a specific time interval, the voltage difference (of the inverter leg voltage) between two adjacent voltage levels is Vdc2 or −Vdc/2, where Vdc is the input DC voltage. For example, the leg voltage can change between Vdc/2 and 0, or between −Vdc/2 and 0, or between Vdc/4 and −Vdc/4, and so on.

Five Voltage Level Modulation:

For a specific time interval, the voltage difference (of the inverter leg voltage) between two adjacent voltage levels is Vdc/4 or −Vdc/4, where Vdc is the input DC voltage. For example, the leg voltage can change between Vdc/4 and 0, or between −Vdc/4 and 0, or between Vdc/2 and Vdc/4, or between −Vdc/2 and −Vdc/4, and so on.

Figure 10:
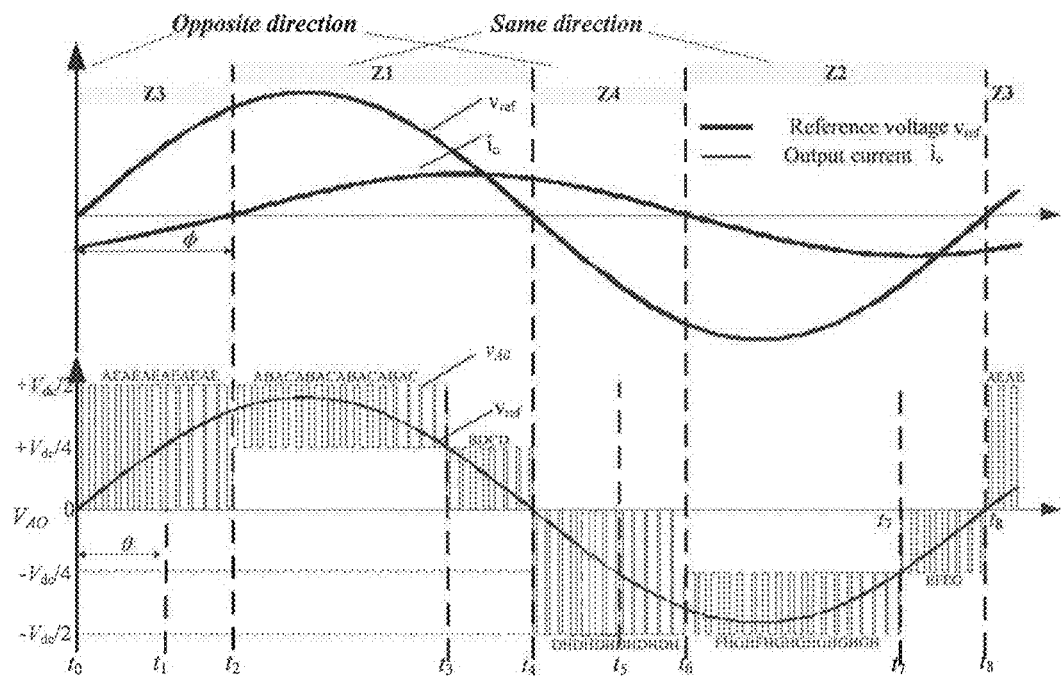
FIG. 10 is a plot showing voltage and current waveforms for the circuit of FIG. 3, operating under modulation Mode #1 and φ>θ, according to an embodiment of the invention.

The term "specific time interval", as used herein, refers to a portion of one complete line period. One complete line period is 20 milisecond for a 50 Hz line frequency (e.g., Europe and Asia) and 16.7 milisecond for a 60 Hz line frequency (e.g., North America). For example, a "specific time interval" may be a portion of a line period such as from t0 to t2 and from t4 to t6 as shown in FIG. 10.

Figure 1:
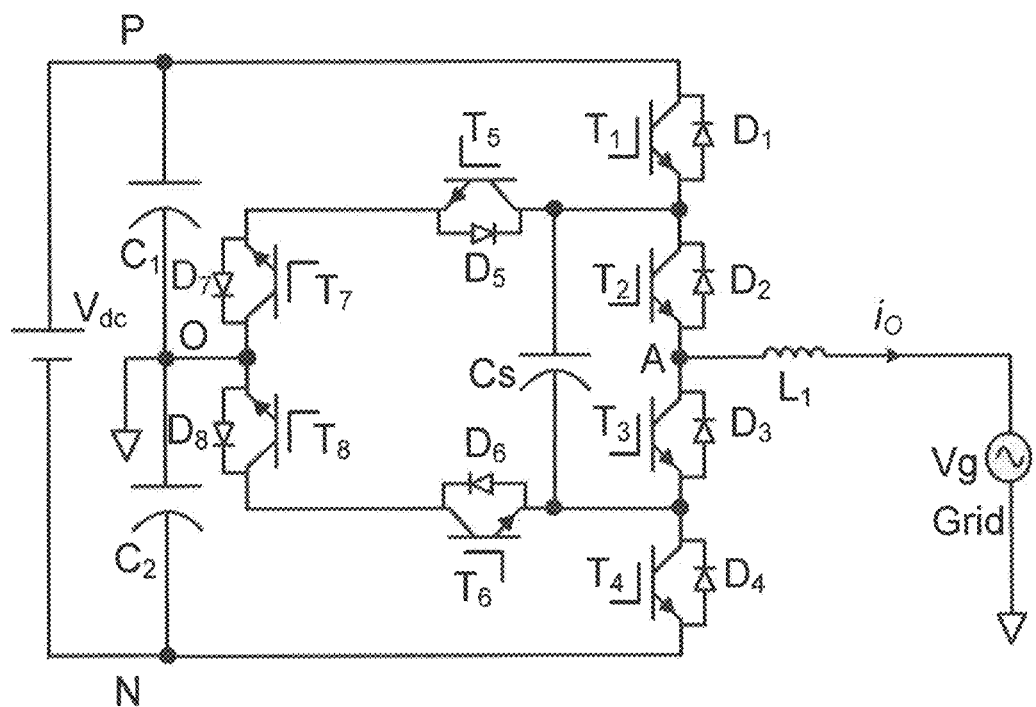
FIG. 1 is a circuit diagram of a conventional 8S 5L-ANPC inverter topology, according to the prior art.
Figure 2A:
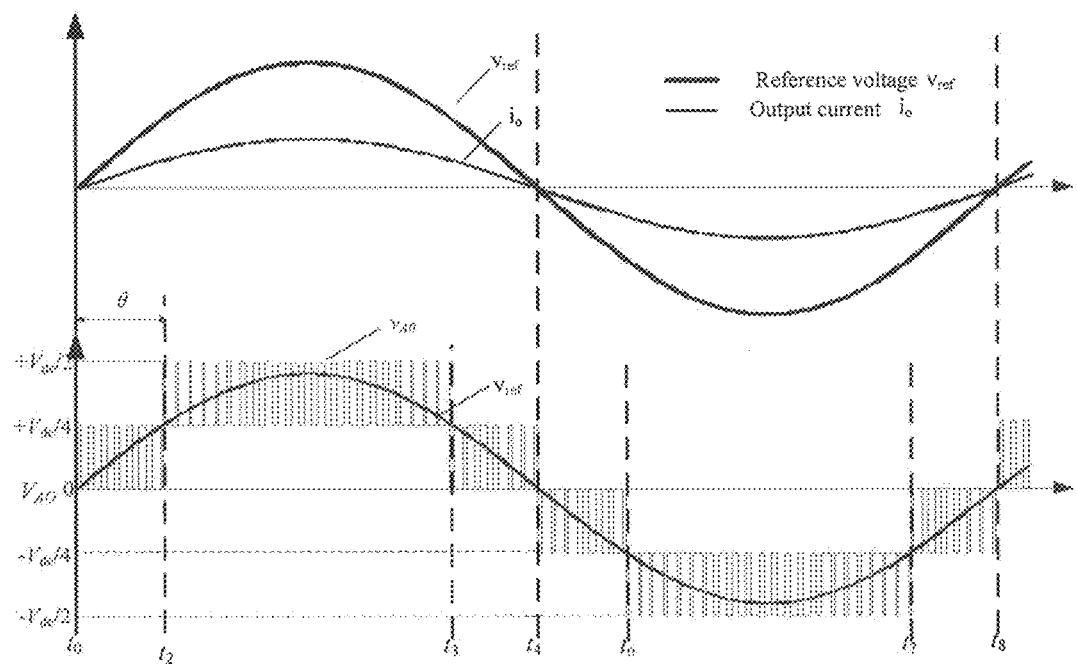
FIGS. 2A and 2B are plots showing voltage and current waveforms for PF=1, and PF<1, respectively, for the circuit of FIG. 1.
Figure 2B:
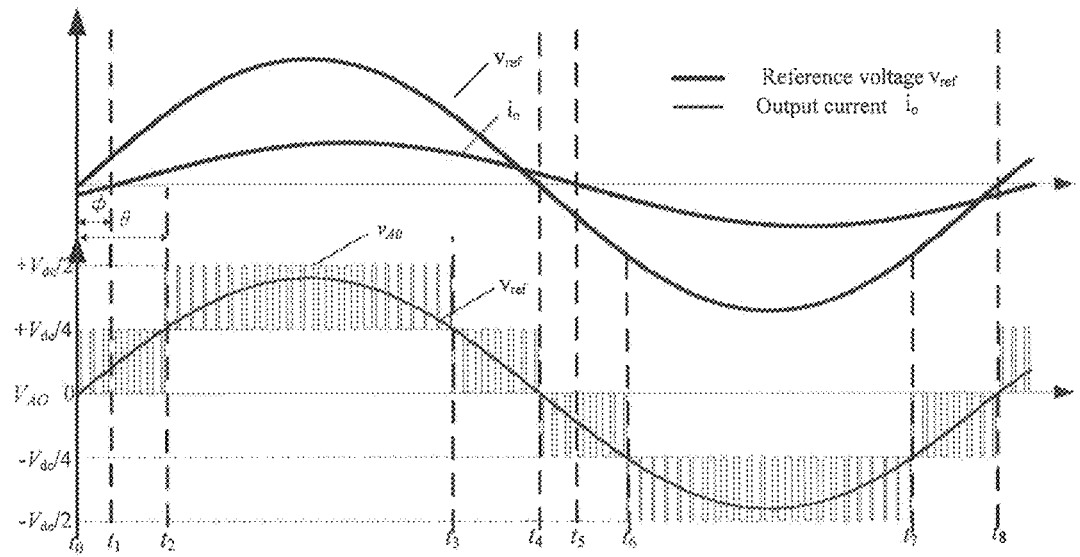

Modulation methods, such as described in [2], have been proposed to control the 8S 5L-ANPC inverter topology, as shown in FIG. 1. With this modulation method, five voltage levels at the output of the inverter (between point A and point O, referred to herein as the phase voltage, or leg voltage $V_{AO}$) are generated. They are Vdc/2, Vdc/4, 0, −Vdc/4, and −Vdc/2. FIGS. 2A and 2B shows the inverter phase voltage waveform under these modulation methods. FIG. 2A is under the condition of power factor of 1, PF=1, where the grid voltage and the inverter output current are at same phase. FIG. 2B is under the condition of power factor less than 1, PF<1. The inverter output current io lags the inverter output voltage (grid voltage) Vg. One key observation is that in both conditions (PF=1 and PF<1), there are five voltage levels at the output for the entire line period. More detailed descriptions are provided in next section.

In this specification, the grid voltage is represented by symbol Vg, as shown in FIG. 1. The leg voltage, $V_{AO}$, is a multi-voltage level PWM waveform, as shown in FIGS. 2A and 2B. It can be obtained by a sinusoidal PWM modulation method. It can also be obtained by other modulation methods. Its fundamental component is referred to as the output voltage, which is same as the reference voltage Vref, as shown in FIGS. 2A and 2B. There is a small (less than 5-15 degree) phase difference between the grid voltage Vg and the reference voltage (or the output voltage) Vref. In order to simplify the description and the analysis in this specification, it is assumed that grid voltage Vg and the reference voltage Vref are at same phase. In this specification the term "grid voltage", "output voltage", and "reference voltage" are used interchangeably and all refer to the same voltage.

Modulation of Conventional 8S-5L-ANPC Inverter

To better understand the invention, a detailed analysis of conventional modulation methods will first be provided. FIG. 1 shows a conventional five-level ANPC inverter. There are eight switching states to achieve five-level leg voltage $V_{AO}$; +Vdc/2, +Vdc/4, 0, −Vdc/4, −Vdc/2. There are two redundant states used to balance the flying capacitor Cs voltage with the same output voltage, such as +Vdc/4 and −Vdc/4. Each state of output voltage may flow as bi-directional current.

The modulation of the conventional five-level ANPC of FIG. 1 is shown in FIGS. 2A and 2B. The leg voltage $V_{AO}$ is same for both PF=1 or PF<1 operating conditions, as shown in FIGS. 2A and 2B.

In the positive half line period of the grid voltage, the $V_{AO}$ is between 0 and $V_{dc}/4$ during [t0, t2] and [t3, t4] (when the grid voltage is 0<vg<$V_{dc}/4$). The $V_{AO}$ is between $V_{dc}/4$ and $V_{dc}/2$ during [t2, t3] (when the grid voltage is $V_{dc}/4$<vg<$V_{dc}/2$).

In the negative half line period of the grid voltage, the $V_{AO}$ is between 0 and −Vdc/4 during [t4, t6] and [t7, t8] (when the grid voltage is −$V_{dc}/4$<vg<0). The $V_{AO}$ is between −Vdc/4 and −Vdc/2 during [t6, t7] (when the grid voltage is −Vdc/2<vg<−Vdc/4).

The grid voltage is defined as $v_g$:

$$v_g = V_g \cdot \sin(\omega t) \tag{1}$$

where $V_g$ is the peak value of grid voltage and $\omega=2\pi f$ is angular frequency and f is line frequency (60 Hz in North America and 50 Hz in Europe and Asia). The modulation index is defined as M which can be calculated by:

$$M = \frac{V_g}{V_{DC}/2} \tag{2}$$

The phase angle θ is defined in (3) and (4), when the reference voltage equals to $V_{DC}/4$.

$$M \cdot \sin\theta = \frac{1}{2} \tag{3}$$

$$\theta = \arcsin\left(\frac{1}{2M}\right) \tag{4}$$

When the power factor is less than 1, PF<1, there is a phase shift between output current and output voltage, which is defined as φ. In the case of an inductive load, the output current $i_o$ is:

$$i_o = I_{pk} \cdot \sin(\omega t - \phi) \tag{5}$$

where $I_{pk}$ is the peak value of output current. Then the power factor (PF) can be defined as:

$$PF = \cos\phi\left(-\frac{\pi}{2} \leq \phi \leq \frac{\pi}{2}\right) \tag{6}$$

Hybrid Modulation Strategy for Single-Phase 6S-5L-ANPC Inverter

Figure 3:
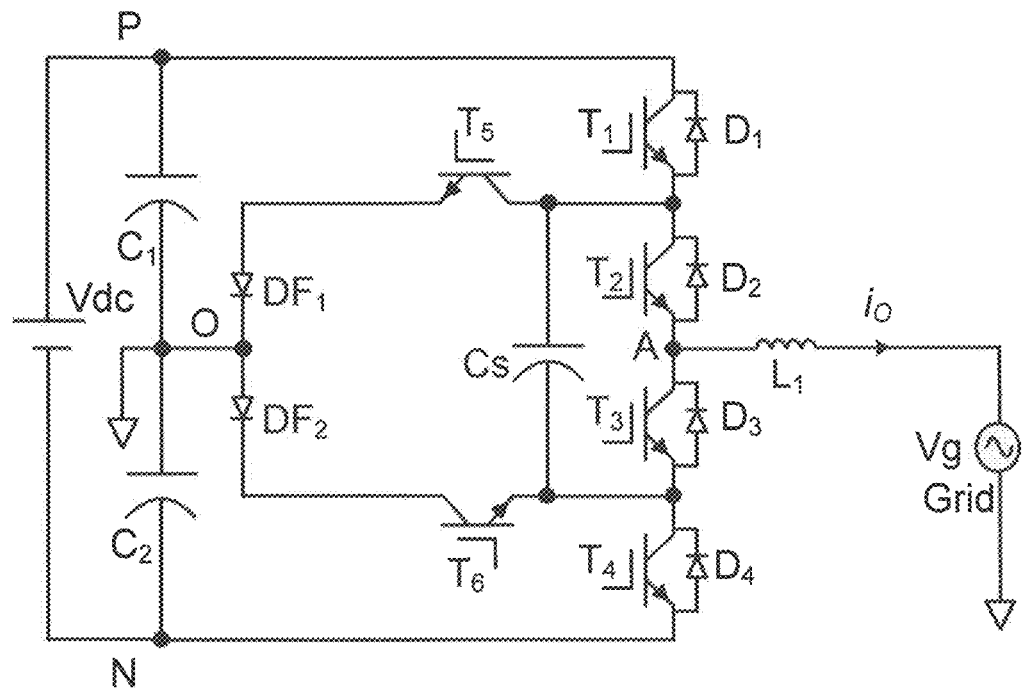
FIG. 3 is a circuit diagram of a 6S 5L-ANPC inverter topology, according to the prior art.

It is noted that the prior modulation method described in the above section is optimized for a conventional eight switch 5L-ANPC inverter, such as the one shown in FIG. 1. When it is used to control a 6S-5L-ANPC inverter as shown in FIG. 3, it has good performance for the condition when the power factor is 1 (PF=1). When the power factor is less than 1 (PF<1), the voltage across the flying capacitor Cs will have a large ripple, which is not desirable.

It is observed that the 6S-5L-ANPC inverter has eight switching states that generate five voltage levels at the leg output ($V_{AO}$) based on capacitor voltages, as shown in Table 1. In the table, "1" indicates a switch is on and "0" indicates a switch is off. The output current is defined as $i_o$. FIGS. 4A-4H show equivalent circuits for eight switching states (states A to H) and current paths.

TABLE 1

Switching States, Output Voltage, and Impact on the Flying Capacitor Voltage of a 6S-5L-ANPC Inverter

| Switching State | Switch Number | | | | | | Output Voltage Level | Bi-Directional Current | Flying Capacitor $C_s$ | |
|---|---|---|---|---|---|---|---|---|---|---|
| | $T_1$ | $T_2$ | $T_3$ | $T_4$ | $T_5$ | $T_6$ | | | $i_o > 0$ | $i_o < 0$ |
| State A | 1 | 1 | 0 | 0 | 0 | 0 | +2 | Y | — | — |
| State B | 1 | 0 | 1 | 0 | 0 | 0 | +1 | Y | Charge | Discharge |
| State C | 0 | 1 | 0 | 0 | 0 | 1 | +1 | N ($i_o > 0$) | Discharge | — |
| State D | 0 | 0 | 0 | 0 | 0 | 1 | +0 | N ($i_o > 0$) | — | — |
| State E | 0 | 0 | 0 | 0 | 1 | 0 | −0 | N ($i_o < 0$) | — | — |
| State F | 0 | 0 | 1 | 0 | 1 | 0 | −1 | N ($i_o < 0$) | — | Discharge |

TABLE 1-continued

Switching States, Output Voltage, and Impact on the Flying
Capacitor Voltage of a 6S-5L-ANPC Inverter

| Switching | Switch Number | | | | | | Output Voltage | Bi-Directional | Flying Capacitor $C_s$ | |
|---|---|---|---|---|---|---|---|---|---|---|
| State | $T_1$ | $T_2$ | $T_3$ | $T_4$ | $T_5$ | $T_6$ | Level | Current | $i_o > 0$ | $i_o < 0$ |
| State G | 0 | 1 | 0 | 1 | 1 | 0 | −1 | Y | Discharge | Charge |
| State H | 0 | 0 | 1 | 1 | 1 | 0 | −2 | Y | — | — |

Figure 4A:
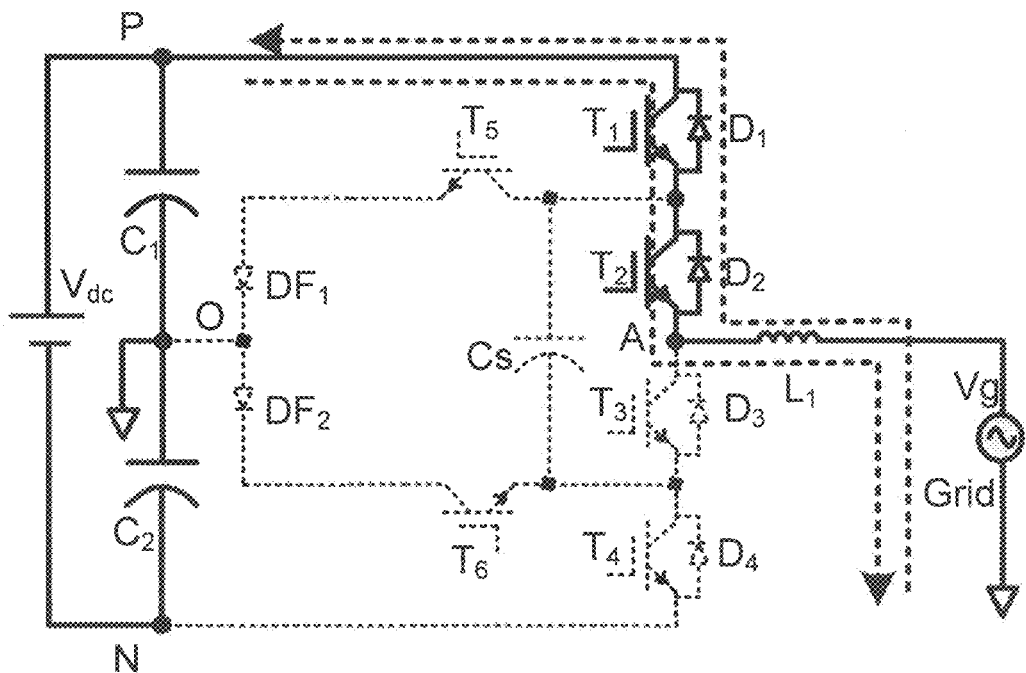
FIGS. 4A-4H are circuit diagrams showing eight switching states (A-H) for the circuit of FIG. 3, as set forth in Table 1.

At state A, T1 and T2 are on and T3, T4, T5 and T6 are off, as shown in FIG. 4A. The current path is indicated by the dashed lines in FIG. 4A. The leg voltage $V_{AO}$ is Vdc/2, or at +2 voltage level. It is also noted that bi-directional current flows in this path. Both positive and negative current can flow. At state A, the flying capacitor is not in the current flow path.

At state B, T1 and T3 are on. T2, T4, T5 and T6 are off. The leg voltage $V_{AO}$ is Vdc/4, or +1 voltage level. Bi-directional current can also flow. The current path is indicated by the dashed line in FIG. 4B. At state B, if the output current is positive, the flying capacitor is charging and if the output current is negative, the flying capacitor is discharging.

At state C, T2 and T6 are on. T1, T3, T4 and T5 are off. The current flows from point O through $DF_2$, T6, Cs, and T2 to point A. The leg voltage $V_{AO}$ is Vdc/4, or +1 voltage level. The current can only flow in one direction because of diode $DF_2$, as shown by the dashed line in FIG. 4C. The flying capacitor discharges when the output current is positive.

At state D, T6 is on. T1, T2, T3, T4, and T5 are off. The current flows from point O through DF2, T6 and D3 to point A and to the output, as shown by the dashed line. The leg voltage $V_{AO}$ is 0, or +0 voltage level. Only the positive output current can flow, as shown in FIG. 4D. The flying capacitor is not in the current flowing path.

The operation of States E, F, G and H is similar to the operation of State A, B, C and D and can be understood by the help of the equivalent circuits, as shown in FIGS. 4E, 4F, 4G, and 4H, where current flow is shown by dashed lines.

In Table 1, it is observed that there are three pairs of redundant switching states which generate the same output voltage level: states B and C are redundant switching states to generate +1 voltage level; similarly, state D and state E are redundant states to generate 0 voltage level and state F and state G are redundant states to generate −1 voltage level.

It is noted that although the redundant states (B, C) and (F, G) generate the same output voltage level, their effects on the flying capacitor voltage are opposite to each other due to the change in the direction of the flying capacitor current, which is same as the output current. One feature of the embodiments described herein relates to regulating the flying capacitor voltage to a constant value ($V_{dc}/4$). The sign of the output current $i_o$ and the deviation sign of the flying capacitor voltage from reference values are required to determine which redundant switching state to be selected.

Figure 6:
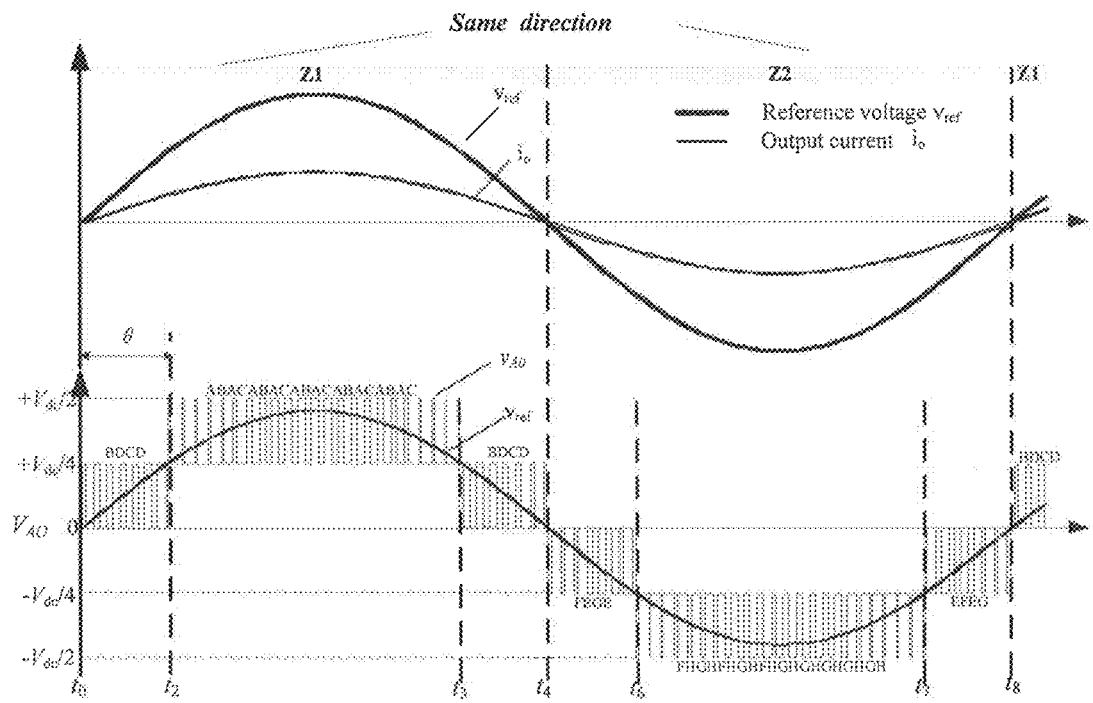
FIG. 6 is a plot showing voltage and current waveforms for PF=1 for the circuit of FIG. 3, wherein switching states A-H are indicated.

In FIG. 6, the letters A to H refer to the switching states A to H in Table 1, and show a possible sequence of the switching states. For example, when the instantaneous output voltage value is less than Vdc/4 (from t0 to t2 time interval), the switching state sequence may be from State B to State D to State C to State D and then to State B to State D to State C to State D, to repeat this sequence. When the instantaneous output voltage is above Vdc/4 (from t2 to t3 time interval), the switching state sequence may be from State A to State B to State A to State C, which then repeats. FIGS. 7-12, 34, and 35 similarly show sequences of switching states A to H.

From the above analysis, as shown in FIGS. 4A-4H and Table 1, it is observed that among the eight states, four states (C, D, E, and F) only allow unidirectional current flow due to the presence of discrete diodes. Therefore, the voltage ripple of the flying capacitor will be increased because of the unidirectional current flow when the polarities of the output voltage and output current are opposite. Since there are limitations for the selection of four switching states with unidirectional current path, appropriate selection of switching states when power factor is less than one (PF<1) is very important, and will be described below. A hybrid modulation strategy according to embodiments described herein, e.g., for the 6S-5L-ANPC topology, solves this problem.

As noted above and shown in FIG. 7, when PF<1, four operating zones may be identified based on the polarities of the output current and output voltage during a complete line frequency period (60 Hz, or 50 Hz): In zone Z1 and zone Z2, the output current and output voltage are in same direction (same direction operation); in zone Z3 and zone Z4, the output current and output voltage are in the opposite direction (opposite direction operation).

It is noted that two redundant states (B, and C) can achieve $V_{AO}$=Vdc/4 (+1 voltage level). When the output current is positive, the flying capacitor is charged during state B and discharged during state C. Its voltage can be balanced by selecting state B and state C alternatively. When the output current is negative, State C is not possible due to $DF_2$. State B is possible which discharges the flying capacitor. Therefore, the flying capacitor can only discharge and its voltage will reduce.

Similarly, two redundant states (F and G) can achieve $V_{AO}$=−Vdc/4 (−1 voltage level). When the output current is negative, the flying capacitor is charged during state G and discharged during state F. Its voltage can be balanced by selecting state F and state G alternatively. When the output current is positive, state F is not possible and state G is possible which discharges the flying capacitor. The flying capacitor can only discharge and its voltage will be reduced.

That is, the flying capacitor voltage can be balanced under same direction operation (zone Z1 and Z2). The flying capacitor voltage cannot be balanced under opposite direction operation (zone Z3 and Z4) if the conventional 5-level modulation strategy is used.

In accordance with one aspect of the invention, a hybrid modulation method is provided for a multilevel inverter (e.g., a five level, seven level, nine level, or other level inverter).

According to embodiments described herein, the flying capacitor voltage is regulated to a constant value, such that the flying capacitor voltage ripple is substantially removed or eliminated. For example, for a 6S-5L-ANPC converter, such as the embodiment shown in FIG. 3, the flying capacitor voltage is regulated to ($V_{dc}/4$). As a result, the flying capacitor voltage is substantially the same as that of an eight switch 5L-ANPC inverter, as shown in FIG. 1. Thus, the ripple voltage is eliminated while using only six switches in the 6S-5L-ANPC.

For a 6S-5L-ANPC converter, such as that shown in FIG. 3, a hybrid modulation strategy according to one embodiment may be described as follows:

Ia. When the polarities of the output voltage and output current are the same (same direction operation, such as zone Z1 and zone Z2), five voltage level modulation is used.

IIa. When the polarity of the output voltage and output current of the inverter are opposite (opposite direction operation, such as zones Z3 and Z4), a non-five level modulation method is used in such a way that the switching states with which the flying capacitor is not active or a pair of switching states with which the flying capacitor voltage can be balanced will be used so that the ripple voltage across the flying capacitor is minimized. In practical implementation, switching states with similar voltage stress are used in order to improve the circuit performance.

Described below are three examples of modes for the operating condition outlined in IIa above.

Figure 4B:
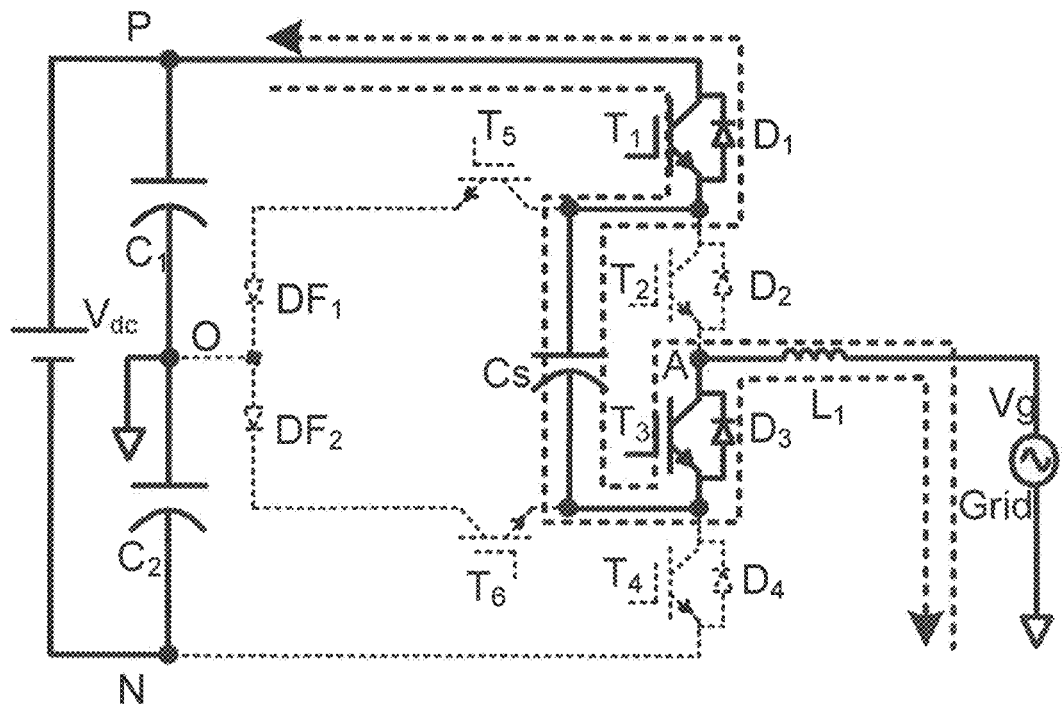
Figure 4C:
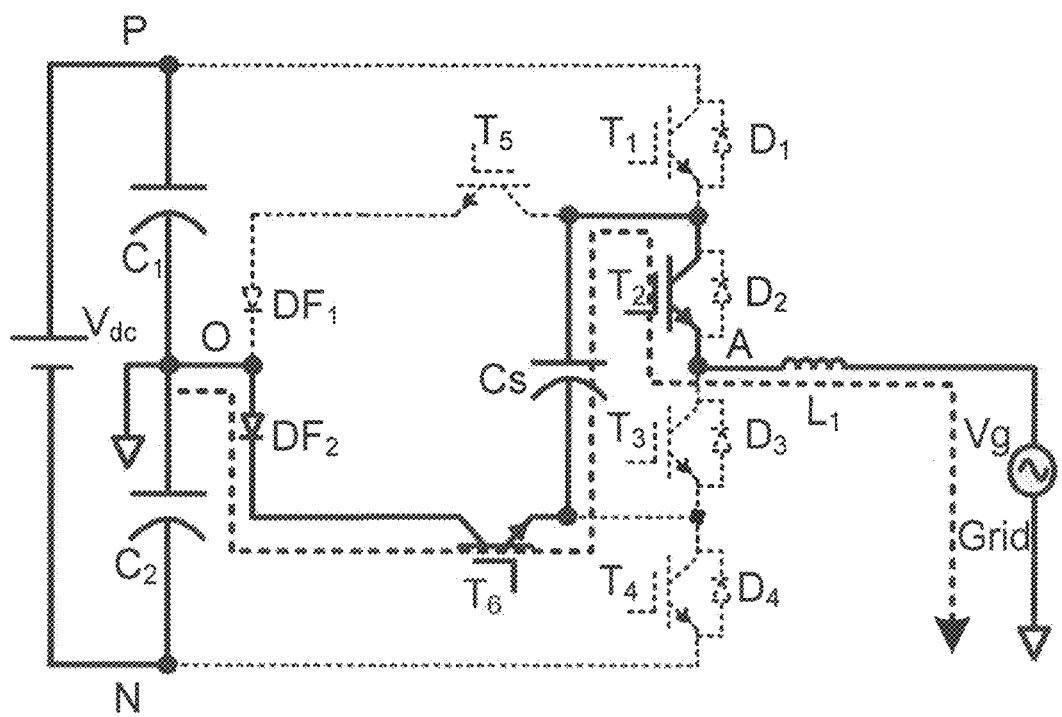
Figure 4D:
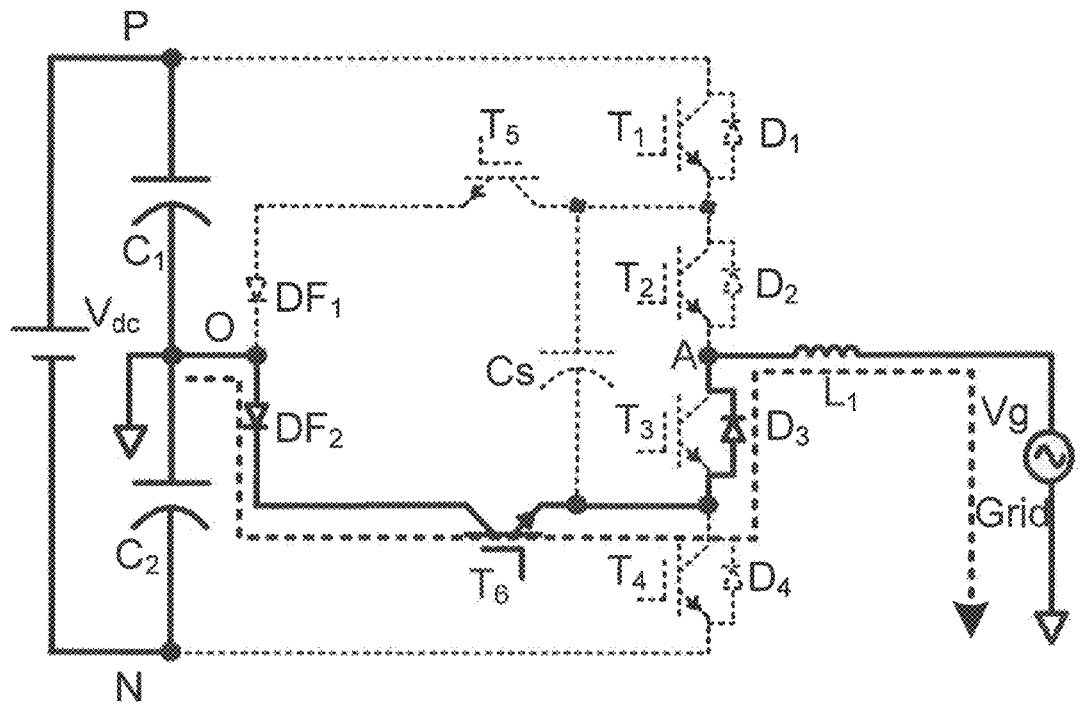
Figure 4E:
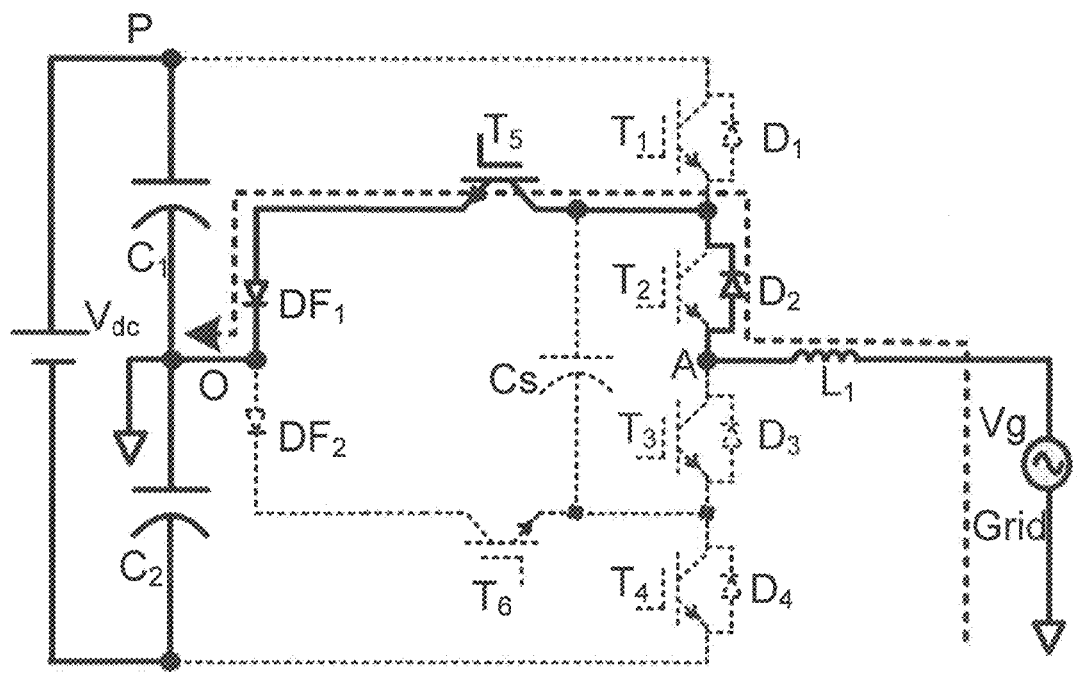
Figure 4F:
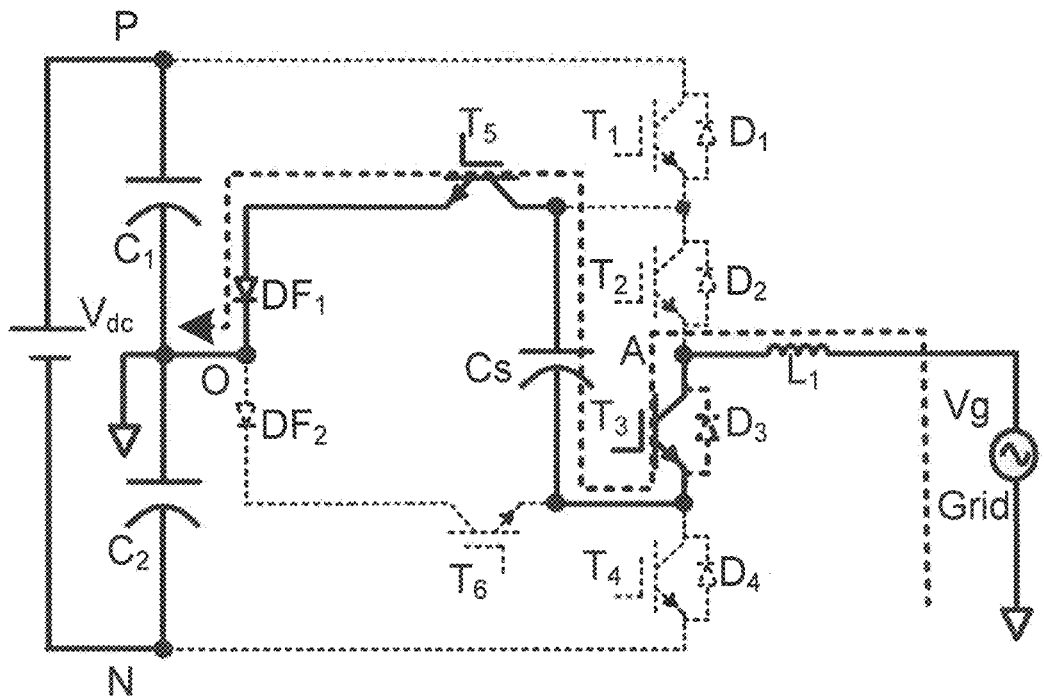
Figure 4H:
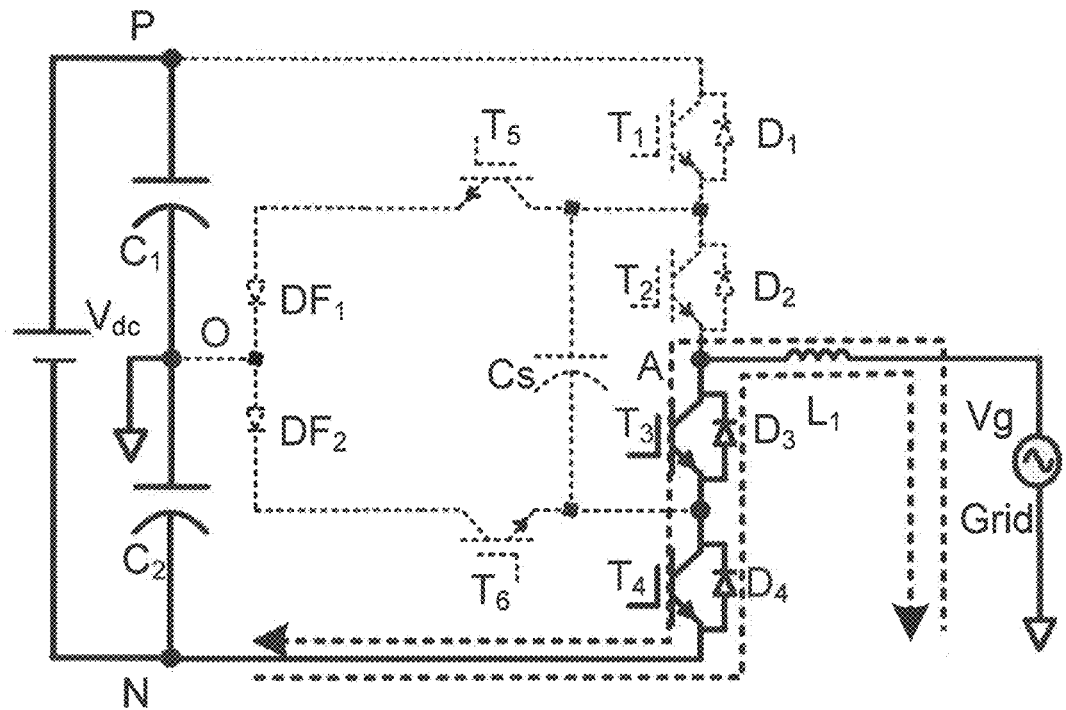
Figure 5A:
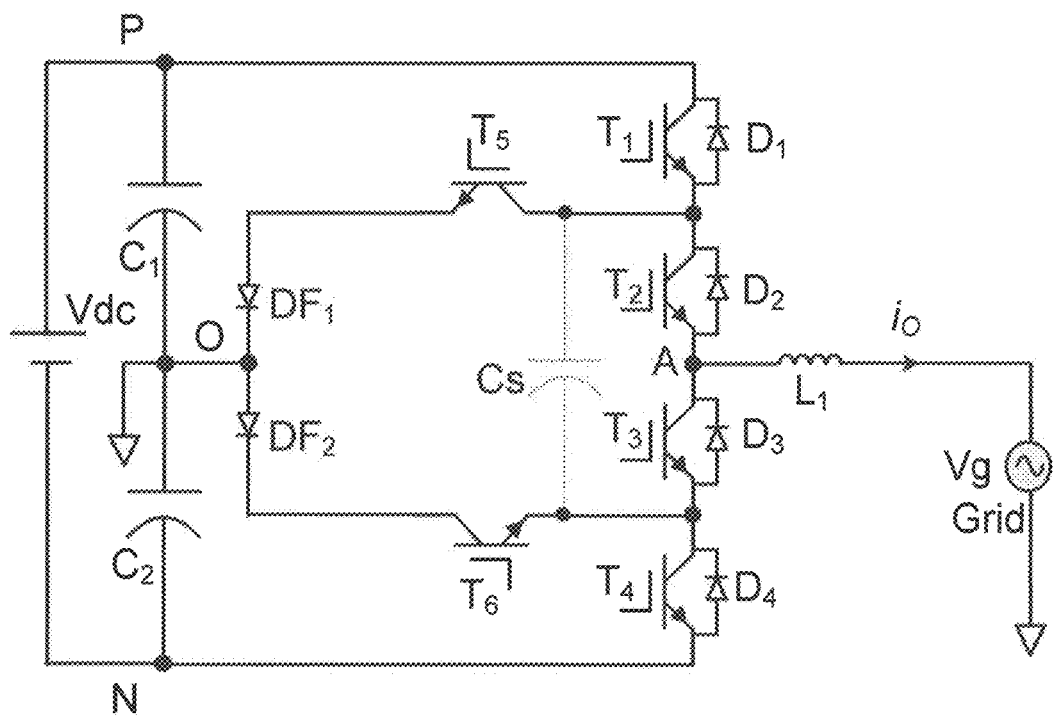
FIGS. 5A-5C are equivalent circuit diagrams showing operation modes 1-3, respectively, of the circuit of FIG. 3.

Mode #1:

When the grid voltage Vg is positive, state A, +2 voltage level as shown in FIG. 4A, and state E, 0 voltage level as shown in FIG. 4E, are combined to construct leg voltage $V_{AO}$. When the grid voltage Vg is negative, state D, 0 voltage level as shown in FIG. 4D, and state H, −2 voltage level as shown in FIG. 4H, are combined to construct leg voltage $V_{AO}$. In this operation mode, the flying capacitor is disconnected from the circuit and does not participate in the energy transfer and its voltage does not change. This is equivalent to the two voltage level modulation based on the definition provided earlier in this specification. The equivalent circuit of Mode #1 during opposite direction operation is shown in FIG. 5A, where Cs is disconnected from the circuit as shown by the dotted line.

Figure 4G:
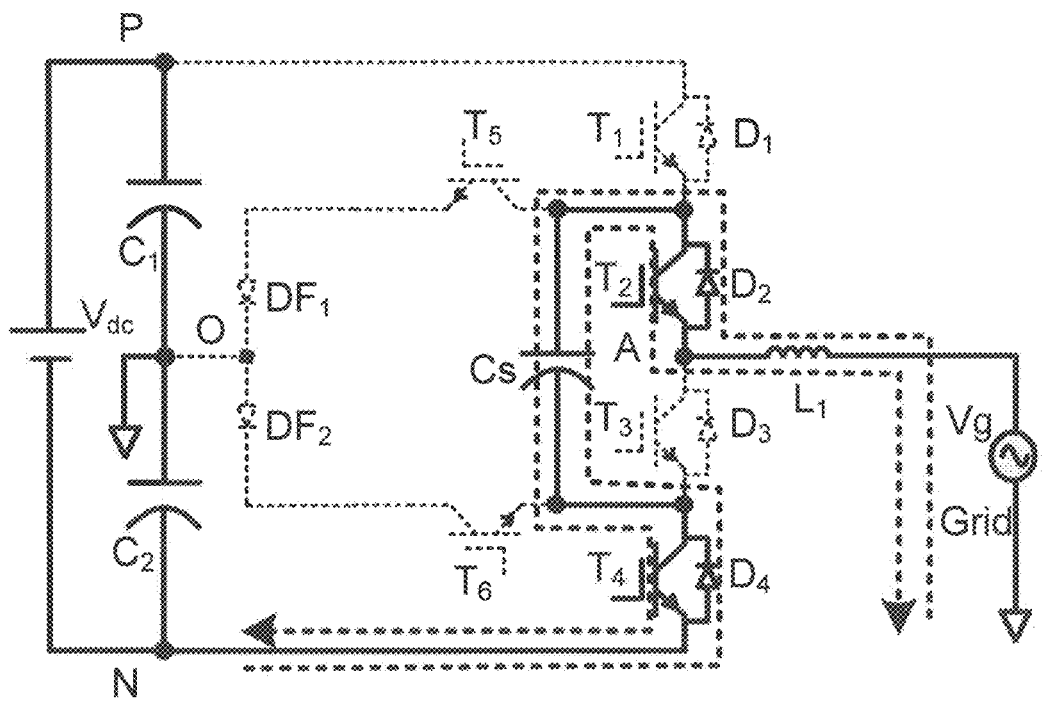
Figure 5B:
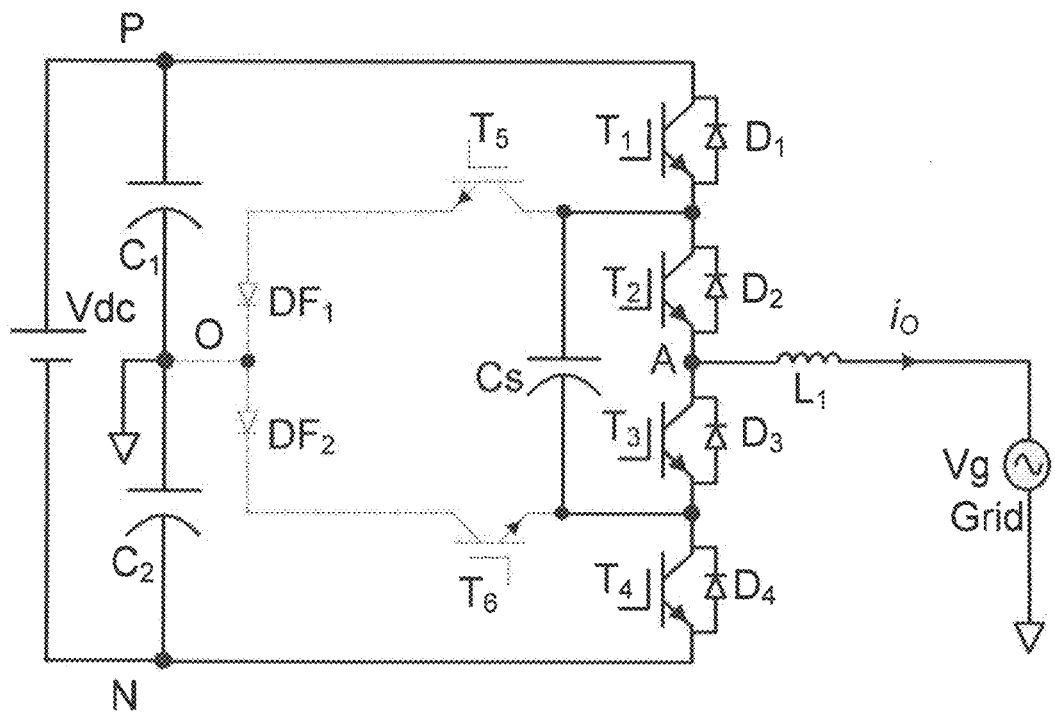

Mode #2:

State B, +1 voltage level as shown in FIG. 4B, and state G, −1 voltage level as shown in FIG. 4G, are combined to construct leg voltage $V_{AO}$. In this case, the flying capacitor ripple voltage is small as the flying capacitor is charged at one voltage level and discharged at the next voltage level. When the output current is positive, the flying capacitor is charged at state B and discharged at state G. When the output current is negative, the flying capacitor is charged at state G and discharged at state B. The pulse width of the +1 voltage level and −1 voltage level are selected in such a way that the leg voltage $V_{AO}$ in one line period will produce a low frequency voltage that is same as the reference voltage. This is equivalent to the three voltage level modulation based on the definition provided earlier in this specification. The equivalent circuit of Mode #2 during opposite direction operation is shown in FIG. 5B, where T5, T6, $DF_1$, and $DF_2$ are disconnected from the circuit.

Figure 5C:
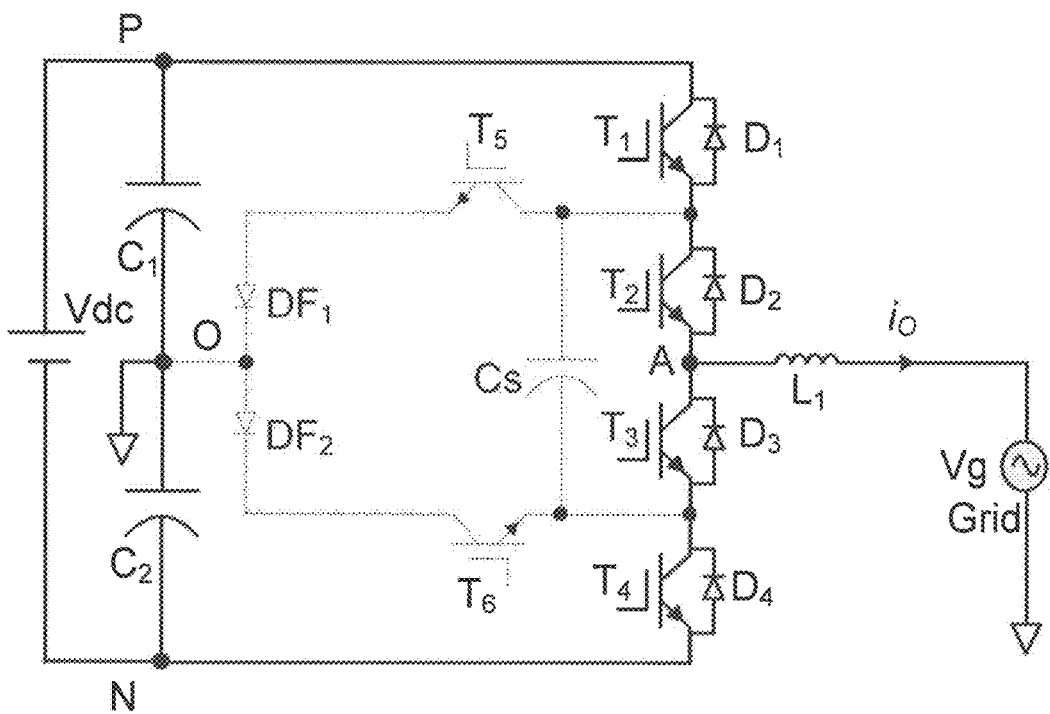

Mode #3:

State A, +2 voltage level as shown in FIG. 4A, and state H, −2 voltage level as shown in FIG. 4H, are combined to construct leg voltage $V_{AO}$. In this case, the flying capacitor is not connected in the circuit and does not participate in the energy transfer and its voltage does not change. The pulse width of the +2 voltage level and −2 voltage level are selected in such a way that the leg voltage $V_{AO}$ in one line period produces a low frequency voltage that is same as the reference voltage. This is equivalent to the two voltage level modulation based on the definition provided earlier in this specification. The equivalent circuit of Mode #3 during opposite direction operation is shown in FIG. 5C where Cs, T5, T6, $DF_1$, and $DF_2$ are disconnected from the circuit.

It is noted that the operation Mode #1, Mode #2, and Mode #3 described above are only used during opposite direction operation. During these operating modes, the voltage across the flying capacitor either does not change (flying capacitor is disconnected) or changes very small (flying capacitor is charged and discharged alternatively between one voltage level and the next voltage level).

When power factor of the inverter is unity, PF=1, as shown in FIG. 6, the grid voltage and inverter output current are in same polarity for the complete line period and therefore, there is no opposite direction operation. The leg voltage $V_{AO}$ is a five-level waveform, as shown in FIG. 6.

In the positive half period of the grid voltage, the output current is also positive, the $V_{AO}$ is between 0 and $V_{dc}/4$ during [t0, t2] and [t3, t4] (when the grid voltage is 0<vg<$V_{dc}/4$). The circuit operates in the sequence of state B (+1 voltage level, flying capacitor charging), state D (0 voltage level, no current in the flying capacitor), state C (capacitor discharging), state D, state B, and so on. The $V_{AO}$ is between $V_{dc}/4$ and $V_{dc}/2$ during [t2, t3] (when the grid voltage $V_{dc}/4$<vg<$V_{dc}/2$). The circuit operates in the sequence of state A (+2 voltage level, no current through flying capacitor), state B (flying capacitor charging), state A, state C (flying capacitor discharging), state A, and so on.

Similarly, in the negative half period of the grid voltage, the output current is also negative, the $V_{AO}$ is between 0 and −Vdc/4 during [t4, t6] and [t7, t8] (when the grid voltage −$V_{dc}/4$<vg<0). The circuit operates in the sequence of state F (−1 voltage level, flying capacitor discharging), state E (0 voltage level, no current in flying capacitor), state G (−1 voltage level, flying capacitor charging), state E, state F, and so on. The $V_{AO}$ is between −Vdc/4 and −Vdc/2 during [t6, t7] (the grid voltage −$V_{dc}/2$<vg<−$V_{dc}/4$). The circuit operates in the sequence of state H (−2 voltage level, no current through flying capacitor), state G (−1 voltage level, flying capacitor charging), state H, state F (−1 voltage level, flying capacitor discharging), state H, and so on.

Figure 7:
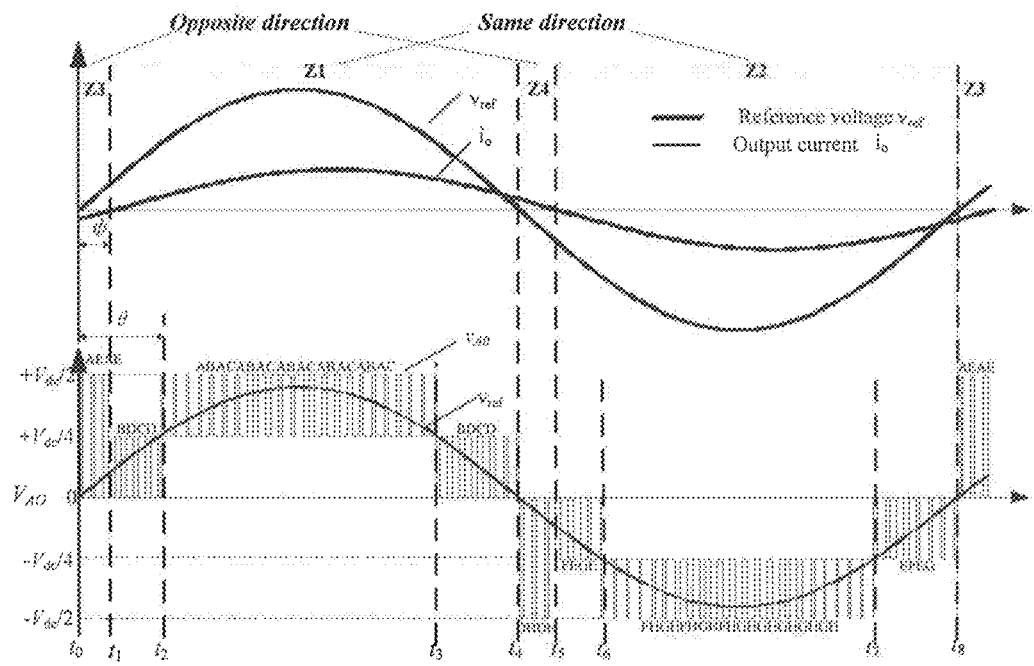
FIG. 7 is a plot showing voltage and current waveforms for the circuit of FIG. 3, operating under modulation Mode #1 and ϕ<θ, according to an embodiment of the invention.

When the power factor of the inverter is less than 1, PF<1, as shown in FIG. 7, it is assumed that the output current delays the output voltage by φ degree. Based on the hybrid modulation strategy described herein, the inverter is in same direction operation from t1 to t4 and from t5 to t8. The inverter is in opposite direction operation from t0 to t1 and from t4 to t5. Therefore, according to one embodiment, for a 6S-5L-ANPC, a hybrid modulation strategy may be described as follows:

Ib. When the polarities of the output voltage and output current of the inverter are the same (same direction operation), five voltage level modulation is used to generate the leg voltage, $V_{AO}$.

IIb. When the polarities of the output voltage and output current of the inverter are opposite (opposite direction operation), two voltage level modulation or three voltage level modulation is used to generate the leg voltage $V_{AO}$. The selection of two voltage level modulation or three voltage level modulation is such that the switching states with which the flying capacitor is not active or a pair of switching states with which the flying capacitor voltage can be balanced are used so that the ripple voltage across the flying capacitor is minimized.

According to an embodiment where Mode #1 is selected for opposite direction operation, the hybrid modulation strategy may be described as follows:

Ic. When the polarities of the output voltage and output current of the inverter are the same (same direction operation), five voltage level modulation is used to generate the leg voltage, $V_{AO}$.

IIc. When the polarities of the output voltage and output current of the inverter are opposite (opposite direction operation), two voltage level modulation is used to generate the leg voltage $V_{AO}$, where the flying capacitor does not participate in the energy transfer.

According to an embodiment where Mode #2 is selected for opposite direction operation, the hybrid modulation strategy may be described as follows:

Id. When the polarities of the output voltage and output current of the inverter are the same (same direction operation), five voltage level modulation is used to generate the leg voltage, $V_{AO}$.

IId. When the polarities of the output voltage and output current of the inverter are opposite (opposite direction operation), three voltage level modulation is used to generate the leg voltage $V_{AO}$, where the flying capacitor is charged at one voltage level and discharged at the other voltage level and therefore, the voltage ripple across the flying capacitor is reduced or eliminated.

According to an embodiment where Mode #3 is selected for opposite direction operation, the hybrid modulation strategy may be described as follows:

Ie. When the polarities of the output voltage and output current of the inverter are the same (same direction operation), five voltage level modulation is used to generate the leg voltage, $V_{AO}$.

IIe. When the polarities of the output voltage and output current of the inverter are opposite (opposite direction operation), two voltage level modulation is used to generate the leg voltage $V_{AO}$, where the flying capacitor does not participate in the energy transfer process.

To summarize, the above description provides possible implementations of hybrid modulation embodiments for a five level inverter with a flying capacitor. Other implementations may also be found that can achieve small voltage ripple across the flying capacitor. The methods may be extended to other multilevel inverters, such as seven level inverter, nine level inverter, etc. For other multilevel inverters, the following terms are defined:

Nominal level: The highest level of modulation for a multilevel inverter with flying capacitor. For example, the nominal level is seven for a seven level inverter. The nominal level is nine for a nine level inverter.

Lower level: A lower level of modulation for a multilevel inverter with flying capacitor. For example, a lower level for a seven level inverter may be five level, three level, or two level modulation. The lower level for a nine level inverter may be seven level, five level, three level, or two level modulation.

Therefore, for multilevel inverters in general, the hybrid modulation strategy may be described as follows:

If. When the polarities of the output voltage and output current of a multilevel inverter are same (same direction operation), the nominal level modulation is used to generate the leg voltage $V_{AO}$.

IIf. When the polarities of the output voltage and output current of a multilevel inverter are opposite (opposite direction operation), a lower level modulation is used to generate the leg voltage $V_{AO}$. The selection of the lower level modulation is such that either the flying capacitor does not participate in the energy transfer process (i.e., it is disconnected from the circuit) or the flying capacitor is charged and discharged alternately between one voltage level and the other voltage level.

For example, for a seven level inverter with flying capacitor, when the polarities of the output voltage and output current of the inverter are same (same direction operation), nominal seven level modulation is used to generate the leg voltage $V_{AO}$. When the polarities of the output voltage and output current of the seven level inverter are opposite (opposite direction operation), five level modulation, or three level modulation, or two level modulation may be used. With five, three, or two level modulation, either the flying capacitor is disconnected from the circuit (i.e., it does not participate in the energy transfer) or the flying capacitor is charged and discharged alternatively between one voltage level and the other voltage level.

The following are examples of hybrid modulation implementations for a five level inverter.

Example 1

PF<1 and output current lags voltage by $\phi$, and $\phi<0$ with modulation Mode #1, where $\theta$ is defined by equations (3) and (4), above.

FIG. 7 shows the waveforms under $<\theta$. It is noted that with $\phi<\theta$, at the zero crossing point of the output current (t1), the grid voltage, which is almost same as the fundamental component of the leg voltage ($V_{AO}$), is less than Vdc/4, as can be inferred from equations (3) and (4).

When the polarities of the output voltage and output current are same (same direction operation), such as from t1 to t4 and from t5 to t8, normal five level modulation is used. Five discrete voltage levels can be observed at the leg voltage $V_{AO}$ as shown in FIG. 7.

Under opposite direction operation (the polarities of the output voltage and output current are opposite), modulation Mode #1 is used.

When the output voltage is positive and the output current is negative, from t0 to t1, operating zone Z3, the leg voltage $V_{AO}$ is the combination of state A (+Vdc/2) and state E (0 voltage with negative current). When the output voltage is negative and the output current is positive, from t4 to t5, operating zone Z4, the leg voltage $V_{AO}$ is the combination of state D (0 voltage with positive current) and state H (−Vdc/2). In this case, the flying capacitor is disconnected from the circuit (i.e., it does not participate in the energy transfer process). This is equivalent to three level modulation with flying capacitor disconnected from the circuit operation. Three discrete voltage levels (+Vdc/2, 0, and −Vdc/2 with voltage difference between adjacent states being Vdc/2) can be observed at the leg voltage $V_{AO}$ as shown in FIG. 7.

Similarly to FIG. 6, in FIG. 7, the letters A to H refer to the switching states A to H in Table 1, and show a possible sequence of the switching states. For example, from t0 to t1 time interval, the switching state sequence is from State A to State E to State A to State E, and then repeats. From t1 to t2 time interval, the switching state sequence is from State B to State D to State C to State D, and then repeats. From t2 to t3 time interval, the switching state sequence is from State A to State B to State A to State C, and then repeats.

Example 2

PF<1 and output current lags voltage by $\phi$ and $\phi<\theta$ with modulation Mode #2

Figure 8:
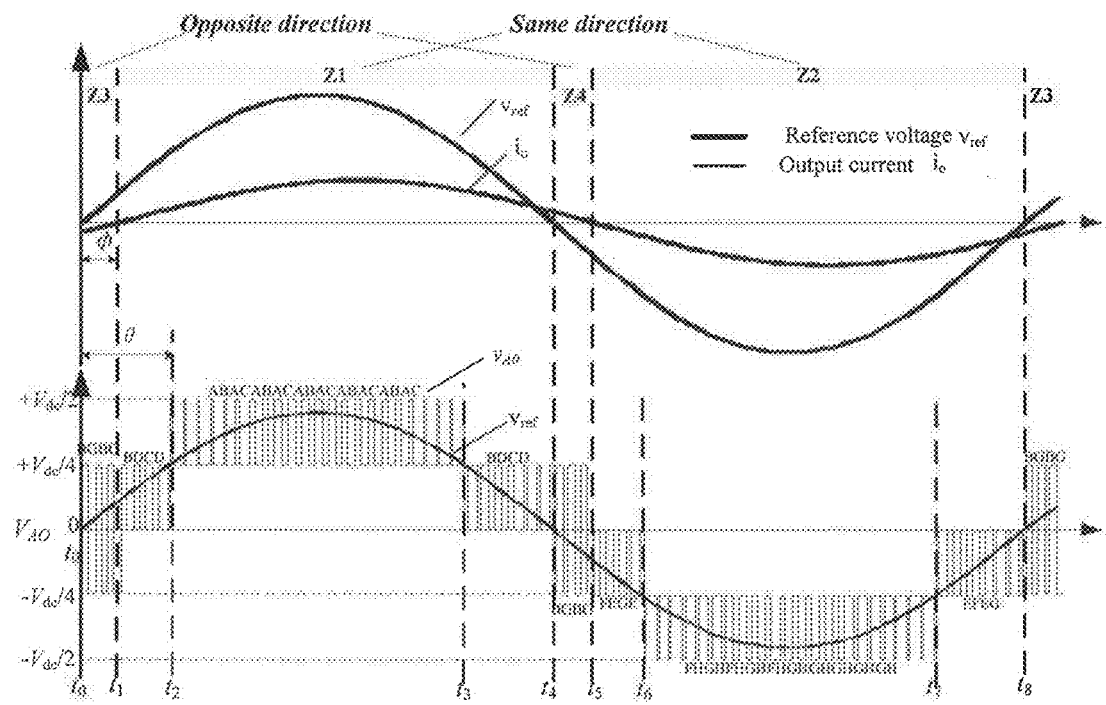
FIG. 8 is a plot showing voltage and current waveforms for the circuit of FIG. 3, operating under modulation Mode #2 and ϕ<θ, according to an embodiment of the invention.

FIG. 8 shows the waveforms under $\phi<\theta$ and with modulation Mode #2. When the polarities of the output voltage and output current are same (same direction operation), such as from t1 to t4 and from t5 to t8, normal five level modulation is used. Five discrete voltage levels can be observed at the leg voltage $V_{AO}$ as shown in FIG. 8.

Under opposite direction operation (the polarities of the output voltage and output current are opposite), modulation Mode #2 is used.

When the output voltage is positive and output current is negative, from t0 to t1, operating zone Z3, the leg voltage $V_{AO}$ is the combination of state B (+Vdc/4 with bi-directional current) and state G (−Vdc/4 with bi-directional current). In this case, the flying capacitor is discharged at state B and charged at state G by the negative output current.

When the output voltage is negative and the output current is positive, from t4 to t5, operating zone Z4, the leg voltage $V_{AO}$ is also the combination of state B and state G. In this case, the flying capacitor is charged at state B and discharged at state G by the positive output current. The pulse width of state B and state G determines the positive or negative average voltage value. This is equivalent to three level modulation. Two discrete voltage levels (+Vdc/4 and −Vdc/4 with voltage difference between adjacent states being Vdc/2) can be observed at the leg voltage $V_{AO}$ as shown in FIG. 8.

Example 3

PF<1 and output current lags voltage by φ and φ<θ with modulation Mode #3

Figure 9:
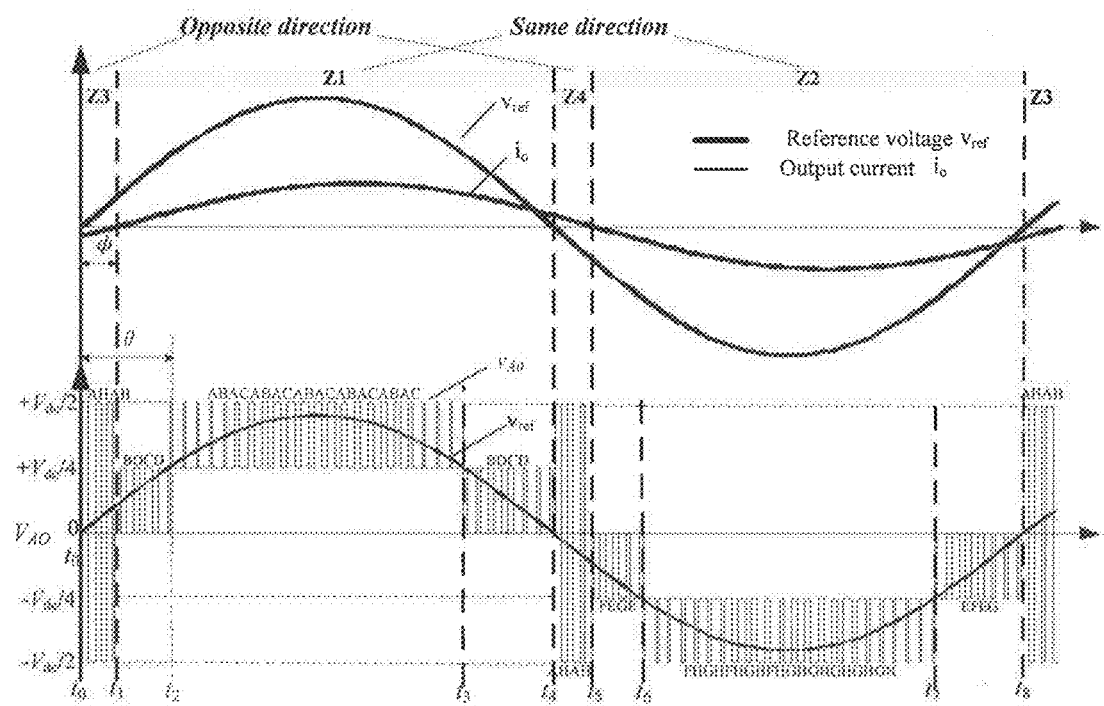
FIG. 9 is a plot showing voltage and current waveforms for the circuit of FIG. 3, operating under modulation Mode #3 and φ<θ, according to an embodiment of the invention.

FIG. 9 shows the waveforms under φ<θ and with modulation Mode #3. When the polarities of the output voltage and output current are same (same direction operation), such as from t1 to t4 and from t5 to t8, normal five level modulation is used. Five discrete voltage levels can be observed at the leg voltage $V_{AO}$ as shown in FIG. 9.

Under opposite direction operation (the polarities of the output voltage and output current are opposite), modulation Mode #3 is used.

When the output voltage is positive and the output current is negative, from t0 to t1, operating zone Z3, the leg voltage $V_{AO}$ is the combination of state A (−Vdc/2) and state H (−Vdc/2). In this case, the flying capacitor is disconnected from the circuit (i.e., it does not participate in the energy transfer process). The pulse width of state A and state H determines the positive or negative average voltage value of the output voltage. This is equivalent to two level modulation. Two discrete voltage levels (+Vdc/2 and −Vdc/2 with voltage difference between adjacent states being Vdc) can be observed at the leg voltage $V_{AO}$ as shown in FIG. 9.

Example 4

PF<1 and output current lags voltage by φ and φ>θ with modulation Mode #1

It is noted that with φ>θ, at the zero crossing point of the output current (t2), the grid voltage, which is almost same as the fundamental component of the leg voltage ($V_{AO}$), is higher than Vdc/4, as can be inferred from equations (3) and (4).

FIG. 10 shows the waveforms under φ>θ and with modulation Mode #1. When the polarities of the output voltage and the output current are same (same direction operation), such as from t2 to t4 and from t6 to t8, normal five level modulation is used. Five discrete voltage levels can be observed at the leg voltage $V_{AO}$ as shown in FIG. 10.

Under opposite direction operation (the polarities of the output voltage and output current are opposite), modulation Mode #1 is used.

When the output voltage is positive and the output current is negative, from t0 to t2, operating zone Z3, the leg voltage $V_{AO}$ is the combination of state A (Vdc/2) and state E (0 voltage with negative current). When the output voltage is negative and the output current is positive, from t4 to t6, operating zone Z4, the leg voltage $V_{AO}$ is the combination of state D (0 voltage with positive current) and state H (−Vdc/2). In this case, the flying capacitor is disconnected from the circuit (i.e., it does not participate in the energy transfer process). This is equivalent to three level modulation with flying capacitor disconnected from the circuit operation. Three discrete voltage levels (+Vdc/2, 0 and −Vdc/2 with voltage difference between adjacent states being Vdc/2) can be observed at the leg voltage $V_{AO}$ as shown in FIG. 10.

Example 5

PF<1 and output current lags voltage by φ and φ>θ with modulation Mode #1 and Mode #2

Figure 11:
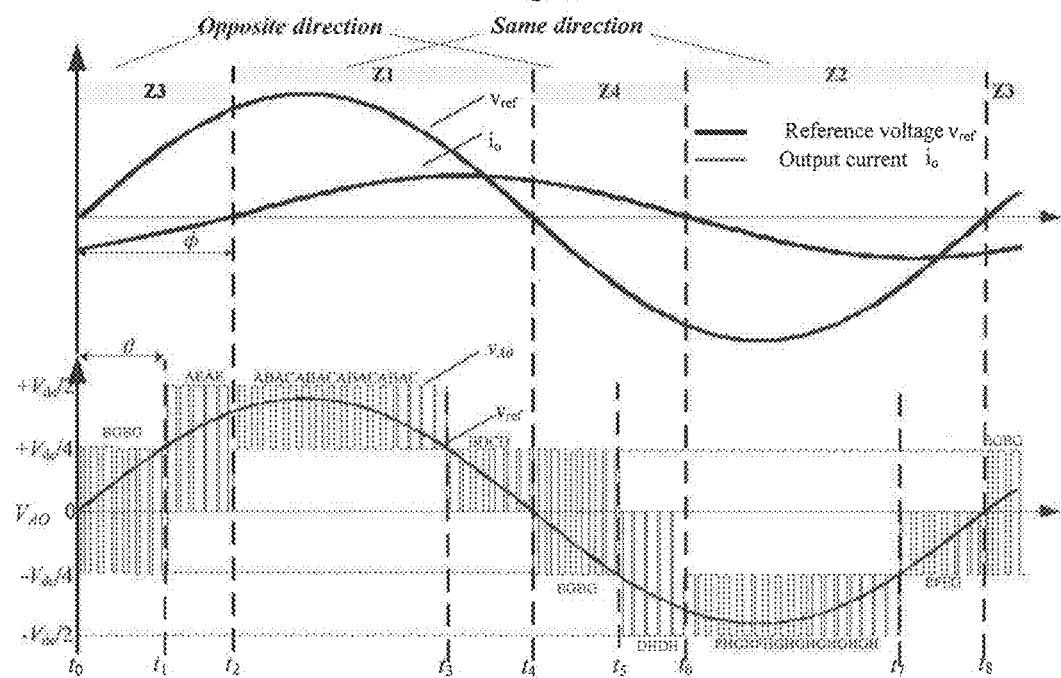
FIG. 11 is a plot showing voltage and current waveforms for the circuit of FIG. 3, operating under modulation Mode #1 and modulation Mode #2, and φ>θ, according to an embodiment of the invention.

FIG. 11 shows the waveforms under φ>θ and with modulation Mode #1 and Mode #2. When the polarities of the output voltage and the output current are same (same direction operation), such as from t2 to t4 and from t6 to t8, normal five level modulation is used. Five discrete voltage levels can be observed at the leg voltage $V_{AO}$ as shown in FIG. 11.

Under opposite direction operation (the polarities of the output voltage and output current are opposite), modulation Modes #1 and #2 are used.

When the output voltage is positive and the output current is negative, from t0 to t1, operating zone Z3, the leg voltage $V_{AO}$ is the combination of state B (+Vdc/4 with bi-directional current) and state G (−Vdc/4 with bi-directional current). In this case, the flying capacitor is discharged at state B and charged at state G by the negative output current. The pulse width of state B and state G are selected so that a positive output voltage is generated. This is equivalent to three level modulation with flying capacitor charged and discharged alternatively between one voltage level and the next voltage level. From t1 to t2, operating zone Z3, the leg voltage $V_{AO}$ is the combination of state A (Vdc/2) and state E (0 voltage with negative current). In this case, the flying capacitor is disconnected from the circuit (i.e., it does not participate in the energy transfer process). This is equivalent to three level modulation with the flying capacitor disconnected from the circuit (i.e., it does not participate in the energy transfer process).

When the output voltage is negative and the output current is positive, from t4 to t5, operating zone Z4, the leg voltage $V_{AO}$ is the combination of state B and state G. In this case, the flying capacitor is charged at state B and discharged at state G by the positive output current. The pulse width of state B and state G are selected so that a negative output voltage is generated. This is equivalent to three level modulation with the flying capacitor charged and discharged alternatively between one voltage level and the next voltage level. From t5 to t6, operating zone Z4, the leg voltage $V_{AO}$ is the combination of state D (0 voltage with positive current) and state H (−Vdc/2). This is equivalent to three level modulation with the flying capacitor disconnected from the circuit (i.e., it does not participate in the energy transfer process). From t0 to t1 and t4 to t5, two discrete voltage levels (+Vdc/4 and −Vdc/4 with voltage difference between adjacent states being Vdc/2) can be observed at the leg voltage $V_{AO}$ as shown in FIG. 11. From t1 to t2 and t5 to t6, three discrete voltage levels (+Vdc/2, 0 and −Vdc/2 with voltage difference between adjacent states being Vdc/2) can be observed at the leg voltage $V_{AO}$ as shown in the figure.

Example 6

PF<1 and output current lags voltage by φ and φ>θ with modulation Mode #3

Figure 12:
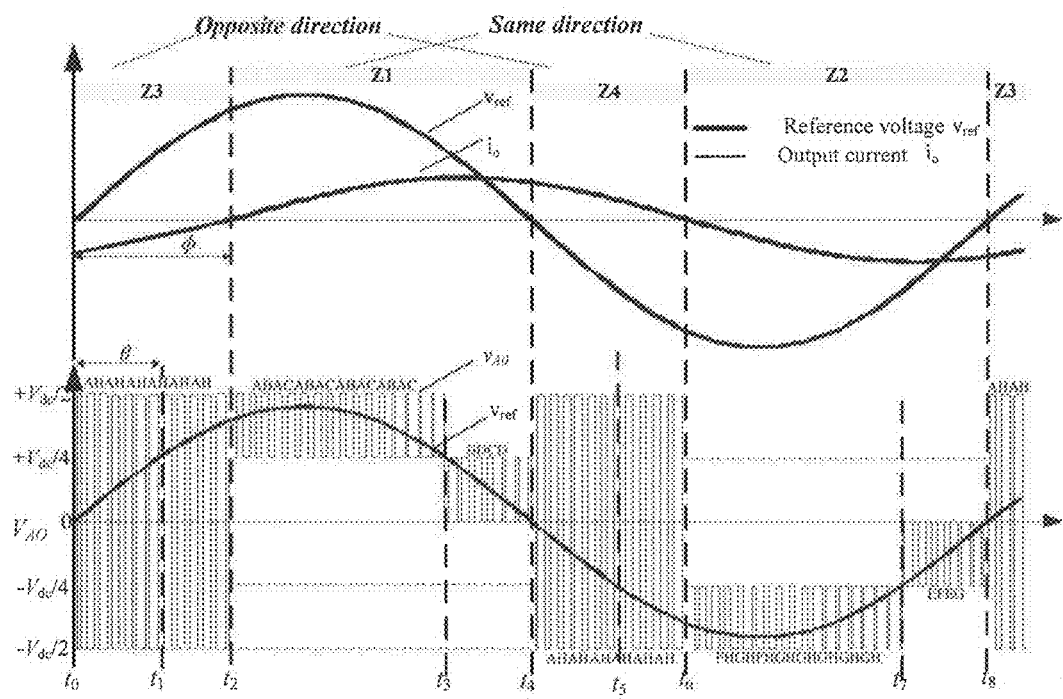
FIG. 12 is a plot showing voltage and current waveforms for the circuit of FIG. 3, operating under modulation Mode #3 and φ>θ, according to an embodiment of the invention.

FIG. 12 shows the waveforms under φ>θ and with modulation Mode #3. When the polarities of the output voltage and the output current are the same (same direction operation), such as from t2 to t4 and from t6 to t8, normal five level modulation is used. Five discrete voltage levels can be observed at the leg voltage $V_{AO}$ as shown in the figure.

Under opposite direction operation (the polarities of the output voltage and output current are opposite), modulation Mode #3 is used.

When the output voltage is positive and the output current is negative, from t0 to t2, operating zone Z3, the leg voltage $V_{AO}$ is the combination of state A (−Vdc/2) and state H (−Vdc/2). In this case, the flying capacitor is disconnected from the circuit (i.e., it does not participate in the energy transfer process). The pulse width of state A and state H determines the positive or negative average voltage value of the output voltage. This is equivalent to two level modulation with the flying capacitor disconnected from the circuit (i.e., it does not participate in the energy transfer process). Two discrete voltage levels (+Vdc/2 and −Vdc/2 with voltage difference between adjacent states being Vdc) can be observed at the leg voltage $V_{AO}$ as shown in FIG. 12.

It is noted that Examples 4, 5, and 6 cover the case when φ=90°. This means that the hybrid modulation method operates well under pure inductive load and voltage ripple across the flying capacitor is kept very small, for example, as would be obtained for an eight switch inverter.

The above examples describe operation of the hybrid modulation strategy embodiments for an inductive load under single phase operating condition. Similarly, the operation the hybrid modulation strategy for a capacitive load may be derived based on the discussion above, and details are not discussed here.

Hybrid Modulation for Three Phase 6S-5L ANPC Inverter

Figure 13:
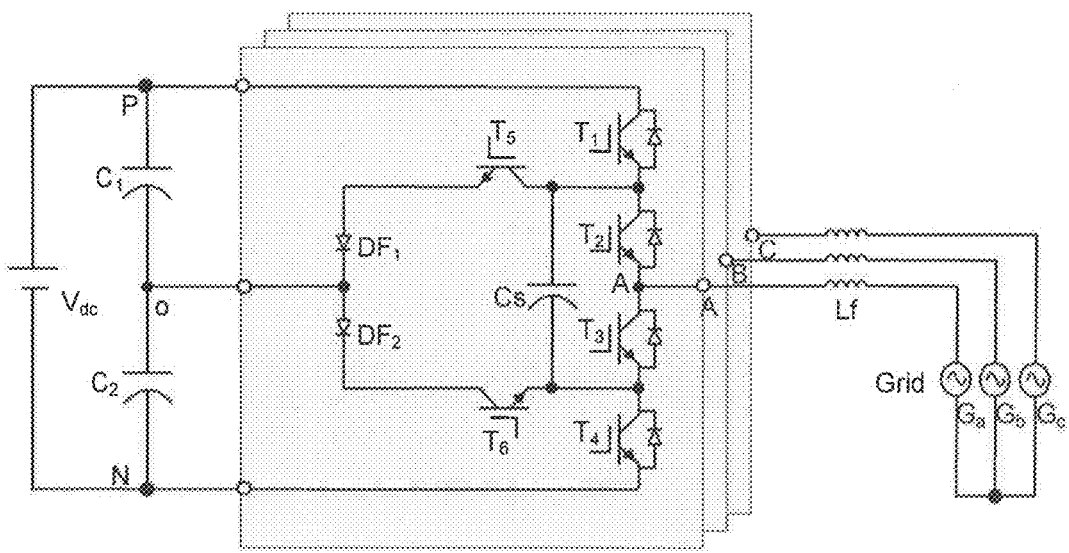
FIG. 13 is a circuit diagram of a conventional three phase 6S 5L-ANPC inverter topology, according to the prior art.

A hybrid modulation strategy as described herein may also be used for a three phase multilevel inverter, such as a six-switch five level ANPC (6S-5L-ANPC) inverter, as shown in FIG. 13.

For a three phase system, SPWM (Sinusoidal Pulse Width Modulation) and SVPWM (Space Vector Pulse Width Modulation) are commonly used. Y connection is commonly used in a three phase system.

Hybrid Modulation Strategy Under SPWM

A hybrid modulation strategy as described herein may be applied to three phase SPWM when the following points are considered:
(1) With a three phase system, the phase voltage polarity might not be available. Only line to line voltage may be available. Considering the phase angle difference between phase voltage and the line voltage is 30 degrees, the phase voltage polarity information can be derived from the line voltage.
(2) The line current is equal to the phase current and can be measured directly.
(3) Each phase (phase A, phase B, and phase C) is controlled independently.
(4) For each phase, when the polarities of the phase voltage and phase current are same, this phase operates at normal five level modulation; when the polarities of the phase voltage and phase current are opposite, three voltage level or two voltage level modulation are used to generate the leg voltage of that phase.
(5) When a zero sequence voltage (see, e.g., references [4-8]) is added to the sine reference voltage to increase the voltage utilization ratio, the hybrid modulation strategy as described above does not change.

For other three phase multilevel inverters (such as seven level, nine level inverters), the hybrid modulation strategy may be applied in the same way based on the discussion above.

Hybrid Modulation Strategy Under SVPWM

Figure 14:
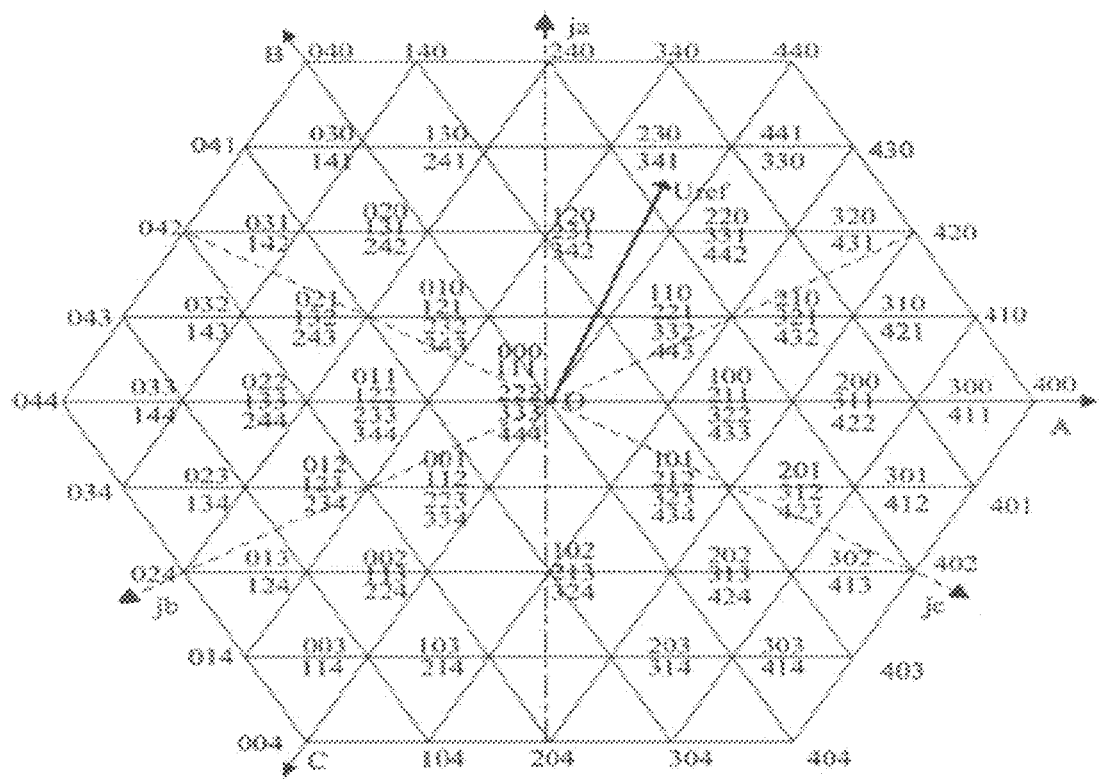
FIG. 14 is a chart showing conventional SVPWM modulation of a five-level inverter.

The 6S-5L-ANPC inverter dc-link has only two capacitors and each phase (A, B, C) has one FC, which simplifies balancing of all the voltages. The space vector pulse width modulation (SVPWM) strategy of the 5L-ANPC converter combines 125 space vectors [4-7] as shown in FIG. 14.

The SVPWM is only applicable to a three phase system. The SVPWM is a digital modulation technique where the purpose is to generate PWM load line voltages. Specifically, the inverter can be driven to 125 space vectors. The task is accomplished by selecting the space vectors of the inverter and also by calculating the appropriate time period for each space vector. A conventional seven segment SVPWM is equivalent to a SPWM with third harmonic injection.

Hybrid modulation as described in the above embodiments may be extended to SVPWM. A three phase current vector is calculated to determine if the inverter is under same direction operation or opposite direction operation. In same direction operation, conventional SVPWM can be applied without any modification.

In opposite direction operation, some vectors are not desired because they will cause large voltage ripple across the flying capacitors. These vectors should be avoided. Therefore, the selection of the vectors should follow the rules below:
(1) The general SVPWM rule should be followed.
(2) Only the desirable vectors are selected so that either the flying capacitors are disconnected from the circuit or the flying capacitors are charged and discharged alternatively among these vectors so that the voltage ripple of the flying capacitor is minimized.

Similarly, hybrid SVPWM modulation for seven level and nine level modulation can also be developed based on the embodiments and criteria described above.

Hybrid Modulation Strategy for NPC Topology

In the above discussion, the ANPC inverter topology was used as an example to show the implementation, advantages, and benefits of the hybrid modulation strategy. The hybrid modulation strategy can also be applied to NPC (Neutral Point Clamp) inverters to achieve a reduced number of switches and performance enhancement. This section describes implementation and analysis of the hybrid modulation strategy in a multilevel NPC inverter. The hybrid modulation strategy is also suitable for multi-level NPC inverter topology to operate under unity power factor (PF=1) and under power factor less than 1 (PF<1). With the hybrid modulation strategy, the number of switches in an NPC inverter can be reduced while achieving the same performance as a conventional topology.

Figure 15A:
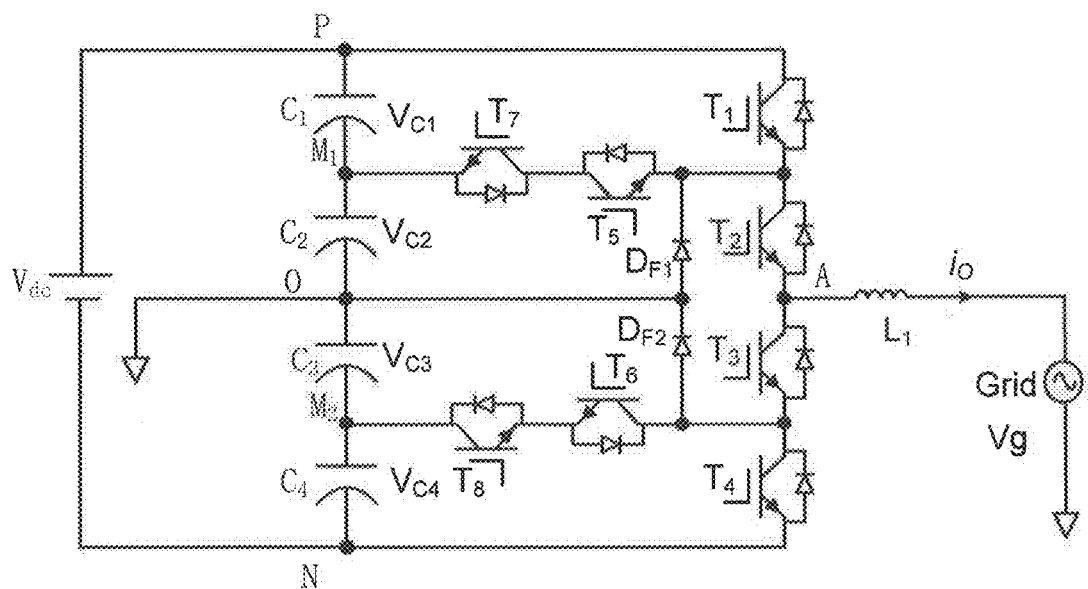
FIG. 15A is a circuit diagram showing a conventional five-level NPC inverter topology.

A five-level NPC inverter is shown in FIG. 15A. C1, C2, C3, and C4 are DC capacitors that divide the input DC voltage (Vdc) into lower voltages. For the purpose of this description, the following assumptions are made:
(1) A single phase five-level NPC inverter circuit is used as an example to describe the operation of the hybrid modulation strategy.
(2) In a practical three phase application, three inverter circuits are connected to form a three-phase circuit. The DC source (e.g., PV panel), DC-DC converters (not shown), and C1, C2, C3, and C4 are shared by the three circuits in a three-phase inverter application.

(3) A capacitor DC voltage balance circuit is required to make the capacitors voltages equal or set to a desired value. The capacitor DC voltage balance circuit is not shown in FIGS. 15A and 15B.

In FIG. 15A, four capacitors C1, C2, C3, and C4 are connected in series. The middle point between C1 and C2 is M1, the middle point between C3 and C4 is M2. The middle point between C2 and C3 is O, which is the earth ground. The output of the inverter is point A. The leg voltage $V_{AO}$ is the output voltage of the inverter. It produces five discrete voltage levels: Vc1+Vc2, Vc2, 0, −Vc3 and −Vc3−Vc4.

In general, the voltage Vc2=Vc3=Vx, and Vc1=Vc4=Vy, where Vx+Vy=Vdc/2, to achieve symmetrical leg voltage waveform. A special case is when the voltages of the four capacitors are same, Vc1=Vc2=Vc3=Vc4=Vdc/4.

The hybrid modulation strategy can also reduce the number of switches of the NPC topology. Under hybrid modulation, unidirectional current flows from point M1 to point A, and from point A to point M2. Therefore, the NPC five level inverter shown in FIG. 15A may be simplified to the five level NPC inverter shown in FIG. 15B.

Figure 15B:
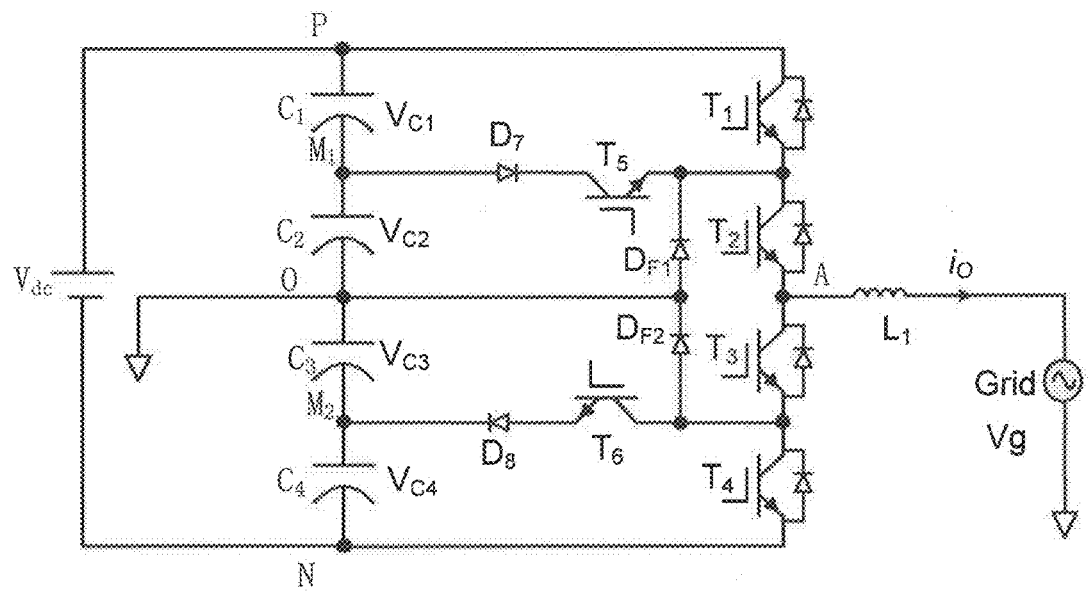
FIG. 15B is a circuit diagram showing a simplified five-level NPC inverter topology.
Figure 16A:
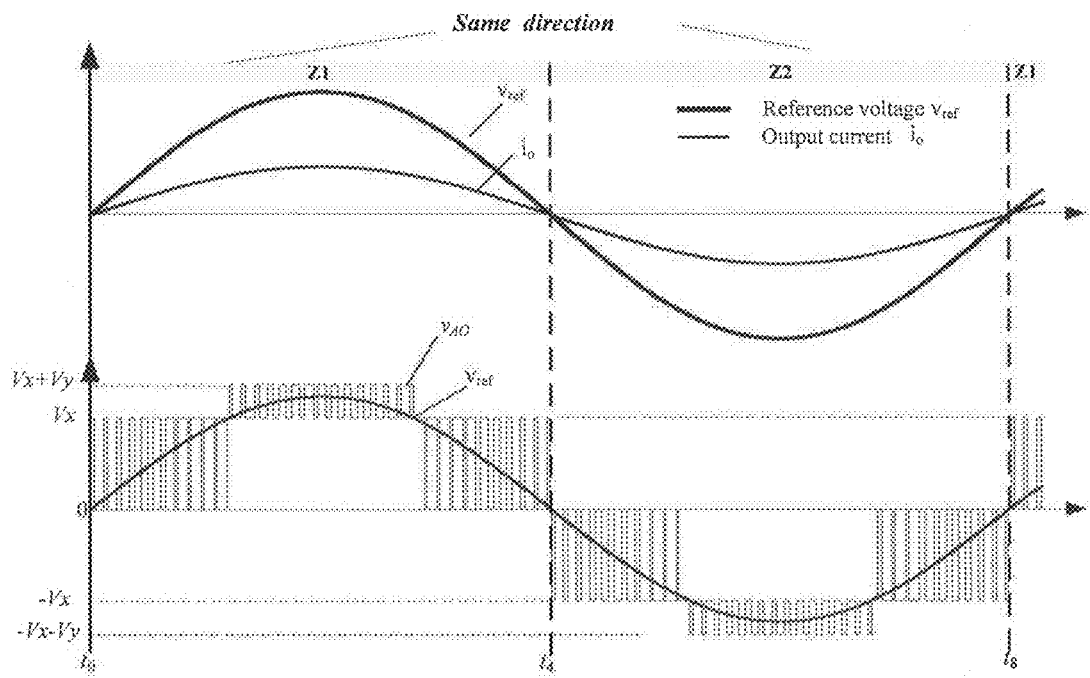
FIG. 16A is a plot showing voltage and current waveforms for hybrid modulation of the circuit of FIG. 15B with PF=1, according to an embodiment described herein.

FIG. 16A shows the waveforms for the embodiment of FIG. 15B with the hybrid modulation strategy under PF=1. Under PF=1, the inverter is under same direction operation and the conventional five-level modulation strategy can be used.

Figure 16B:
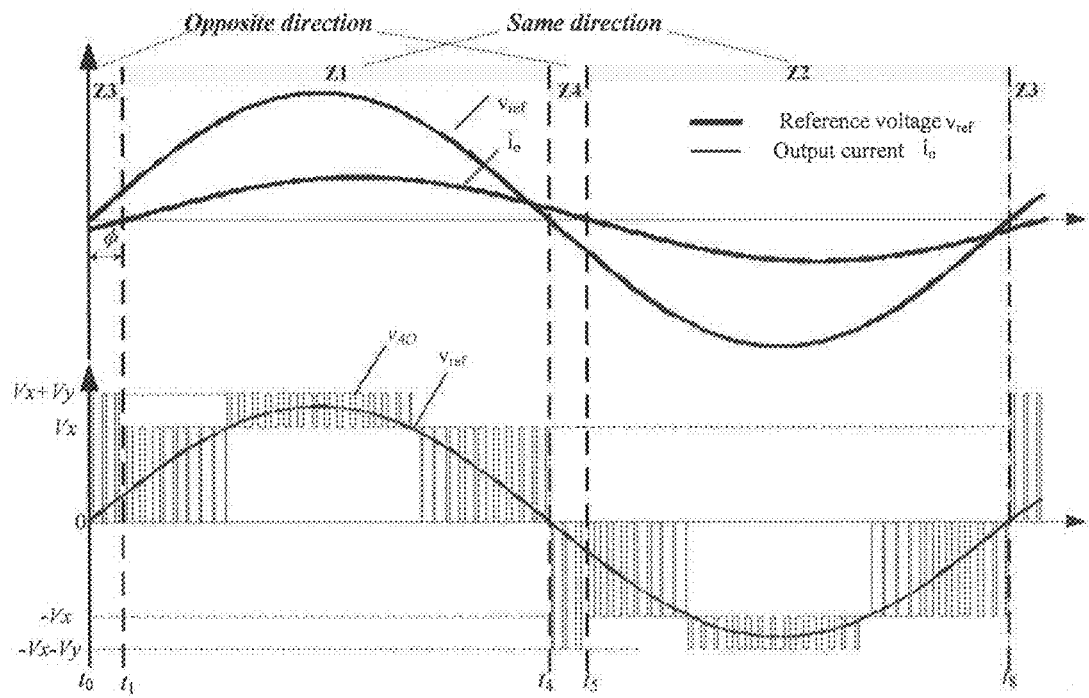
FIGS. 16B and 16C are plots showing hybrid modulation of the circuit of FIG. 15B with PF<1, according to embodiments described herein.
Figure 16C:
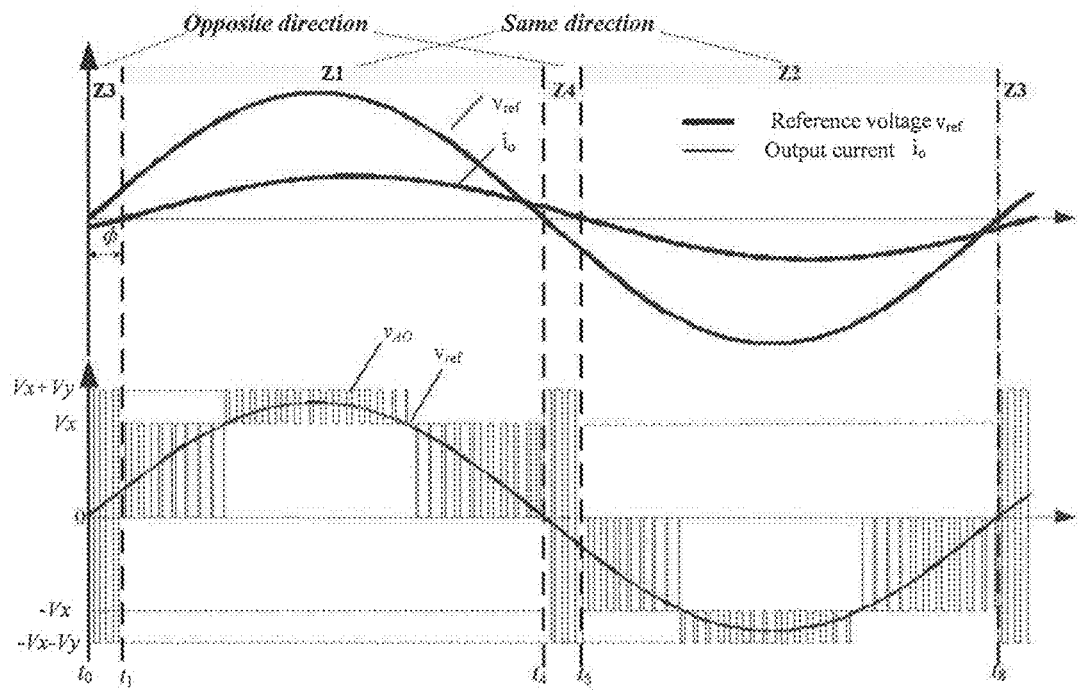

FIG. 16B and FIG. 16C show two examples of waveforms with hybrid modulation strategies under the condition of PF<1. In the waveforms, it is assumed that the output current lags the grid voltage by φ degree. However, the analysis is valid for the case when the output current leads the grid voltage.

FIG. 16B shows the case during same direction operation when the polarities of the output current and output voltage are same, five level modulation is used, and the leg voltage $V_{AO}$ consists of five discrete voltage levels, Vx+Vy, Vx, 0, −Vx, and −Vx−Vy. During opposite direction operation when the polarities of the output current and grid voltage are in opposite direction (t0 to t1 and t4 to t5), three level modulation is used. During t0 to t1, voltage levels Vdc/2 and 0V are used. During t4 to t5, voltage levels of −Vdc/2 and 0V are used. Therefore, according to this embodiment, the hybrid modulation strategy may be described as follows:

Ig. When the polarities of the output voltage and output current of the inverter are the same (same direction operation), five voltage level modulation is used to generate the leg voltage $V_{AO}$.

IIg. When the polarities of the output voltage and output current of the inverter are opposite (opposite direction operation), three voltage level modulation is used to generate the leg voltage $V_{AO}$.

FIG. 16C shows that during the same direction operation when the polarities of the output voltage and output current are the same, five level modulation is used and the output voltage consists of five discrete voltage levels, Vx+Vy, Vx, 0, −Vx, and −Vx−Vy. During opposite direction operation when the polarities of the output current and grid voltage are in opposite direction (t0 to t1 and t4 to t5), two voltage level modulation is used. The voltage levels are Vdc/2 and −Vdc/2. Therefore, according to this embodiment, the hybrid modulation strategy may be described as follows:

Ih. When the polarities of the output voltage and output current of the inverter are the same (same direction operation), five voltage level modulation is used to generate the leg voltage $V_{AO}$.

IIh. When the polarities of the output voltage and output current of the inverter are opposite (opposite direction operation), two voltage level modulation is used to generate the leg voltage $V_{AO}$.

It can be observed from the above description that the hybrid modulation strategy can be described in more general terms, for all types of five level inverters, such as ANPC and NPC inverters as discussed above:

Ii. When the polarities of the output voltage and output current of the inverter are the same (same direction operation), five voltage level modulation is used to generate the leg voltage $V_{AO}$.

IIi. When the polarities of the output voltage and output current of the inverter are opposite (opposite direction operation), two voltage level or three voltage level modulation is used to generate the leg voltage $V_{AO}$.

With other multi-level inverters, the hybrid modulation strategy may be described in general terms, for all types of multi-level inverters, such as ANPC and NPC inverters, as follows:

Ij. When the polarities of the output voltage and output current of the multilevel inverter are the same (same direction operation), nominal level modulation is used to generate the leg voltage $V_{AO}$.

IIj. When the polarities of the output voltage and output current of the multilevel inverter are the opposite (opposite direction operation), a lower level modulation is used to generate the leg voltage $V_{AO}$.

As can be observed from, e.g., FIG. 7, FIG. 8, FIG. 9, FIG. 10, FIG. 11, FIG. 12, and FIGS. 16A-16C, a key feature of the hybrid modulation strategy may be identified from the waveforms of the leg voltage $V_{AO}$ as follows:

Over one complete line period (50 Hz or 60 Hz), both nominal level modulation and lower level modulation are used, where the definition of "nominal level modulation" and "lower level modulation" are as defined above. That is, for some portions of the line period, nominal level modulation is used and for the other portions of the same line period, lower level modulation is used.

For example, for a five level inverter, for some portions of the line period (under same direction operation), five level modulation is used and for the other portions of the same line period (opposite direction operation), three level or two level modulation is used. Similarly, for a four level inverter, for some portions of the line period, four level modulation is used and for the other portions of the same line period, two level modulation is used.

It is noted that the conventional modulation method does not have the above feature. Instead, conventional methods use five level, or four level, or three level modulation over the entire line period.

Figure 17:
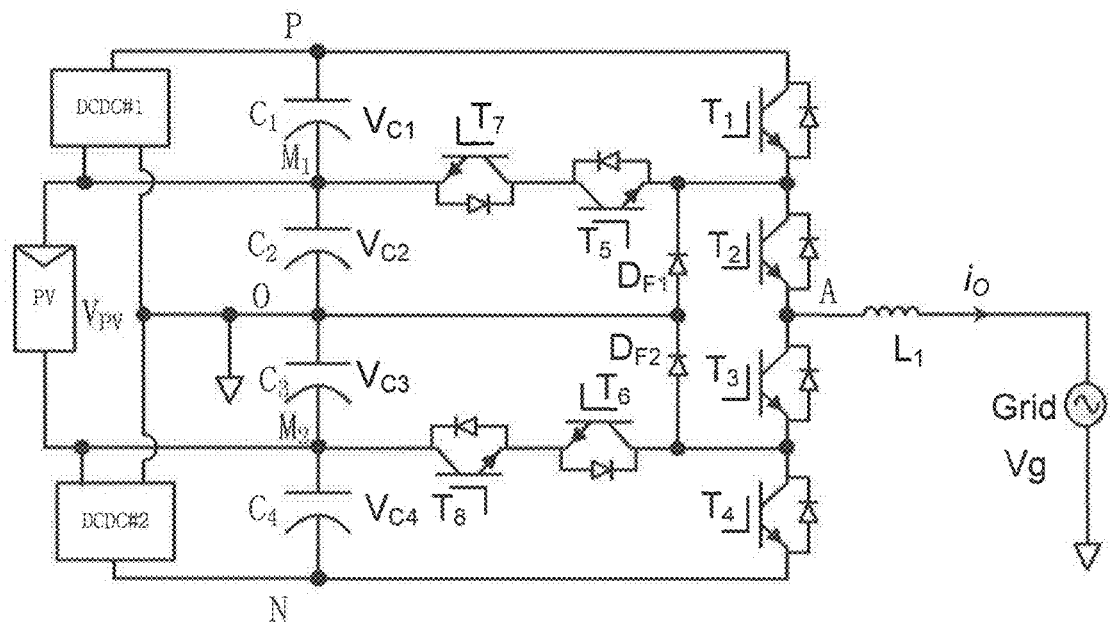
FIG. 17 is a circuit diagram showing a conventional five-level NPC inverter topology with DC-DC converters.

Multilevel inverters are used extensively in PV (photovoltaic) inverter applications. FIG. 17 shows a PV application using the inverter topology shown in FIG. 15A. It is noted that the input DC voltage Vdc is the sum of the $V_{PV}$ (PV output voltage) and Vc1 and Vc4, Vdc=$V_{PV}$+Vc1+Vc4. That is, the voltage between point P and point N is Vdc, $V_{PN}$=Vdc. Also, Vc2=Vc3=Vx and Vc1=Vc4=Vy. In FIG. 17, the capacitor voltage balance is achieved by the PV output voltage and two DC-DC converters, DCDC #1 and DCDC #2. It is noted that only the inverter circuit of one phase is shown in FIG. 17. In a practical implementation, three inverter circuits are connected to form a three-phase circuit. The PV panel, DCDC#1, DCDC#2, and C1, C2, C3, and C4 are shared by the three inverter circuits in the three-phase inverter application. Similarly, with hybrid modulation, switches T7 and T8 can be replaced by diodes D7 and D8. Therefore, the circuit shown in FIG. 17 can be simplified to the circuit shown in FIG. 18.

Figure 18:
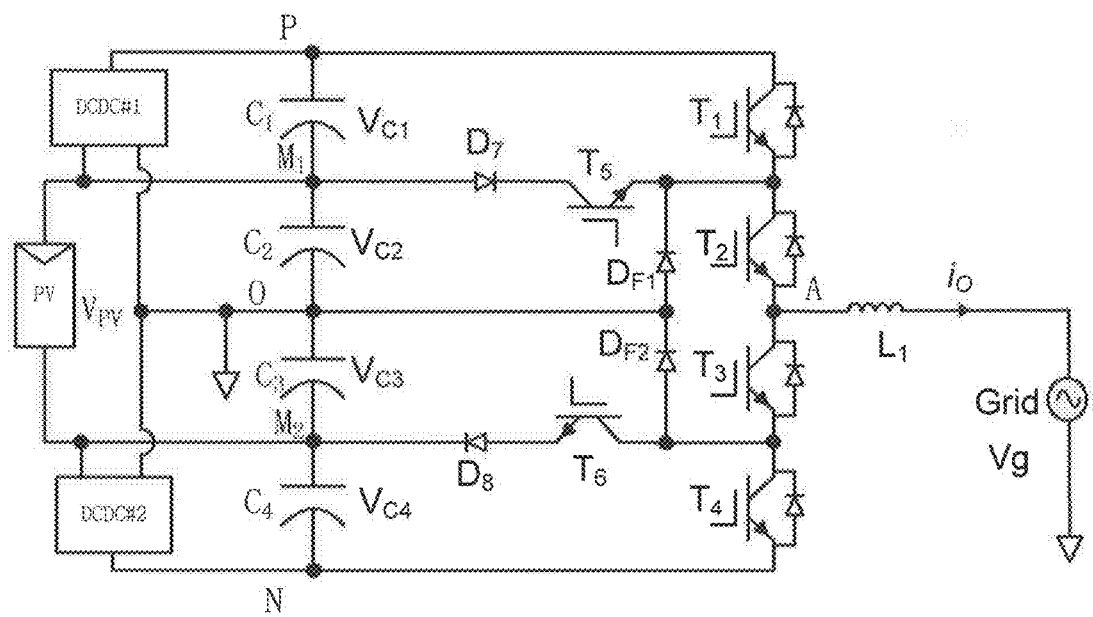
FIG. 18 is a circuit diagram showing a simplified five-level NPC inverter topology with DC-DC converters.

It is observed that the topology shown in FIG. 18 uses five switching states that generate five voltage levels at the leg output ($V_{AO}$) based on capacitor voltages, as shown in Table 2. In the table, for each state, "1" indicates a switch is on and "0" indicates a switch is off. The output current is defined as $i_o$. FIGS. 19A-19E show five different switching states (state A to E) and current flow paths.

TABLE 2

Switching States, Output Voltage, and Current Flow

| Switching State | Switch Number | | | | | | Output Voltage Level | Output Voltage | Bi-Directional Current |
|---|---|---|---|---|---|---|---|---|---|
| | $T_1$ | $T_2$ | $T_3$ | $T_4$ | $T_5$ | $T_6$ | | | |
| State AA | 1 | 1 | 0 | 0 | 0 | 0 | +2 | $V_x + V_y$ | Yes |
| State BB | 0 | 1 | 0 | 0 | 1 | 0 | +1 | $V_x$ | No ($i_o > 0$) |
| State CC | 0 | 1 | 1 | 0 | 0 | 0 | 0 | 0 | Yes |
| State DD | 0 | 0 | 1 | 0 | 0 | 1 | −1 | $-V_x$ | No ($i_o < 0$) |
| State EE | 0 | 0 | 1 | 1 | 0 | 0 | −2 | $-V_x - V_y$ | Yes |

Figure 19A:
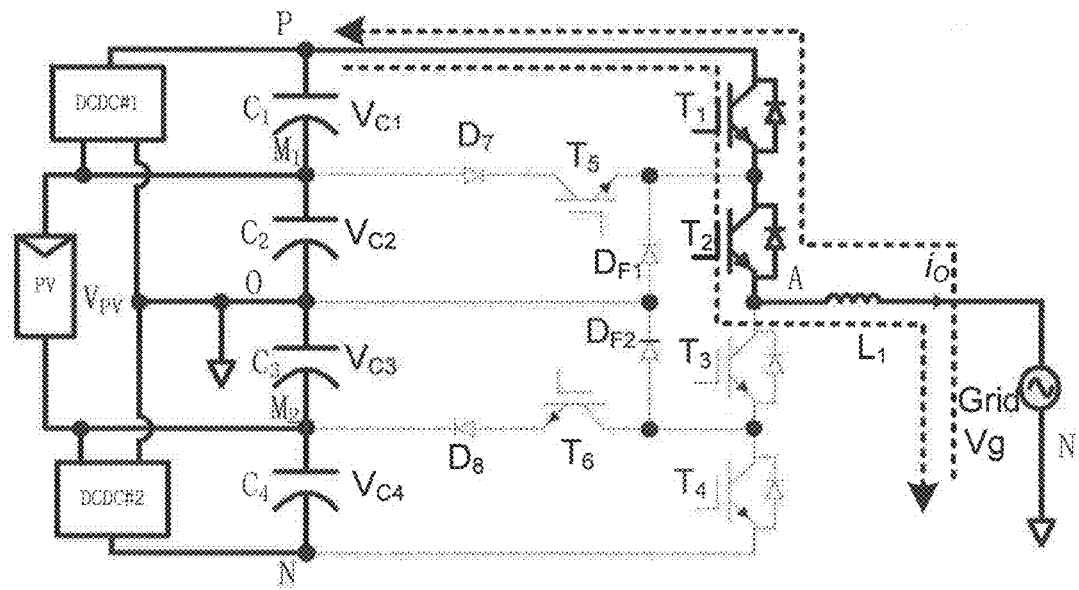
FIGS. 19A-19E are circuit diagrams showing five switching states (A-E) for the circuit of FIG. 18, as set forth in Table 2.

At state AA, T1 and T2 are on and T3, T4, T5, and T6 are off, as shown in FIG. 19A. The current paths are indicated by the dashed lines. The leg voltage $V_{AO}$ is $V_x+V_y$, or at +2 voltage level. It is also noted that bi-directional current can flow in this path. Both positive and negative output current can flow.

Figure 19B:
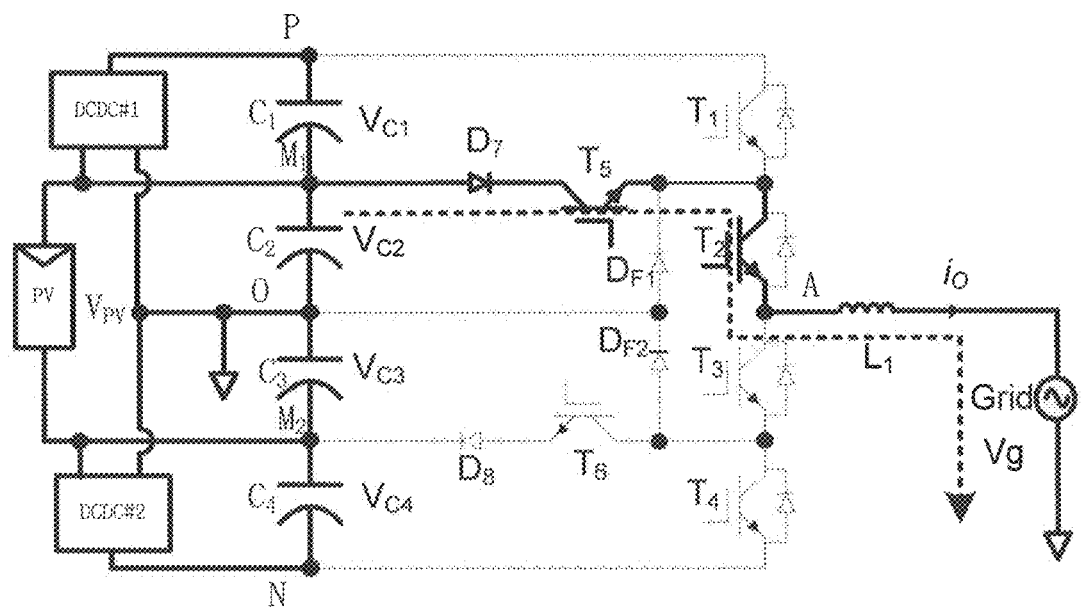

At state BB, T2 and T5 are on, and T1, T3, T4, and T6 are off, as shown in FIG. 19B. The leg voltage $V_{AO}$ is $V_x$, or +1 voltage level. The current path is indicated by the dashed line. The current can only flow in one direction (from M1 to A) because of diode D7. That is, only positive output current can flow through this path.

Figure 19C:
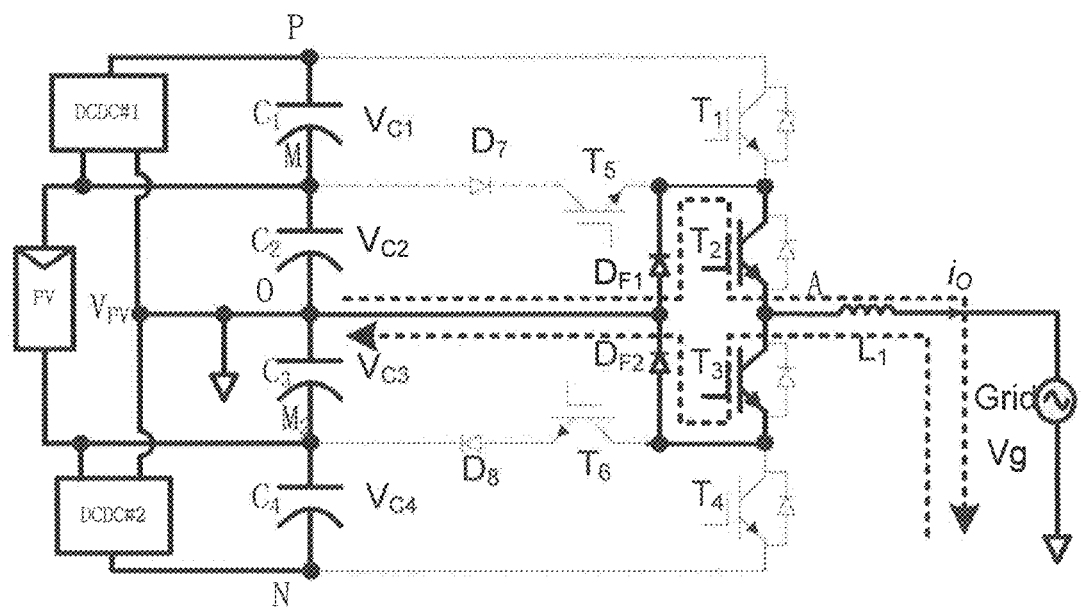
Figure 19D:
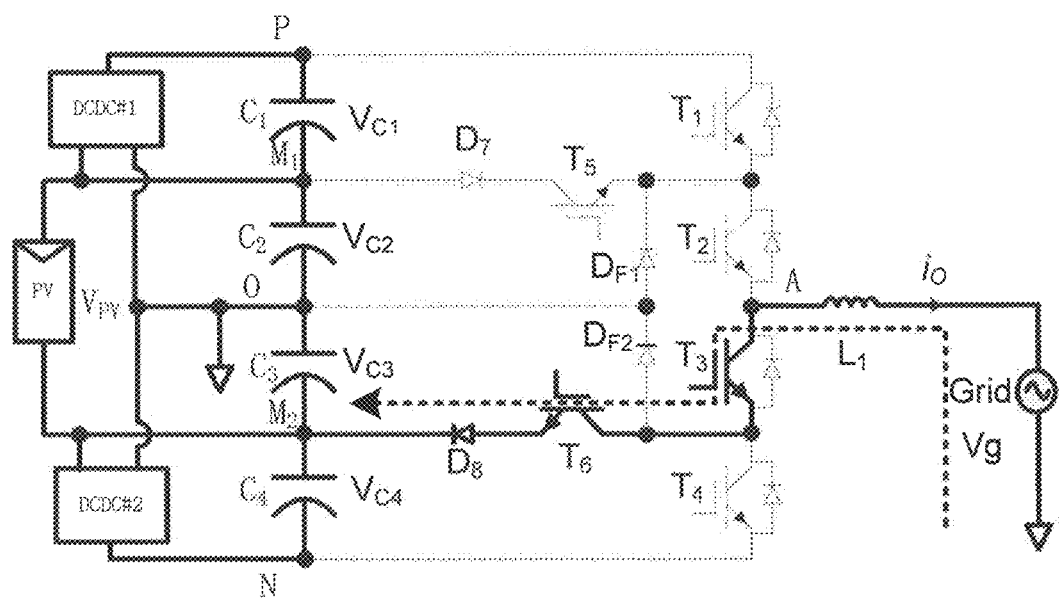

At state CC, T2 and T3 are on, and T1, T4, T5, and T6 are off, as shown in FIG. 19C. The current flows from point O through DF1, and T2 to point A and to the output, or the current flows from point A through T3, and DF2 to point O, as shown by the dashed lines. The leg voltage $V_{AO}$ is 0, or 0 voltage level. Both positive and negative output current can flow.

At state DD, T3 and T6 are on, and T1, 12, T4, and T5 are off, as shown in FIG. 19 D. The leg voltage $V_{AO}$ is $-V_x$, or −1 voltage level. The current path is indicated by the dashed line. The current can only flow in one direction because of diode D8. In other words, only the negative output current can flow through this path.

Figure 19E:
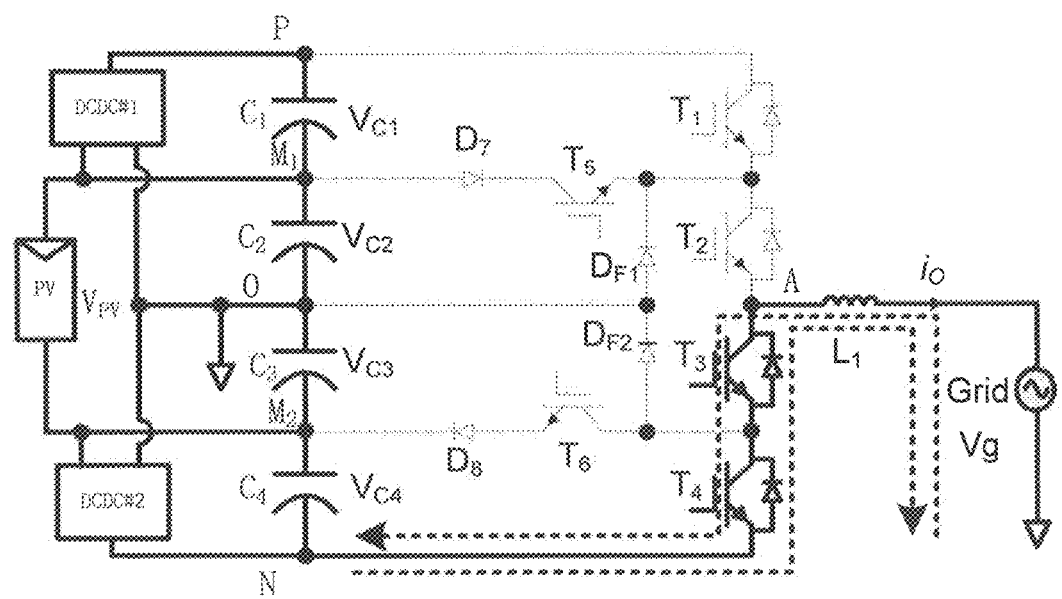

At state EE, T3 and T4 are on and T1, T2, T5 and T6 are off, as shown in FIG. 19E. The current path is indicated by the dashed lines. The leg voltage $V_{AO}$ is $-V_x-V_y$, or at −2 voltage level. It is also noted that bi-directional current flow in this path. Both positive and negative output current can flow.

As discussed above, the output current can only flow in one direction due to the diodes in the circuit for two switching states BB and DD. Therefore, there are limitations for the selection of these two switching states with unidirectional current path. The proper states must be selected to allow positive and negative output current flow. The hybrid modulation strategy shown in FIGS. 16A-16C may also be applied to the simplified circuit shown in FIG. 18.

With the circuit shown in FIG. 18, when the power factor is 1, PF=1, the polarities of the output voltage and output current are always the same. Therefore, five level modulation may be used and the modulation waveforms are shown in FIG. 16A. Since the polarities of the output current and the output voltage are always same, the inverter will operate at state AA (+2 voltage level, positive output current), state BB (+1 voltage level, positive current) and state CC (0 voltage level, bi-directional current) when the output voltage is positive. The inverter will operate at state EE (−2 voltage level, negative output current), state DD (−1 voltage level, negative output current) and state CC (0 voltage level, bi-directional current) when the output voltage is negative. Therefore, five voltage level modulation is achieved.

When PF<1, during t1 to t4 and t5 to t8, the polarities of the output current and output voltage are same, and the inverter is at same direction operation. Five voltage level modulation may be used to generate the output voltage. During t0 to t1 and t4 to t5, the polarities of the output voltage and output current are opposite, and the inverter is in opposite direction operation. During t0 to t1 period, the output voltage is positive, which requires under either state AA or state BB. However, the output current is negative, which means that state BB cannot be used as state BB only allows positive output current. Therefore, state AA (+2 voltage level) and state CC (0 voltage level) are combined to generate the output voltage during time t0 to t1. Similarly, during t4 to t5, the output voltage is negative and the output current is positive, state EE (−2 voltage level) and state CC (0 voltage level) are combined to generate the output voltage. State DD is not used as it can only allow negative output current. FIG. 16B shows the modulation waveform. Therefore, during opposite direction operation, three voltage level modulation is used.

It is noted that for PF<1 condition, the inverter circuit (e.g., as shown in FIG. 18) may also use a two voltage level modulation during opposite direction operation mode (from t0 to t1 and from t4 to t5), with waveforms shown in FIG. 16C. In this operating mode, during same direction operation, the normal five voltage level modulation is used (from t1 to t4 and from t5 to t8). During opposite direction operation, two voltage level modulation is used. During t0 to t1 and during t4 to t5, the output voltage is combined by state AA (+2 voltage level) and state EE (−2 voltage level). The pulse width of state AA and state EE are selected in such a way that the filtered leg voltage $V_{AO}$ equals the reference voltage.

Figure 20A:
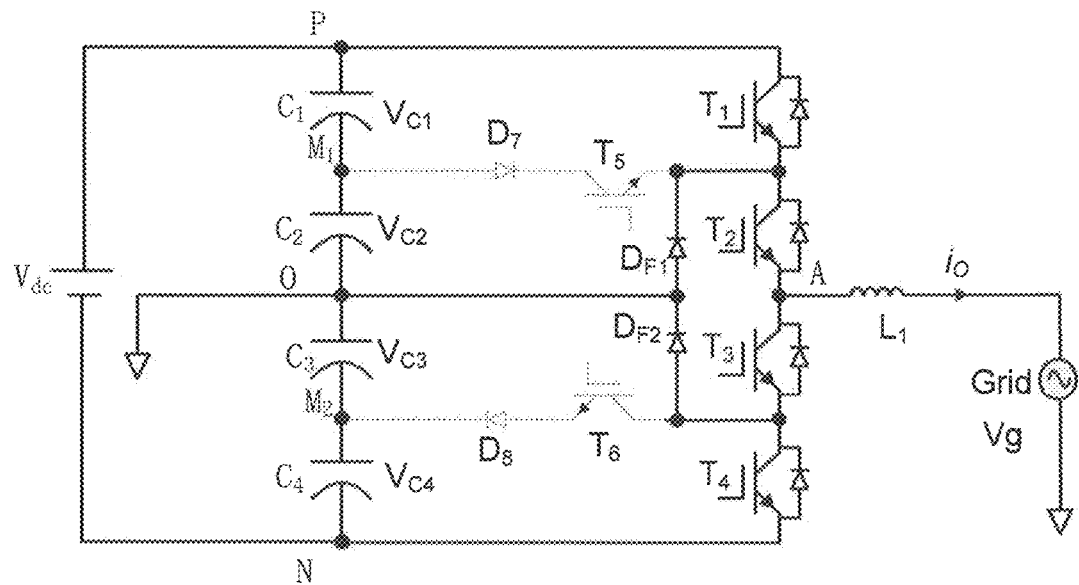
FIGS. 20A and 20B are three level and two level equivalent circuits, respectively, of the inverter of FIG. 18.

FIG. 20A shows the equivalent circuit of the three voltage level modulation of the circuit shown in FIG. 18. For simplicity, the PV and DC-DC converter (DCDC#1 and DCDC#2) are shown as a DC voltage source, Vdc. The part of the circuit shown in dotted lines (T5, T6, D7, and D8) are disconnected during three voltage level operation.

Figure 20B:
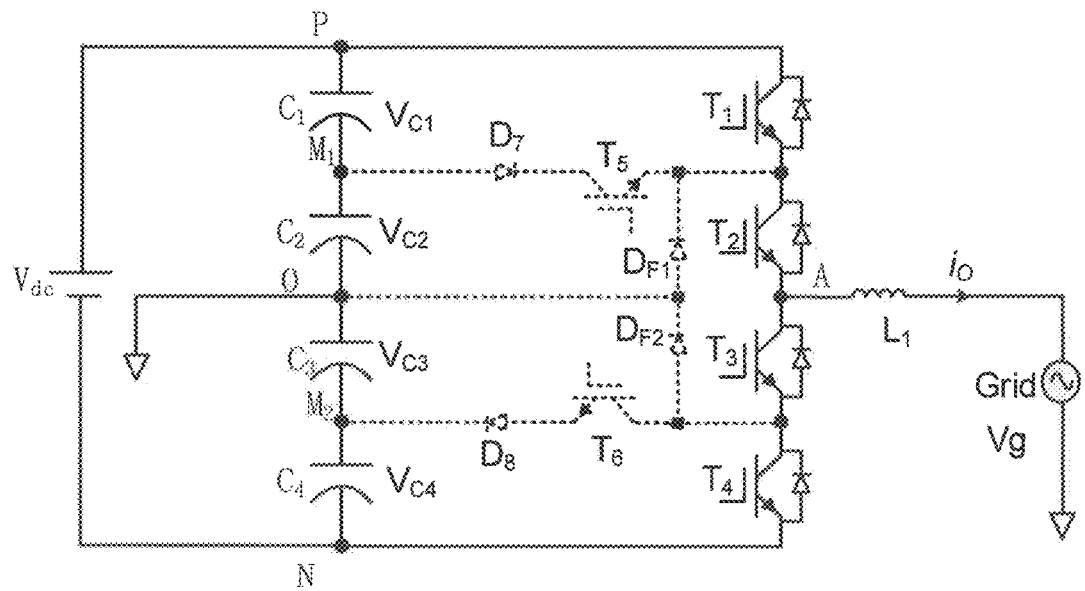

FIG. 20B shows the equivalent circuit of the two voltage level modulation of the circuit shown in FIG. 18. The part of the circuit shown in dotted lines (T5, T6, D7, D8, $D_{F1}$, and $D_{F2}$) are disconnected during two voltage level operation.

To summarize, an embodiment of the hybrid modulation strategy for the circuit shown in FIG. 18 may be summarized as follows:

(1) When the polarities of the output voltage and output current of the inverter are the same (same direction operation), five voltage level modulation is used to generate the leg voltage $V_{AO}$.

(2) When the polarities of the output voltage and output current of the inverter are opposite (opposite direction operation), two voltage level or three voltage level modulation is used to generate the leg voltage $V_{AO}$.

With the hybrid modulation strategy described herein, the number of switches of other NPC five level inverter topologies can be reduced to lower the total inverter cost and at the same time, the inverter still operates under both PF=1 and PF<1. The following provides some examples. Although single phase circuits are shown, it will be readily understood that three-phase circuits can be obtained by connecting three single phase circuits together.

Figure 21:
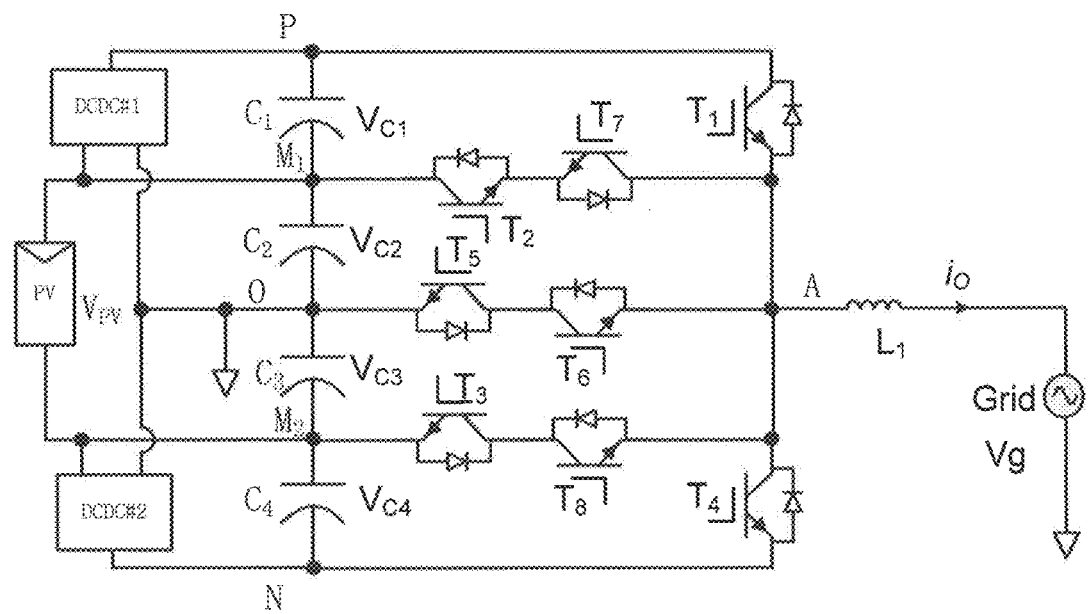
FIG. 21 is a circuit diagram of an alternative five level NPC inverter topology.
Figure 22:
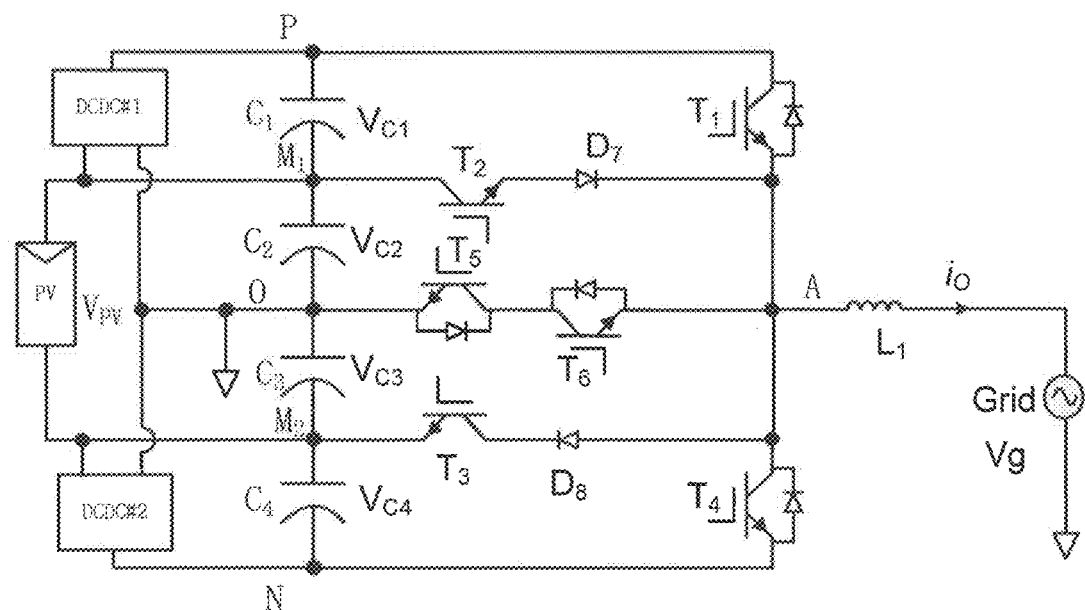
FIG. 22 is a circuit diagram of simplified five level NPC inverter topology based on the topology shown in FIG. 21.

FIG. 21 shows a five level NPC inverter with eight switches and eight diodes. When a hybrid modulation strategy as described herein is used, the topology may be simplified to the five level NPC inverter shown in FIG. 22, which achieves the same performance as that of circuit shown in FIG. 21. As shown in FIG. 22, switches T7, T8 and the anti-parallel diodes of T2 and T3 have been eliminated, such that a total of six switches and six diodes are used. The modulation strategy is similar to that described above for the circuit of FIG. 18.

Figure 23:
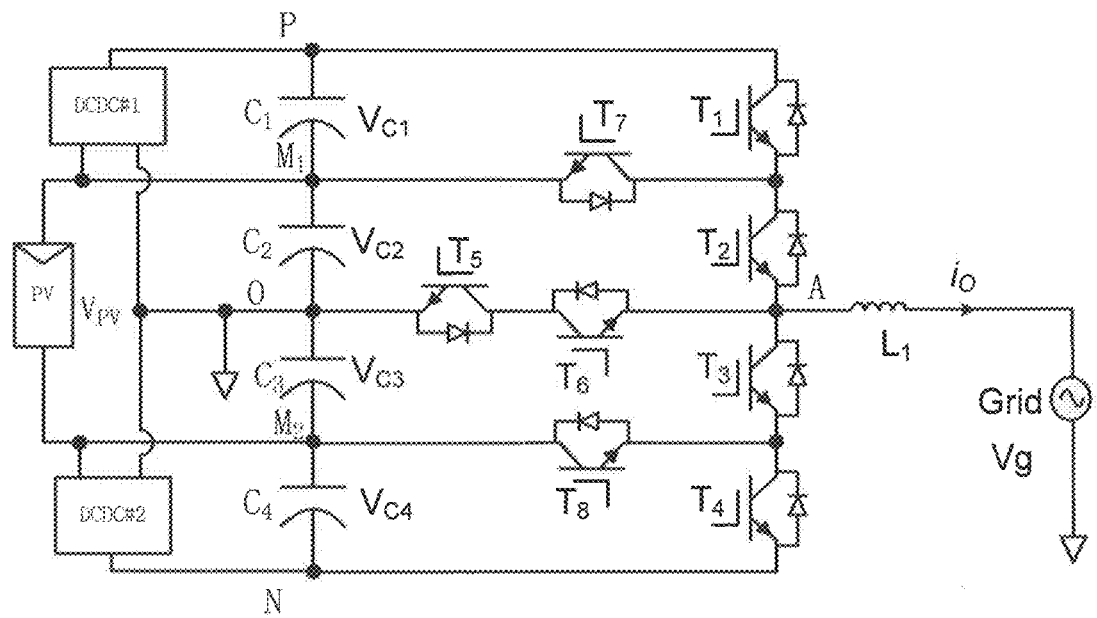
FIG. 23 is a circuit diagram of an alternative five level NPC inverter topology.
Figure 24:
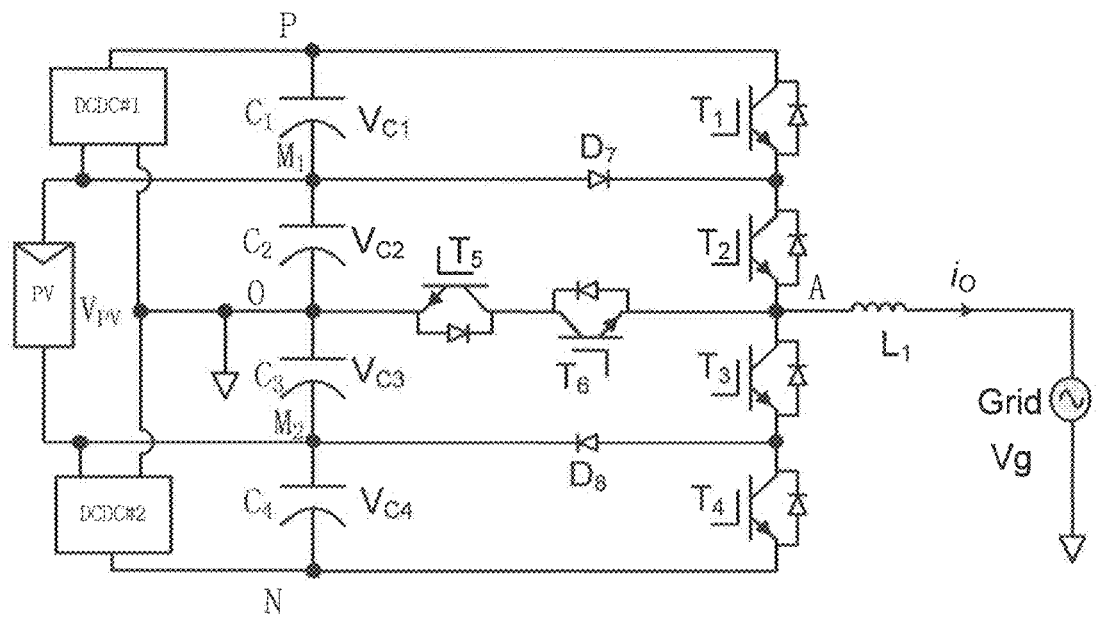
FIG. 24 is a circuit diagram of simplified five level NPC inverter topology based on the topology shown in FIG. 23.

FIG. 23 shows another five level NPC inverter with eight switches and eight diodes. When a hybrid modulation strategy as described herein is used, the topology may be simplified to the five level NPC inverter shown in FIG. 24, which achieves the same performance as that of circuit shown in FIG. 23. As shown in FIG. 24, switches T7 and T8 have been eliminated, such that a total of six switches and eight diodes are used. The modulation strategy is similar to that described above for the circuit of FIG. 1.

Figure 25:
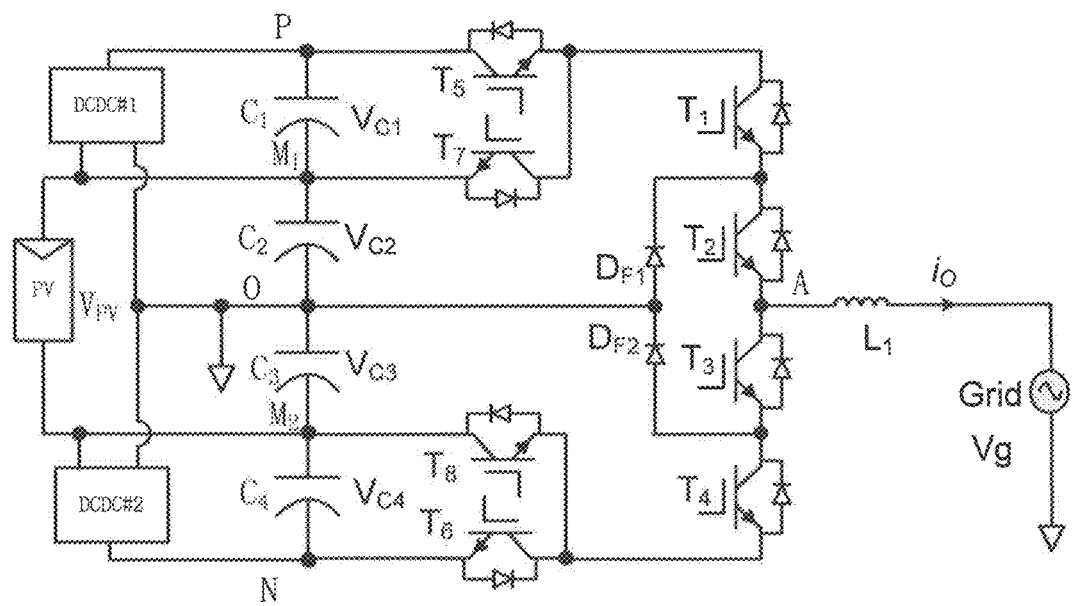
FIG. 25 is a circuit diagram of an alternative five level NPC inverter topology.
Figure 26:
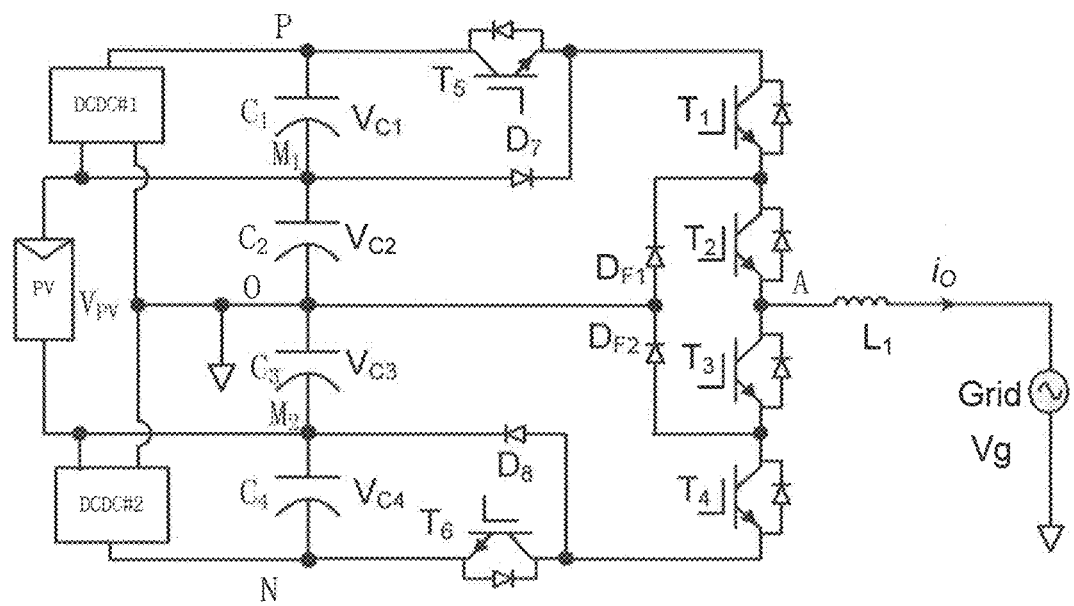
FIG. 26 is a circuit diagram of simplified five level NPC inverter topology based on the topology shown in FIG. 25.

FIG. 25 shows another five level NPC inverter with eight switches and eight diodes. When a hybrid modulation strategy as described herein is used, the topology may be simplified to the five level NPC inverter shown in FIG. 26, which achieves the same performance as that of circuit shown in FIG. 25. As shown in FIG. 26, switches T7 and T8 have been eliminated, such that a total of six switches and eight diodes are used. The modulation strategy is similar to that described above for the circuit of FIG. 18.

Figure 27:
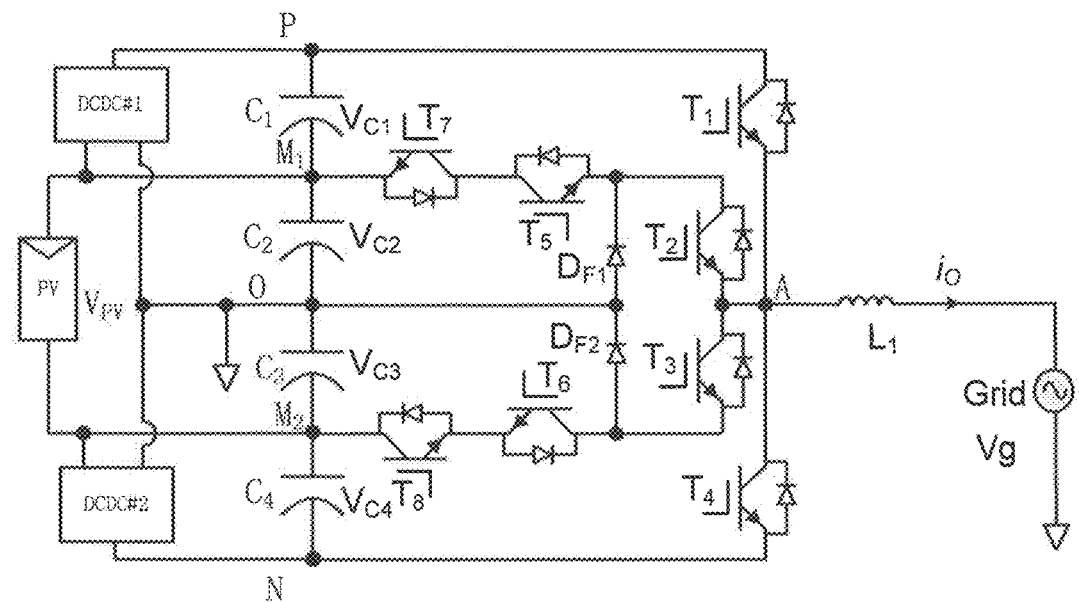
FIG. 27 is a circuit diagram of an alternative five level NPC inverter topology.
Figure 28:
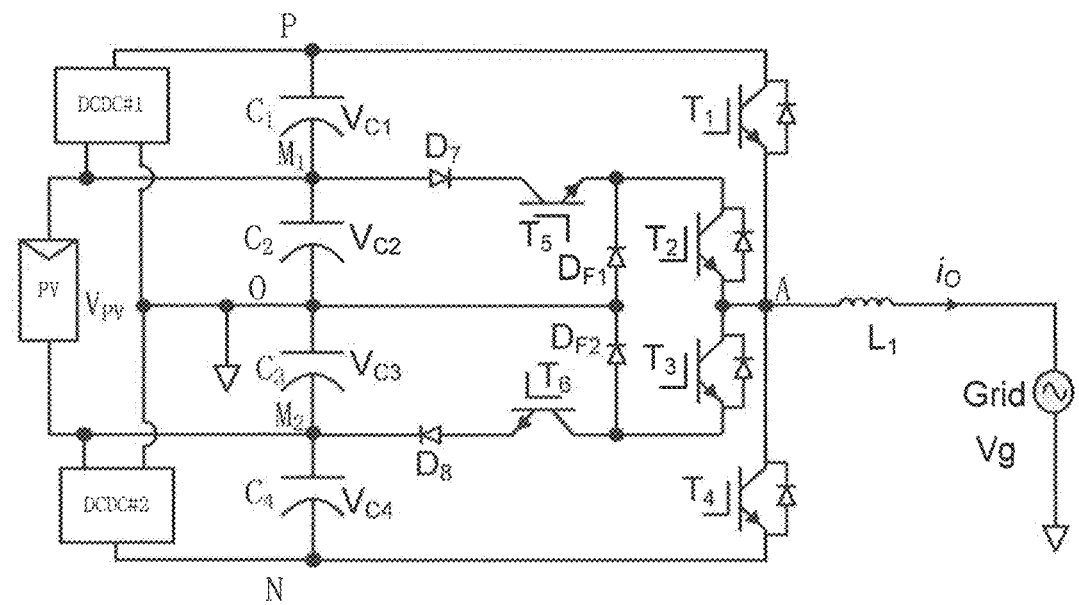
FIG. 28 is a circuit diagram of simplified five level NPC inverter topology based on the topology shown in FIG. 27.

FIG. 27 shows another five level NPC inverter with eight switches and ten diodes. When a hybrid modulation strategy as described herein is used, the topology may be simplified to the five level NPC inverter shown in FIG. 28, which achieves the same performance as that of the circuit shown in FIG. 27. As shown in FIG. 28, switches T7, T8 and the anti-parallel diodes of T5 and T6 have been eliminated, such that a total of six switches and eight diodes are used. The modulation strategy is similar to that described above for the circuit of FIG. 18.

Figure 29:
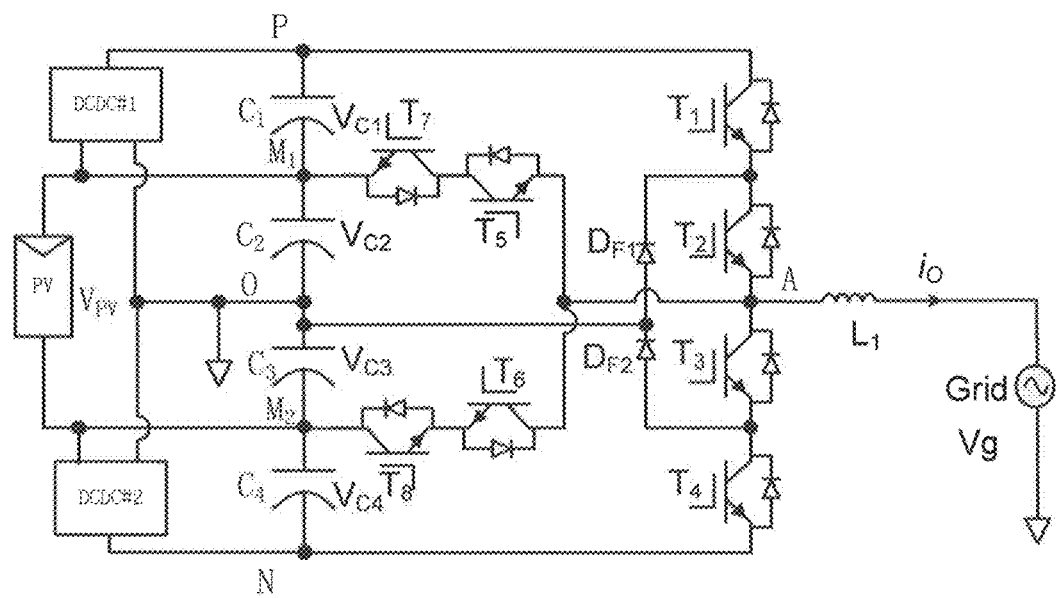
FIG. 29 is a circuit diagram of an alternative five level NPC inverter topology.
Figure 30:
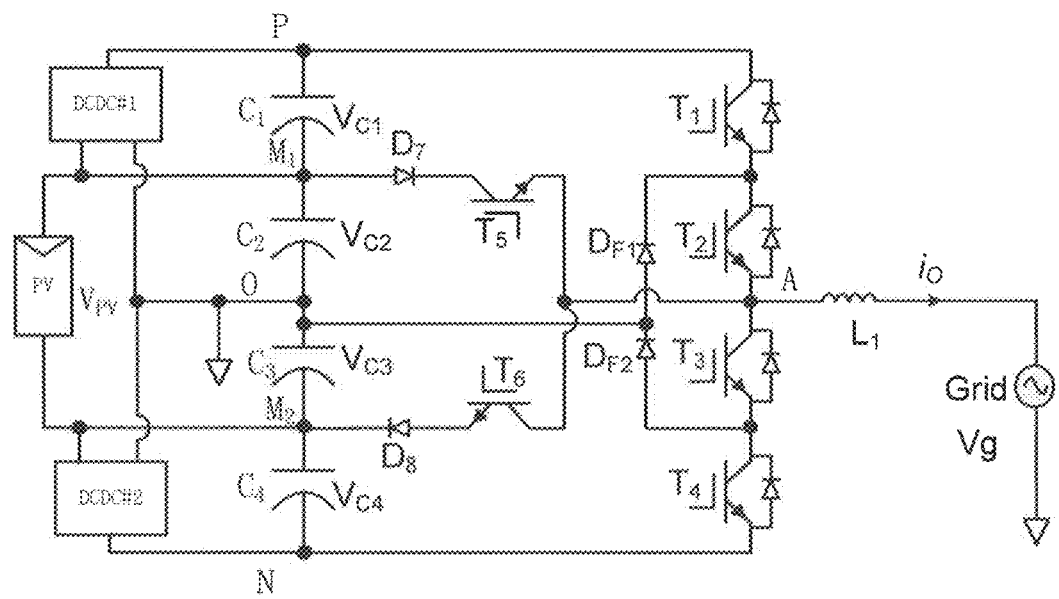
FIG. 30 is a circuit diagram of simplified five level NPC inverter topology based on the topology shown in FIG. 29.

FIG. 29 shows another five level NPC inverter with eight switches and ten diodes. When a hybrid modulation strategy as described herein is used, the topology may be simplified to the five level NPC inverter as shown in FIG. 30, which achieves the same performance as that of the circuit shown in FIG. 29. As shown in FIG. 30, switches T7, T8 and the anti-parallel diodes of T5 and T6 have been eliminated, such that a total of six switches and eight diodes are used. The modulation strategy is similar to that described above for the circuit of FIG. 18.

Figure 31:
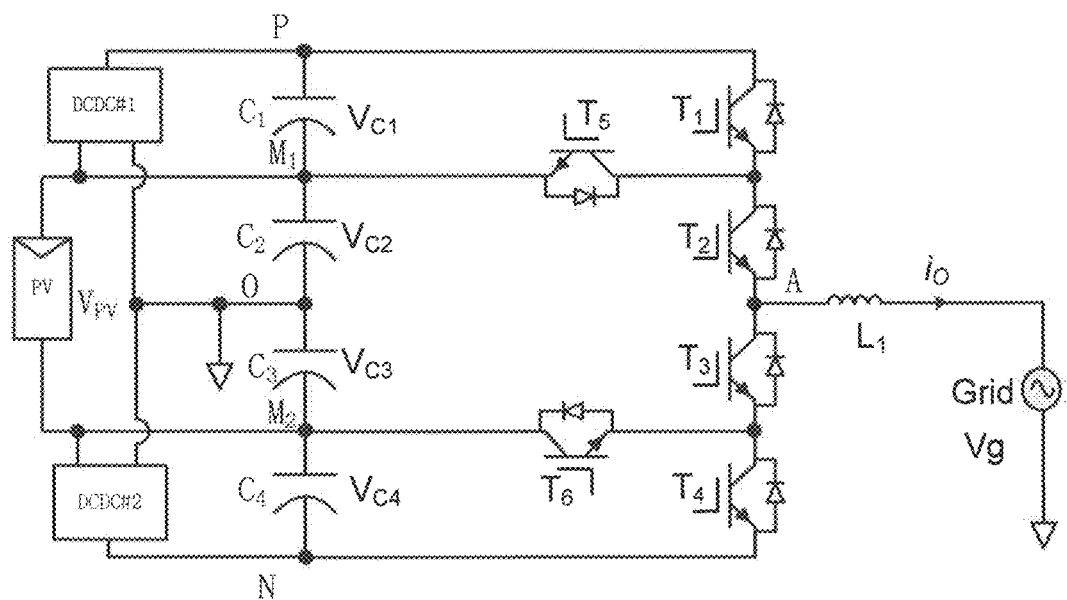
FIG. 31 is a circuit diagram of a four level NPC inverter topology.
Figure 32:
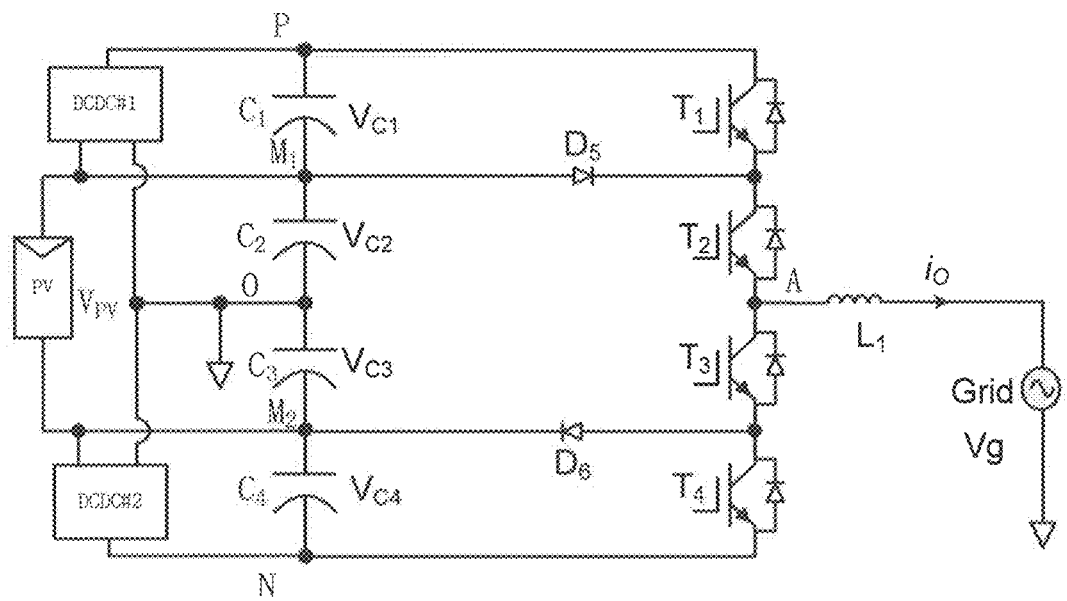
FIG. 32 is a circuit diagram of simplified four level NPC inverter topology based on the topology shown in FIG. 31.

A hybrid modulation strategy as described herein may also be applied to four level inverter, such as the circuit shown in FIG. 31. Six switches and six diodes are used. The circuit shown in FIG. 31 generates four output voltage levels at the leg voltage $V_{AO}$, Vx+Vy, +Vx, −Vx, and −Vx−Vy. When a hybrid modulation strategy is used, the topology may be simplified to the four level NPC inverter shown in FIG. 32, which achieves the same performance as that of the circuit shown in FIG. 31. As shown in FIG. 32, switches T5 and T6 have been eliminated, such that a total of four switches and six diodes are used. The modulation strategy is similar to that described above for the circuit of FIG. 18. More specifically, for the four level inverter, when the inverter is in same direction operation, normal four voltage level modulation is used. When the inverter is in opposite direction operation, two voltage level modulation is used. In this way, the inverter can operate at both PF=1 and PF<1 condition. That is, the output current can both lead and lag the output voltage of the inverter.

Figure 33:
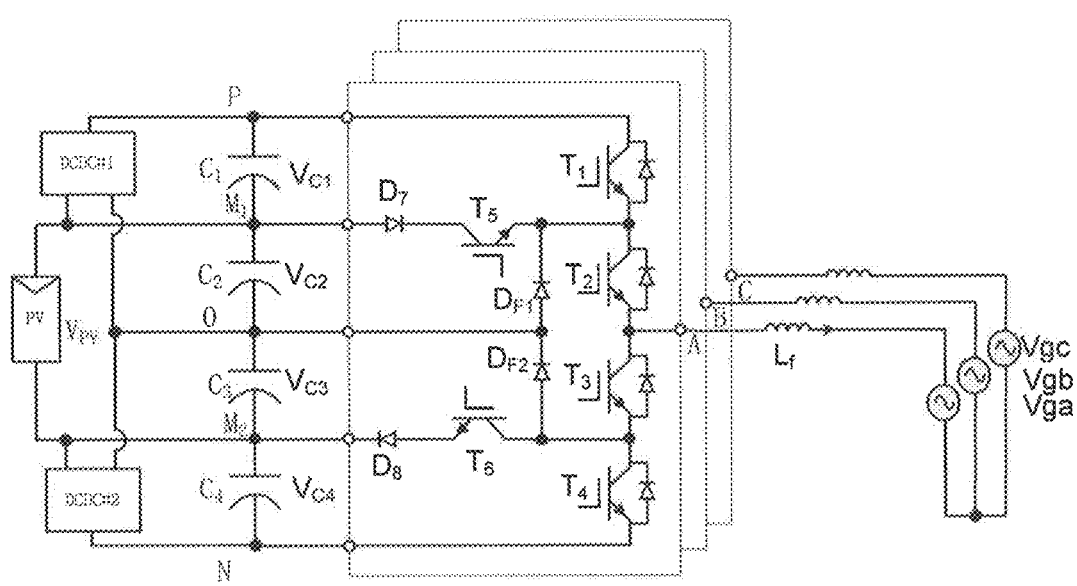
FIG. 33 is a circuit diagram of a three phase five-level NPC inverter topology.

In so far as any of the above descriptions apply to single phase operation, it will be appreciated by those of ordinary skill in the art that three phase operation can also be achieved by connecting three single phase inverters together, for example, as shown in FIG. 33. The operation is similar to that of single phase. In some three-phase configurations, the phase voltage is not accessible. Then the line voltage (or reference voltage) can be used to determine the same direction operation or opposite direction operation for each phase as the phase difference between the line voltage and phase voltage is 30 degrees.

Although the above descriptions of hybrid modulation embodiments are mostly based on SPWM and SVPWM, it will be appreciated by those of ordinary skill in the art that hybrid modulation may be extended to other modulation methods, such as DPWM (Discontinued PWM), SHE PWM (Selected Harmonic Elimination) modulation, etc. A person of ordinary skill in the art can derive the implementation details based on the above discussions.

Practical Implementation Consideration for ANPC Inverter

In a practical application, there is dead time during the switching transition and finite switching time (the transition time required to turn on and turn off a switch, such as IGBT, MOSFET). The impact of the dead time is considered in this section and improved modulation strategies are provided to remove the impact of the dead time. In addition, the switching period is finite and it is possible that the time instant when the output current (which is the same as the inductor current) crosses zero is not at the switching transition time (turn on or turn off instant). For example, for the circuit of FIG. 3 and the waveform of FIG. 10, at time t2, the output current crosses zero (changing from negative current to positive current). When t<t2, three level modulation is used and when t>t2, five level modulation is used. If immediately before t2, switch T5 is on and the negative output current flows through T5, when the output current becomes positive after t2, it can no longer flow through T5 as T5 can only carry negative output current. The antiparallel diodes D3 and D4 will be forced on by the positive output current and the voltage at point A becomes −Vdc/2, or −2 voltage level. Similarly, if immediately before t6, switch T6 is on and the positive output current flows through T6, when the output current becomes negative after t=t6, as shown in FIG. 10, it can no longer flow through T6 as T6 can only carry positive current. Then the antiparallel diode D1 and D2 will be forced on by the negative output current and the voltage at point A becomes +Vdc/2, or +2 voltage level. Although the circuit is still operating without damage, the +2 or −2 voltage level is not desired.

It is noted that when the power factor is 1 (PF=1), as shown in FIG. 6, the above mentioned problem does not exist as the output voltage and output current are either both positive or both negative at the same time.

It is also noted that this problem only exists when a uni-directional current path is used during the zero crossing point of the output current. For example, if two voltage level modulation and five voltage level modulation is used, such as shown in FIG. 9, the problem does not exist as two voltage level modulation allows for bi-directional current flow.

When PF<1, the −2 voltage level and +2 voltage level lasting for a short period of time (less than one switching period) could cause a very small voltage error for the leg voltage, $V_{AO}$, which is not desirable. In order to reduce this voltage error, three improved modulation strategies are provided.

Figure 34:
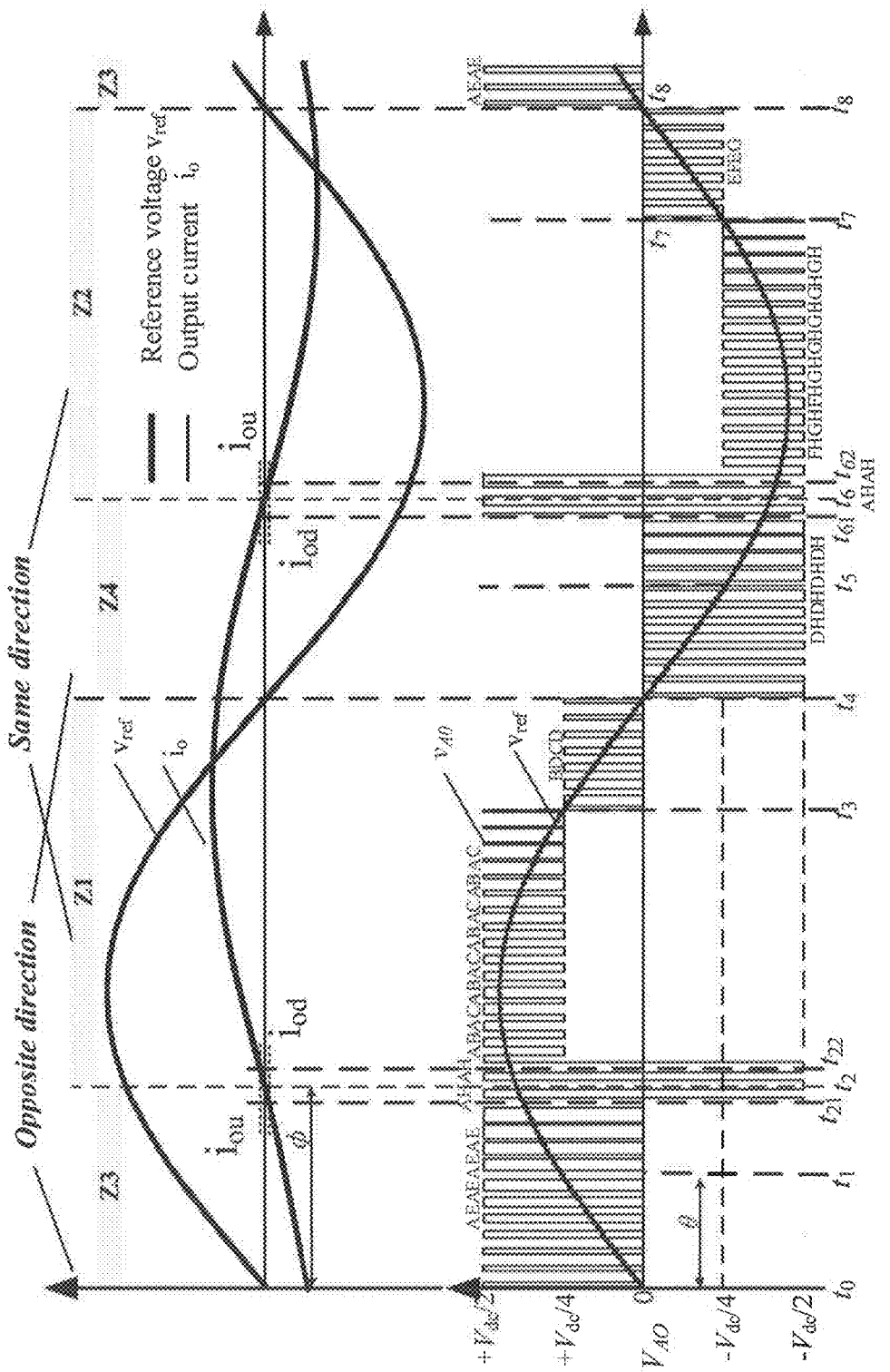
FIG. 34 is a plot showing an improved hybrid modulation strategy for an ANPC inverter, according to one embodiment.

The first improvement method is that a two level modulation strategy is introduced when the output current is near the zero crossing region, as between time t21 and t22 in FIG. 34. It is assumed that at t=t21, the output current is iod (negative threshold, where iod<0) and at t=t22, the output current is iou (positive threshold, where iou>0). During the time interval between t21 to t22, a two voltage level modulation strategy is used. In the two voltage level modulation strategy, T1 and T2 or T3 and T4 are on. They allow bi-directional output current flow. Therefore, the actual zero crossing point does not introduce an undesirable operation mode. The voltage error can be eliminated.

Similarly, for the output current zero crossing point from positive output current to negative output current, shown as t6 in FIG. 34, two voltage level modulation strategy may be used. It is assumed that at t=t61, the output current is iou (positive threshold, where iou>0) and at t=t62, the output current is iod (negative threshold, where iod<0). Then when the output current is between iou and iod, two voltage level modulation strategy is used, as shown in FIG. 34.

In the above analysis, the output (inductor) current ripple is neglected. When the output current ripple is considered, and other practical conditions are considered (such as sample time delay, sensing accuracy, etc.), the value of iou and iod should be large enough so that several switching cycles (such as, for example, 3 to 10 switching cycles) are needed for the output current to fall from iou to iod (when falling, at about time t6), or to rise from iod to iou (when rising, at about time t2). In other words, the value of iou and iod are selected such that the time interval between t21 and t22 and the time interval between t61 and t62 is several switching cycles. This ensures a smooth transition between three voltage level modulation and five voltage level modulation. With this modulation strategy, two voltage level modulation, three voltage level modulation, and five voltage level modulation are used within one line period (from t0 to t8 as shown in FIG. 34).

It is noted from the above analysis that iou and iod are defined as the positive threshold value and negative threshold value of output current io. There are two transition time intervals. The first one is from iod to iou, or from time t21 to t22. The other is from iou to iod, or from time t61 to t62.

Therefore, considering the practical implementation issue, a hybrid modulation strategy according to another embodiment may be described as follows:
(1) When the polarities of the output voltage and output current of the inverter are the same (same direction operation) and the output current is higher than the positive threshold iou or lower than the negative threshold iod, five voltage level modulation is used to generate the leg voltage $V_{AO}$;
(2) When the polarities of the output voltage and output current of the inverter are opposite (opposite direction operation) and the output current is higher than the positive threshold iou or lower than the negative threshold iod, three voltage level modulation is used to generate the leg voltage $V_{AO}$;
(3) During the transition interval between same direction operation and opposite direction operation, two voltage level modulation is used to generate the leg voltage $V_{AO}$, to provide a bi-directional current flow path. That is, if the value of the output current is between the negative threshold value iod and the positive threshold value iou, two voltage level modulation is used to generate the leg voltage $V_{AO}$ (such as, for example, the one illustrated in FIG. 34), so that a bi-directional current flow path is provided. In some embodiments, the time interval for the two level modulation takes a small portion of the entire line period, such as several (e.g., 3) switching cycles, or, for example, 3-10 switching cycles, or 5-10 switching cycles, or 3-5 switching cycles.

When the output current changes from negative to positive (at about time t2), three voltage level, two voltage level, and five voltage level modulation is used. Similarly, when the output current falls from a positive value to a negative value, (at about t6), five voltage level, two voltage level, and three voltage level modulation is used. This ensures a bi-directional current path is provided during the zero crossing interval of the output current. As the output current value is very small during this time interval (zero crossing), the increased inductor ripple caused by two voltage level modulation does not create a problem. According to this embodiment, two voltage level modulation, three voltage level modulation, and five voltage level modulation are all used within one complete line period.

Figure 35:
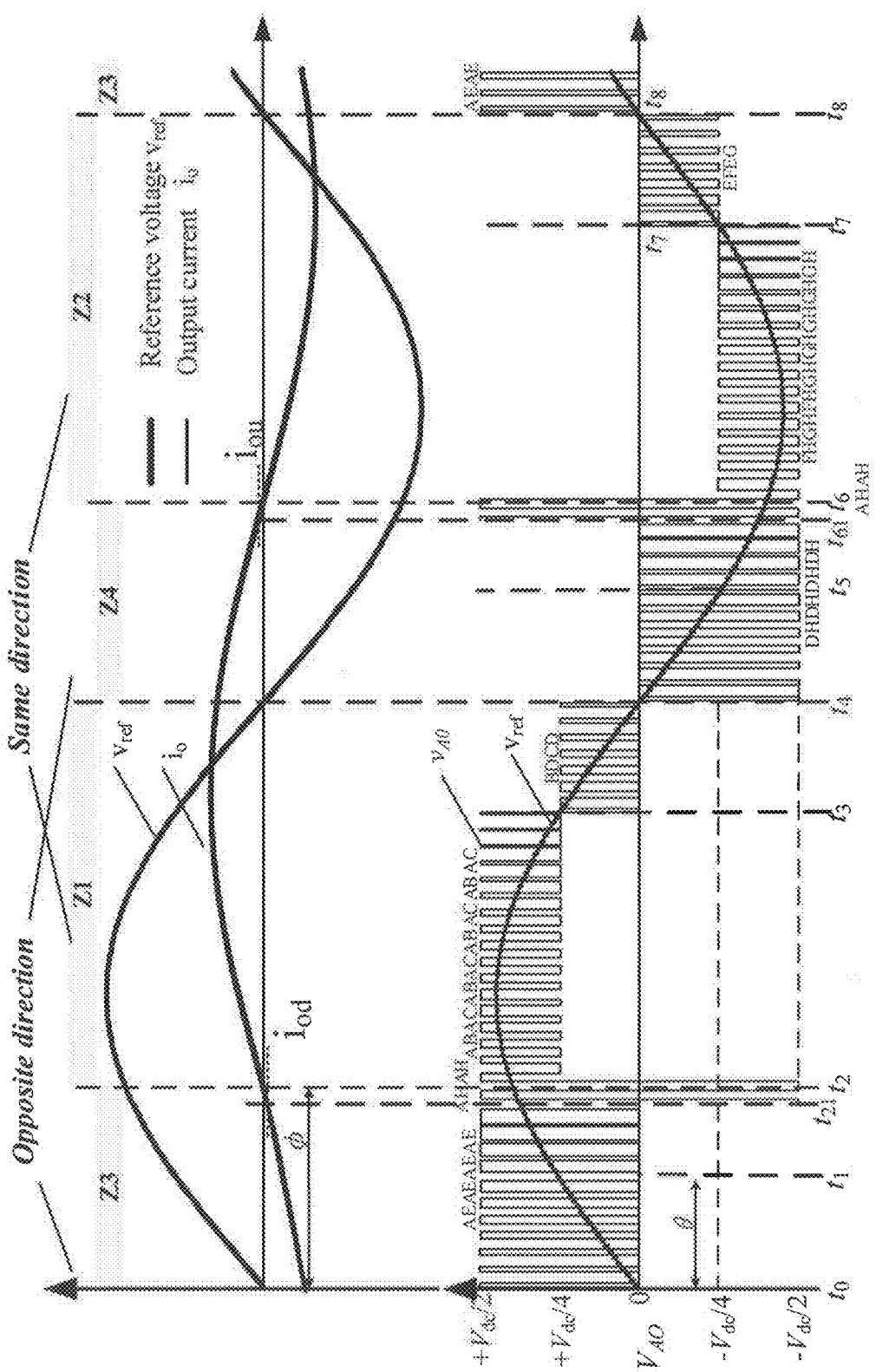
FIG. 35 is a plot showing an improved hybrid modulation strategy for an ANPC inverter, according to one embodiment.

The second improvement method is slightly different from the first improvement method. With the second method, when the output current (which is same as the inductor current) rises from a negative to a positive value (at about time t2 in FIG. 35), two voltage level modulation is used when the output current is between iod (negative threshold) and zero, as shown in FIG. 35. When the output current falls from a positive value to a negative value (at about time t6 in FIG. 35), two voltage level modulation is used when the output current is between iou (positive threshold) and zero, as shown in FIG. 35. This embodiment provides the benefit that the time interval when two voltage level modulation is employed is shorter than that in the first improvement method (as shown in FIG. 34). According to this embodiment, the hybrid modulation becomes:
(1) When the polarities of the output voltage and output current of the inverter are the same (same direction operation), five voltage level modulation is used to generate the leg voltage $V_{AO}$;
(2) When the polarities of the output voltage and output current of the inverter are opposite (opposite direction operation) and when the output current is higher than a positive threshold value iou or lower than a negative threshold value iod, three voltage level modulation is used to generate leg voltage $V_{AO}$;
(3) When the polarities of the output voltage and output current of the inverter are opposite (opposite direction operation) and when either the output current is between the negative threshold value iod and zero, or when the output current is between the positive threshold value iou and zero, two voltage level modulation is used to generate leg voltage $V_{AO}$ to provide a bi-directional current flow path.

When the output current changes from negative to positive (at about t2 of FIG. 35), three voltage level, two voltage level, and five voltage level modulation is used. Similarly, when the output current falls from a positive value to a negative value, (at about t6 of FIG. 35), five voltage level, two voltage level, and three voltage level modulation is used. This ensures a bi-directional current path during zero crossing interval of the output current.

The third improvement method is described as follows. As soon as the output current is zero, the present switching state switch is turned off. After a short delay time, the next switching state switch is turned on. This control method generates +2 and −2 voltage levels for a very short period of time, such as 5-10 μs in each line period. For example, at t=t2, as shown in FIG. 34, as soon as the output current (which is the same as the inductor current) crosses zero and becomes positive, switch T5 is turned off as it can only carry negative output current. Then, after a short delay time (such as 1-5 μs), switch T6 is turned on, which will carry the positive output current. In this way, the time between when the output current crosses zero and the time when T6 starts to conduct is very short, at around 5-10 μs. During this period, D3 and D4 are on by the positive output current and a −2 voltage level is applied to point A (FIG. 3). Similarly, at t=t6 (FIG. 34), as soon as the output current crosses zero and becomes negative, T6 is turned off as it cannot conduct negative current. Then, after a short delay time, T5 is turned on as it can carry negative current. Considering that the line period is around 16.7 ms (for a 60 Hz system) or 20 ms (for 50 Hz system), the impact of the 5-10 μs of +2 voltage level and −2 voltage level is very small. The essence of this modulation method is to minimize the time when +2 voltage level and −2 voltage level is applied to point A during zero crossing of the output current by controlling the on and off of the switches in the inverter.

It is noted that the above analysis is applicable only when the output current zero crossing point happens when the T5 or T6 is conducting. If the zero crossing point of the output current happens when T1, T2 or T3, T4 are conducting, the transition between three level modulation and five level modulation is smooth. There is no need to turn off T5 and turn on T6, or vice versa.

Additional methods can also be developed based on the embodiments described above, wherein the objective is to provide bi-directional current flow during the zero crossing period of the output current or to minimize the time interval when +2 voltage level and/or −2 voltage level is applied to point A, by controlling the conduction of the uni-directional current path switch(es), such as T5 and T6.

The above embodiments have been described using single phase inverters as examples. However, the embodiments are also applicable to three phase inverters using the methods described earlier in this specification.

Practical Implementation Consideration for NPC Inverter

The embodiments described above may also be extended to NPC inverters. For example, for the hybrid modulation strategy shown in FIG. 16B first improvement method and a second improvement method are shown in FIG. 36 and FIG. 37, respectively.

Figure 36:
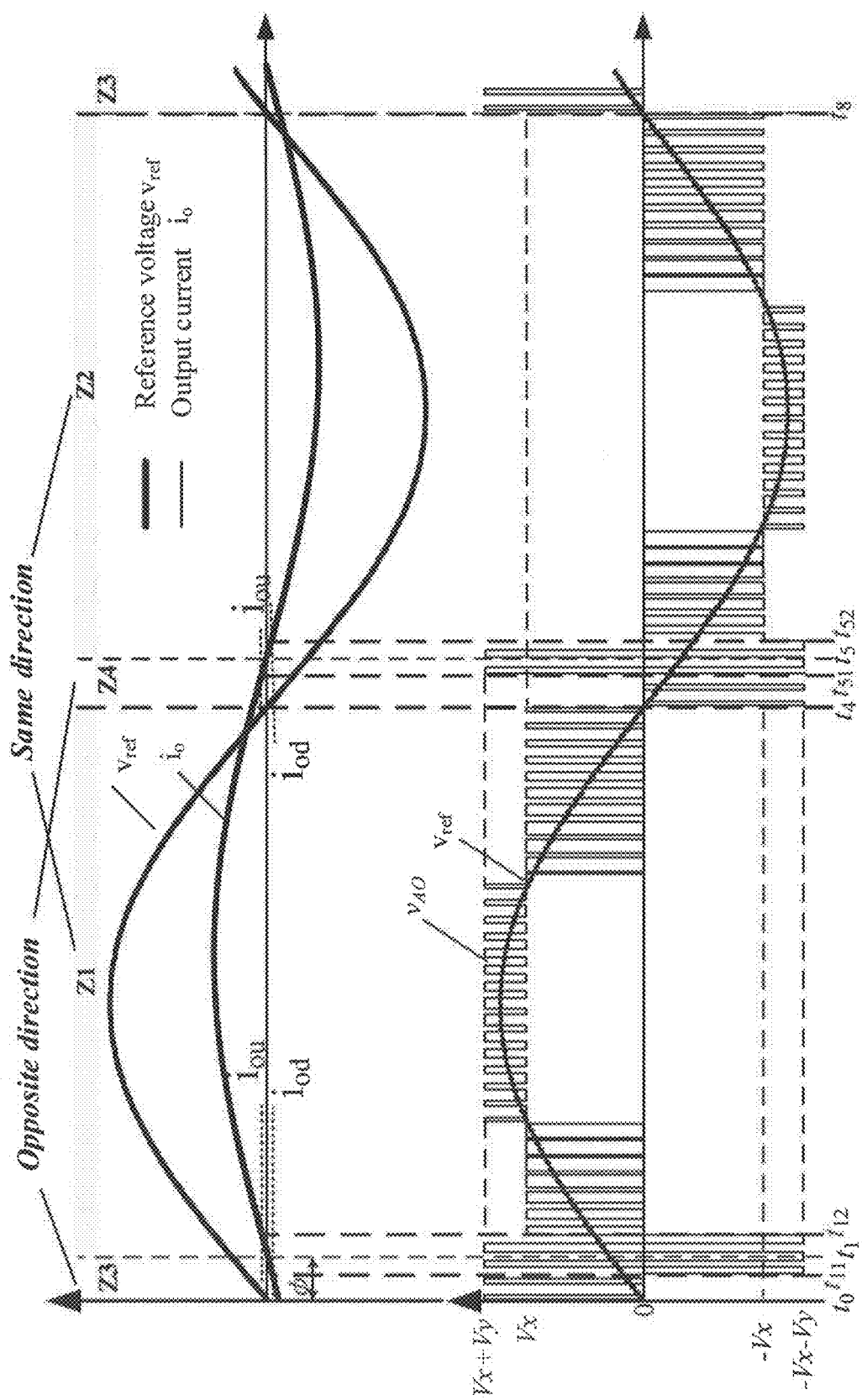
FIG. 36 is a plot showing an improved hybrid modulation strategy for an NPC inverter, according to one embodiment.
Figure 37:
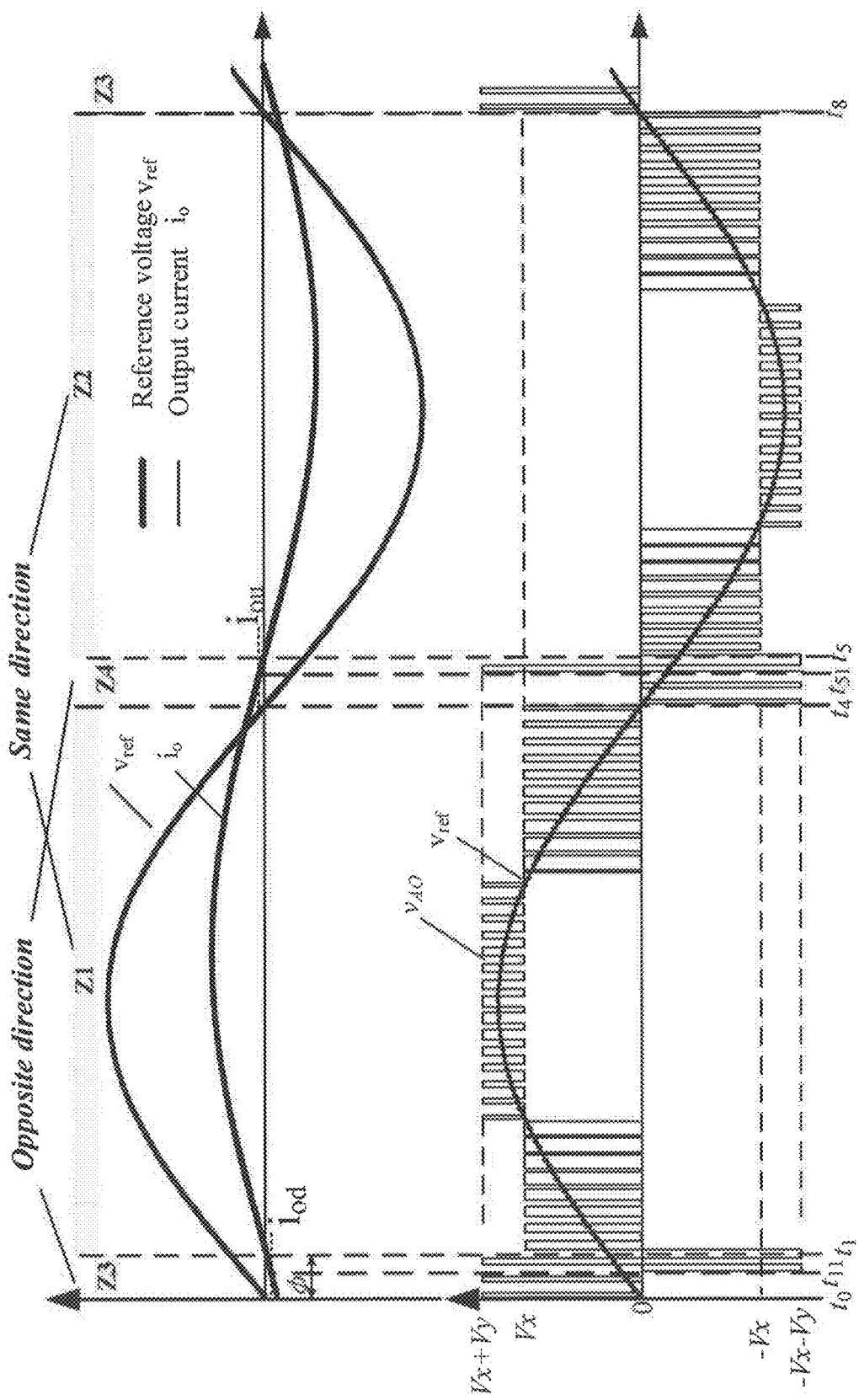
FIG. 37 is a plot showing an improved hybrid modulation strategy for an NPC inverter, according to one embodiment.

The first improvement method is that two level modulation is used when the output current is between iou and iod, as shown in FIG. 36, where iou and iod are defined as the positive threshold value and negative threshold value of the output current io, respectively. There are two transition time intervals. The first one is from iod to iou, or from time t1 to t12. The other is from iou to iod, or from time t51 to t52.

According to this embodiment, the hybrid modulation strategy may be described as follows:

(1) When the polarities of the output voltage and output current of the inverter are the same (same direction operation) and the output current is higher than the positive threshold iou or lower than the negative threshold iod, five voltage level modulation method is used to generate the leg voltage $V_{AO}$.

(2) When the polarities of the output voltage and output current of the inverter are opposite (opposite direction operation), and the output current is higher than the positive threshold iou or lower than the negative threshold iod, three voltage level modulation method is used to generate the leg voltage $V_{AO}$;

(3) During the transition interval between the same direction operation and opposite direction operation, two voltage level modulation method is used to generate the leg voltage $V_{AO}$, to provide a bi-directional current flow path. In other words, if the value of the output current is between the negative threshold value iod and the positive threshold value iou, two voltage level modulation method is used to generate the leg voltage $V_{AO}$, such as illustrated in FIG. 36, so that a bi-directional current flow path is provided. The time interval for the two level modulation is selected to take a small portion of the entire line period, such as several switching cycles (e.g., 3-10 switching cycles). The switching frequency for the inverter may be about 10 to 20 kHz. The switching cycle may be about 5 to 10 μs.

According to this embodiment, when the output current rises from negative to positive (at about t1 in FIG. 36), three voltage level, two voltage level, and five voltage level modulation is used. Similarly, when the output current falls from a positive value to a negative value, (at about t5 in FIG. 36), five voltage level, two voltage level, and three voltage level modulation is used. This ensures a bi-directional current path during the zero crossing interval of the output current. As the output current value is very small, the increased inductor ripple does not create a problem.

The second improvement method is slightly different from the first improvement method. With the second method, when the output current (which is the same as the inductor current) rises from a negative to a positive value (about time t1 in FIG. 37), two voltage level modulation is used when the output current is between iod (negative threshold) and zero, as shown in FIG. 37. When the output current falls from a positive value to a negative value (about time t5 in FIG. 37), two voltage level modulation is used when the output current is between iou (positive threshold) and zero, as shown in FIG. 37. The benefit is that the time interval when two voltage level modulation is employed is shorter than that in the first improvement method (as shown in FIG. 36). According to this embodiment, the hybrid modulation strategy may be described as:

(1) When the polarities of the output voltage and output current of the inverter are the same (same direction operation), five voltage level modulation is used to generate the leg voltage $V_{AO}$;

(2) When the polarities of the output voltage and output current of the inverter are opposite (opposite direction operation) and the output current is higher than the positive threshold iou or lower than the negative threshold iod, three voltage level modulation is used to generate the leg voltage $V_{AO}$;

(3) When the polarities of the output voltage and output current of the inverter is opposite (opposite direction operation) and when either the output current is between negative threshold value iod and zero, or the output current is between positive threshold value iou and zero, two voltage level modulation is used to generate leg voltage $V_{AO}$ to provide a bi-directional current flow path.

According to this embodiment, for NPC inverter, when the output current changes from negative to positive (at about time t1 of FIG. 37), three voltage level, two voltage level, and five voltage level modulation are used. Similarly, when the output current falls from a positive value to a negative value, (about t5 of FIG. 37), five voltage level, two voltage level, and three voltage level modulation are used. This ensures a bi-directional current path during the zero crossing interval of the output current. As the output current value is very small during this time interval, the increased inductor ripple caused by two voltage level modulation does not create a problem. With the above modulation method, two voltage level modulation, three voltage level modulation, and five voltage level modulation are all used within one complete line period for an NPC inverter.

A third improvement method for an NPC inverter is described as follows: When the output current is zero, the present switching state switch is turned off. After a short delay time, the next switching state switch is turned on. This control method generates +2 and −2 voltage level for 5-10 μs in each line period. For example, at t=t1, as shown in FIG. 36, as soon as the output current (which is same as the inductor current) crosses zero and becomes positive, switch T6 is turned off as it can only carry negative output current (see FIG. 18). Then, after a short delay time, switch T5 is turned on, which carries the positive output current. In this way, the time between when the output current crosses zero and when T5 starts to conduct is very short, at about 5-10 μs. During this period, the body diode of T3 and T4 (in FIG. 18) are turned on by the positive output current and a −2 voltage level is applied to point A. The operation at the output current zero crossing from a negative to a positive value (about time t5 in FIG. 37) is similar and is not described here. The impact of the short time with +2 voltage level and −2 voltage level is very small.

It is noted that the above analysis is applicable only when the output current zero crossing point happens when T5 or T6 is conducting. If the zero crossing point of the output current happens when T1, T2 or T3, T4 are conducting, the transition between three voltage level modulation and five voltage level modulation is smooth. There is no need to turn off T5 and turn on T6, or vice versa.

Controller

Another aspect of the invention relates to a controller that controls switching of switches in inverters according to the hybrid modulation embodiments described herein. For example, a controller may be implemented to generate switching states in multilevel inverters including, but not limited to, multilevel ANPC and NPC inverters. A controller may be implemented in any combination of discrete and integrated components, digitally or analogue, in a hardware control circuit such as a logic circuit or in a platform such as a field programmable gate array (FPGA), digital signal processor (DSP), complex programmable logic device (CPLD), or other suitable technology as known in the art. A controller may include voltage and current sensing circuit to sense the output current (which is the same as the inductor current as discussed in this specification) and the grid voltage. The controller may also include a circuit to retrieve the phase voltage information from the sensed line to line voltage, which may be done using, for example, a DSP or operational amplifier circuits. A controller may include one or more components such as an error amplifier that receives an input based on sensed inverter output voltage or current, an error amplifier that produces an output error signal, a PWM circuit that receives the error signal and generates a duty cycle signal, and a gate drive logic circuit that produces gate drive signals for switches based on the duty cycle signal.

EQUIVALENTS

Many of the above embodiments have been described using single phase inverters as examples. However, such embodiments are also applicable to three phase inverters using methods described in this specification.

The above embodiments have been described with respect to ANPC and NPC type inverters. However, the embodiments are also applicable to other types of inverters to solve the voltage error problem during the output current zero crossing point.

In addition to the embodiments described above, other methods to minimize the transition between three level modulation and five level modulation, or between other levels of modulation, to provide bi-directional current flow during output current zero crossing, will be apparent to those of ordinary skill in the art.

Embodiments have been described primarily in respect of five voltage level inverter topologies. For other voltage level inverters, such as seven and nine voltage level inverters, similar methods may be used to remove the error voltage caused by the output current zero crossing point. Details are not provided here, as they would be apparent to those of ordinary skill in the art.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

REFERENCES

[1] T. B. Soeiro, R. Carballo, J. Moia, G. O. Garcia, and M. L. Heldwein, "Three-phase five-level active-neutral-point-clamped converters for medium voltage applications", 2013 Brazilian Power Electronics Conference, 2013, pp. 85-91.
[2] S. R. Pulikanti, G. Konstantinou, and V. G. Agelidis, "DC-link voltage ripple compensation for multilevel active-neutral-point-clamped converters operated with SHE-PWM", *IEEE Transactions on Power Delivery*, vol. 27, pp. 2176-2184, 2012.
[3] H. Wang, L. Kou, Y. F. Liu, P. C. Sen, and S. Liu, "New low-cost five-level active neutral-point clamped converter", 2016 IEEE Applied Power Electronics Conference and Exposition (APEC), 2016, pp. 1489-1496.
[4] G. Tan, Q. Deng, and Z. Liu, "An optimized SVPWM strategy for five-level active NPC (5L-ANPC) converter", *IEEE Transactions on Power Electronics*, vol. 29, pp. 386-395, 2014.
[5] Z. Liu, Y. Wang, G. Tan, H. Li, and Y. Zhang, "A novel SVPWM algorithm for five-level active neutral-point-clamped converter", *IEEE Transactions on Power Electronics*, vol. 31, pp. 3859-3866, 2016.
[6] Q. A. Le and D. C. Lee, "A novel SVPWM scheme for common-mode voltage reduction in five-level active NPC inverters", 9th International Conference on Power Electronics and ECCE Asia (ICPE-ECCE Asia), 2015, pp. 281-287.
[7] H. Wang, "A five level NPC inverter and its application", Chinese Patent No. CN102624269B, 2014.

The invention claimed is:
1. A method of operating a neutral point clamped (NPC) multilevel inverter, wherein the neutral point clamped (NPC) multilevel inverter produces an AC output voltage and output current at a line period, the method comprising:

controlling switches of the neutral point clamped multilevel inverter according to a nominal voltage level modulation during a portion of the line period when polarities of the AC output voltage and output current are the same, such that the nominal voltage level modulation generates a leg voltage ($V_{AO}$), wherein the nominal voltage level modulation is the highest level the neutral point clamped multilevel inverter can provide;

and controlling switches of the multilevel inverter according to a lower voltage level modulation during a portion of the line period when the polarities of the AC output voltage and output current are opposite, such that the lower level voltage modulation generates the wherein the lower voltage modulation level is a level less than the highest level the neutral point-clamped multilevel inverter can provide:

wherein an inverter instantaneous output AC voltage is determined based on the leg voltage ($V_{AO}$);

further wherein the neutral point clamped multilevel inverter is a five-level neutral point clamped inverter, wherein the nominal voltage level modulation is a five voltage level modulation, and wherein the lower voltage level modulation is a three voltage level modulation or a two voltage level modulation;

further wherein the five-level neutral point clamped inverter is controlled in one of the following control scheme:

a. controlling the switches of the five-level neutral point clamped inverter according to the five voltage level modulation during a portion of the line period when polarities of the AC output voltage and output current are the same and the output current is higher than a positive threshold (iou) or lower than a negative threshold (iod) to generate the leg voltage ($V_{AO}$);

controlling the switches of the five-level neutral point clamped inverter according to the three voltage level modulation during a portion of the line period when the polarities of the AC output voltage and output current are opposite and the output current is higher than the positive threshold (iou) or lower than the negative threshold (iod), to generate the leg voltage ($V_{AO}$); and controlling the switches of the five-level neutral point clamped inverter according to two voltage level modulation during a transition interval between same direction operation and opposite direction operation, to generate the leg voltage ($V_{AO}$); wherein the two voltage level modulation provides a bi-directional current flow path;

b. controlling the switches of the five-level neutral point clamped inverter according to the five voltage level modulation during a portion of the line period when polarities of the AC output voltage and output current are the same, to generate the lets voltage ($V_{AO}$);

controlling the switches of the five-level neutral point clamped inverter according to three voltage level modulation during a portion of the line period when polarities of the output voltage and output current are opposite and the output current is greater than a positive threshold value (iou) or lower than a negative threshold value (iod), to generate leg voltage ($V_{AO}$); and controlling the switches of the five-level neutral point clamped inverter according to two voltage level modulation during a portion of the line period when polarities of the AC output voltage and output current are opposite and when either the AC output current is between the negative threshold value (iod) and zero, or when the AC output current is between the positive threshold value (iou) and zero, to generate leg voltage ($V_{AO}$); wherein the two voltage level modulation provides a bi-directional current flow path.

2. The method of claim 1, wherein the two voltage level modulation is applied for 3-10 switching cycles of the line period.

3. The method of claim 1, further comprising:
controlling switches of the neutral point clamped inverter so that when the output current crosses zero, a present switching state switch is turned off and after a selected delay time a next switching state is turned on; wherein a +2 voltage level and a −2 voltage level are applied at a leg voltage ($V_{AO}$) output point for the selected delay time; wherein the delay time is 5-10 µs.

4. The method of claim 1, wherein the neutral point clamped (NPC) multilevel inverter is an active neutral point clamped (ANPC) inverter.

5. The method of claim 4, wherein the lower voltage level modulation is selected such that:
a flying capacitor of the active neutral point clamped (ANPC) inverter does not participate in an energy transfer process; or
the flying capacitor is charged and discharged alternately between one voltage level and another voltage level.

6. A method of operating a three phase neutral point clamped multilevel inverter, wherein the three phase neutral point clamped multilevel inverter produces a three phase AC output voltage and output current at a line period, the method comprising: controlling switches of each phase of the three phase multilevel inverter according to the method of claim 1.

7. The method of claim 6, wherein the three phases of the three phase neutral point clamped multilevel inverter are an active neutral point clamped (ANPC) inverter.

* * * * *